US012771965B2

(12) United States Patent
Kato et al.

(10) Patent No.: US 12,771,965 B2
(45) Date of Patent: Oct. 20, 2026

(54) IMAGING ELEMENT AND IMAGING DEVICE

(71) Applicant: NIKON CORPORATION, Tokyo (JP)

(72) Inventors: Shutaro Kato, Kawasaki (JP); Osamu Saruwatari, Yokohama (JP); Wataru Funamizu, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 166 days.

(21) Appl. No.: 18/685,715

(22) PCT Filed: Aug. 22, 2022

(86) PCT No.: PCT/JP2022/031548
§ 371 (c)(1),
(2) Date: Apr. 26, 2024

(87) PCT Pub. No.: WO2023/027018
PCT Pub. Date: Mar. 2, 2023

(65) Prior Publication Data

US 2024/0388815 A1 Nov. 21, 2024

(30) Foreign Application Priority Data

Aug. 25, 2021 (JP) ................................ 2021-137586

(51) Int. Cl.
*H04N 25/772* (2023.01)
*H04N 23/745* (2023.01)
(Continued)

(52) U.S. Cl.
CPC ......... *H04N 25/772* (2023.01); *H04N 23/745* (2023.01); *H04N 25/778* (2023.01);
(Continued)

(58) Field of Classification Search
CPC ............... H04N 25/772; H04N 23/745; H04N 25/778; H04N 25/79; H04N 25/531;
(Continued)

(56) References Cited

U.S. PATENT DOCUMENTS 11,451,724 B2 9/2022 Hayashi
2006/0103745 A1 5/2006 Nagaishi et al.
(Continued)

FOREIGN PATENT DOCUMENTS

EP 2871835 A1 5/2015
JP 2006-157862 A 6/2006
(Continued)

OTHER PUBLICATIONS

Oct. 25, 2022 International Search Report issued in International Patent Application No. PCT/JP2022/031548.
Jul. 16, 2025 Extended European Search Report issued for Patent Application No. 22861306.3.
Aug. 25, 2026 Office Action issued in Japanese Patent Application No. 2025-209316.

*Primary Examiner* — Albert H Cutler
(74) *Attorney, Agent, or Firm* — Oliff PLC

(57) ABSTRACT

An imaging element includes a first semiconductor substrate having a pixel unit in which a plurality of pixels are disposed, each pixel including a photoelectric conversion unit that converts light to an electric charge, a retention unit that retains the electric charge, a first transfer unit that transfers the electric charge from the photoelectric conversion unit to the retention unit, an accumulation unit that accumulates the electric charge, a second transfer unit that transfers the electric charge from the retention unit to the accumulation unit, and an output unit that outputs a signal based on the electric charge and a second semiconductor substrate having a control circuit unit that is disposed at a position opposing the pixel unit and that controls the first transfer unit and/or the second transfer unit, and a peripheral
(Continued)

circuit unit that is disposed outside of the control circuit unit and that controls the output unit.

30 Claims, 49 Drawing Sheets

(51) Int. Cl.
*H04N 25/531* (2023.01)
*H04N 25/62* (2023.01)
*H04N 25/778* (2023.01)
*H04N 25/79* (2023.01)

(52) U.S. Cl.
CPC ........... *H04N 25/79* (2023.01); *H04N 25/531* (2023.01); *H04N 25/62* (2023.01)

(58) Field of Classification Search
CPC .... H04N 25/62; H04N 25/771; H04N 25/532; H10F 39/12; H10F 39/199; H10F 39/8037; H10F 39/809
See application file for complete search history.

(56) References Cited

U.S. PATENT DOCUMENTS

| | | | | |
|---|---|---|---|---|
| 2011/0019045 | A1* | 1/2011 | Lin | H10F 39/8037 348/294 |
| 2014/0092289 | A1 | 4/2014 | Takahashi | |
| 2019/0103427 | A1* | 4/2019 | Matsumoto | H04N 25/76 |
| 2019/0104268 | A1* | 4/2019 | Shirini | H04N 25/42 |
| 2020/0213502 | A1* | 7/2020 | Shigeta | H04N 23/71 |
| 2021/0152764 | A1 | 5/2021 | Hayashi | |
| 2022/0345654 | A1 | 10/2022 | Sugimori | |
| 2022/0385846 | A1* | 12/2022 | Higuchi | H04N 25/79 |

FOREIGN PATENT DOCUMENTS

| | | | |
|---|---|---|---|
| JP | 2014-072779 | A | 4/2014 |
| JP | 2016171455 | A | 9/2016 |
| JP | 2020-108022 | A | 7/2020 |
| JP | 2021-082901 | A | 5/2021 |
| JP | 2021-082934 | A | 5/2021 |
| WO | 2021/065561 | A1 | 4/2021 |

* cited by examiner

IMAGING ELEMENT AND IMAGING DEVICE

CLAIM OF PRIORITY

The present application claims priority from Japanese patent application No. 2021-137586 filed on Aug. 25, 2021, the content of which is hereby incorporated by reference into this application.

TECHNICAL FIELD

The present invention relates to an imaging element and an imaging apparatus.

BACKGROUND ART

Imaging sensors that including a pixel array unit in which a plurality of pixels are disposed are well-known (e.g., Patent Document 1). Reading imaging signals by the rolling shutter mode has presented the problem of distortion in the subject in a captured image.

RELATED ART DOCUMENT

Patent Document

Patent Document 1: JP 2014-72779 A

A first disclosure of an imaging element includes a first semiconductor substrate having a pixel unit in which a plurality of pixels are disposed, each pixel including a photoelectric conversion unit configured to convert light to an electric charge, a retention unit configured to retain the electric charge of the photoelectric conversion unit, a first transfer unit configured to transfer the electric charge from the photoelectric conversion unit to the retention unit, an accumulation unit configured to accumulate the electric charge of the retention unit, a second transfer unit configured to transfer the electric charge from the retention unit to the accumulation unit, and an output unit configured to output a signal based on the electric charge of the accumulation unit; and a second semiconductor substrate having a control circuit unit that is disposed at a position opposing the pixel unit and that is configured to control the first transfer unit and/or the second transfer unit, and a peripheral circuit unit that is disposed outside of the control circuit unit and that is configured to control the output unit.

A second disclosure of an imaging device includes the first disclosure of an imaging element.

DETAILED DESCRIPTION OF EMBODIMENTS

The present invention will be described below with embodiments of the invention, but the embodiments below do not limit the invention according to the claims. Also, not all combinations of characteristics described in the embodiments are necessarily required as a solution provided by the invention.

In this specification, the X axis and the Y axis are perpendicular to each other, and the Z axis is perpendicular to the XY plane. The X, Y, and Z axes constitute a right hand system. The direction parallel to the Z axis is sometimes referred to as the lamination direction of an imaging element 100. In this specification, terms such as "up" or "down" are not limited to being in reference to the direction of gravitational force. Such terms merely indicate the direction relative to the Z axis direction. In this specification, arrays in the X axis direction are referred to as "rows" and arrays in the Y axis direction are referred to as "columns" but the row and column directions are not limited thereto.

<Configuration of Imaging Element>

First, a configuration of the imaging element will be described with reference to FIGS. 1 to 22. The imaging element may be of a back-illuminated type or a front-illuminated type.

Figure 1:
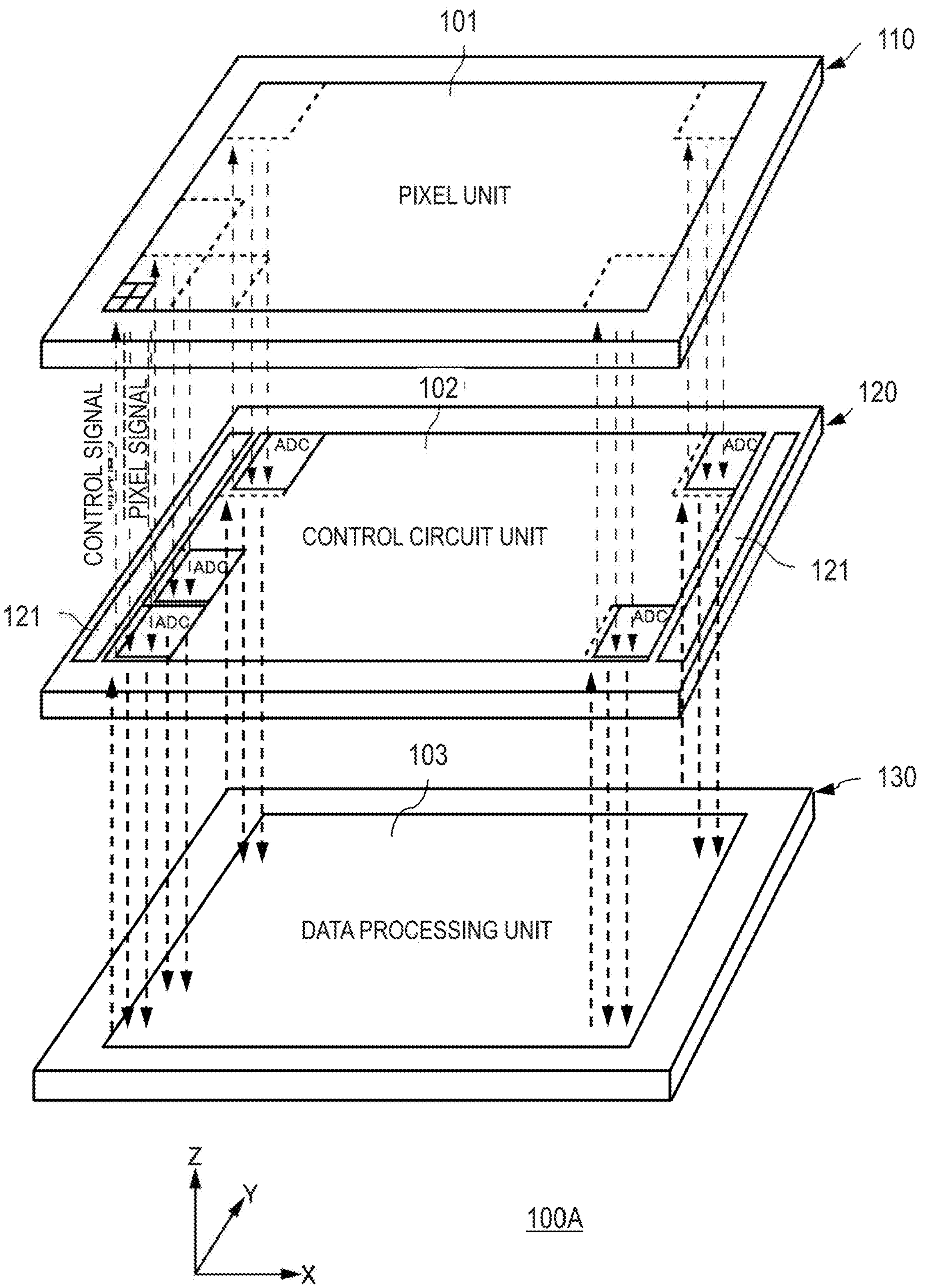
FIG. 1 is an exploded perspective view showing an example of an imaging element.

FIG. 1 is an exploded perspective view showing an example of an imaging element 100A. The imaging element 100A captures subjects. The imaging element 100A generates image data of the captured subject. The imaging element 100A includes a first semiconductor substrate 110, a second semiconductor substrate 120, and a third semiconductor substrate 130. As shown in FIG. 1, the first semiconductor substrate 110 is stacked on the second semiconductor substrate 120, and the second semiconductor substrate 120 is stacked on the third semiconductor substrate 130.

The first semiconductor substrate 110 has a pixel unit 101. The pixel unit 101 outputs pixel signals based on incident light.

The second semiconductor substrate 120 has a control circuit unit 102 and peripheral circuit units 121.

The control circuit unit 102 receives input of the pixel signals outputted from the first semiconductor substrate 110. The control circuit unit 102 processes the inputted pixel signals. The control circuit unit 102 is disposed at a position in the second semiconductor substrate 120 opposing the pixel unit 101. The control circuit unit 102 is disposed so as to overlap the pixel unit 101 in the direction in which the first semiconductor substrate 110 and the second semiconductor substrate 120 are stacked, for example. The control circuit unit 102 may output, to the pixel unit 101, a control signal for controlling the driving of the pixel unit 101.

The peripheral circuit units 121 control the driving of the control circuit unit 102. The peripheral circuit units 121 are disposed on the second semiconductor substrate 120 at positions in the periphery of the control circuit unit 102. Specifically, the peripheral circuit units 121 are disposed on the second semiconductor substrate 120 at regions arranged outside of the region where the control circuit unit 102 is disposed. Also, the peripheral circuit units 121 may be electrically connected to the first semiconductor substrate 110 and control the driving of the pixel unit 101. The peripheral circuit units 121 are disposed along two sides of the second semiconductor substrate 120, but the method for arranging the peripheral circuit units 121 is not limited to this example.

The third semiconductor substrate 130 has a data processing unit 103. The data processing unit 103 uses digital data outputted from the second semiconductor substrate 120 to perform addition, thinning, and other types of image processing.

Figure 2:
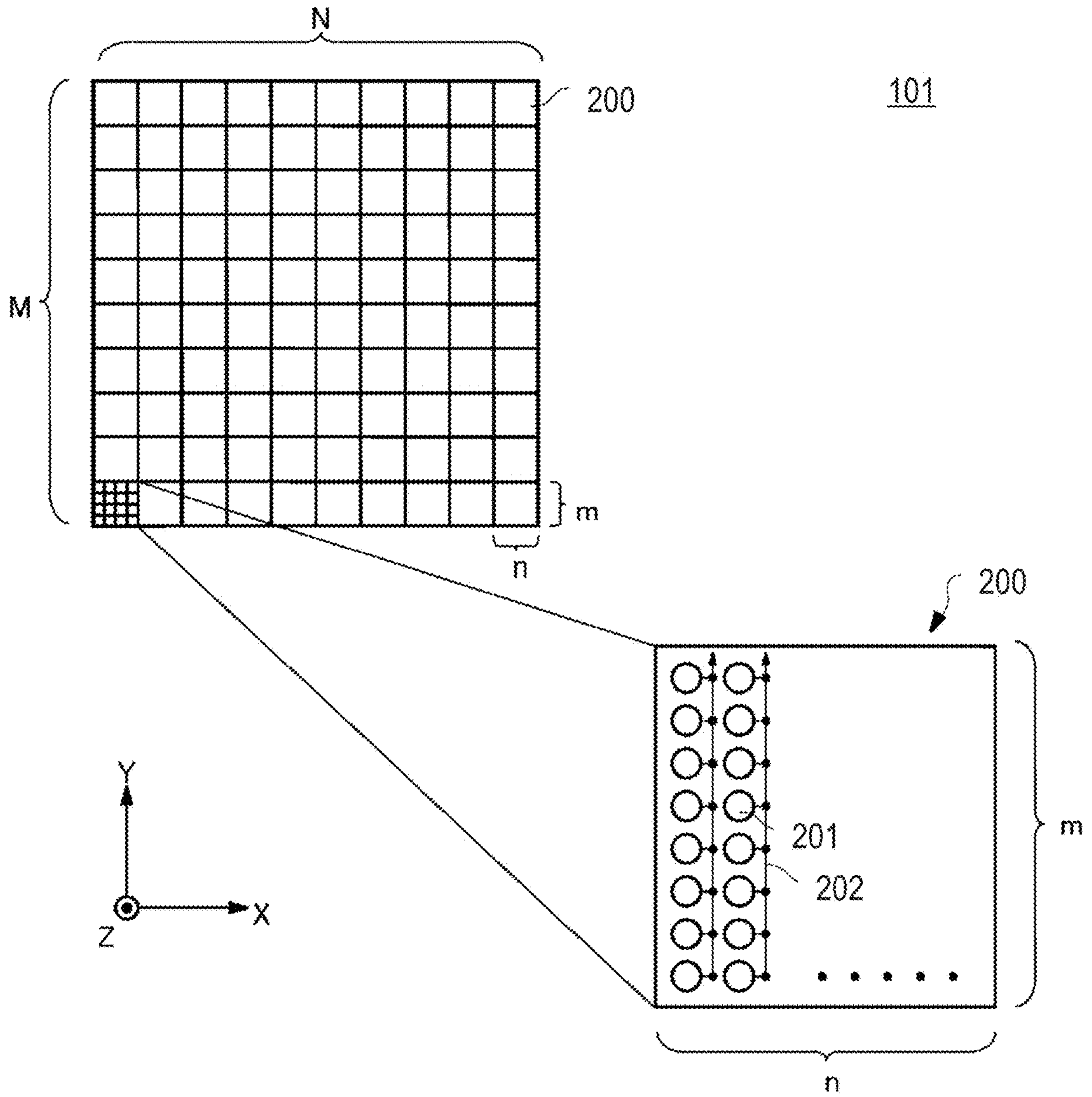
FIG. 2 is a descriptive view showing an example of a specific configuration of the pixel unit.

FIG. 2 is a descriptive view showing an example of a specific configuration of the pixel unit 101. The pixel unit 101 has a plurality of pixel blocks 200. The plurality of pixel blocks 200 are arranged in the row direction and the column direction of the pixel unit 101. Specifically, the plurality of pixel blocks 200 include M×N pixel blocks 200 (M and N being natural numbers) that are arranged in the row direction and the column direction of the pixel unit 101. In the example illustrated, M and N are equal, but M and N may differ from each other.

The pixel blocks 200 each have a plurality of pixels 201. The plurality of pixels 201 are arranged in the row direction and the column direction of the pixel block 200. The pixel blocks 200 include m×n pixels 201 (m and n being natural numbers) that are arranged in the row direction and the column direction. The pixel blocks 200 each include 16×16 pixels 201 that are arranged in the row direction and the column direction, for example. The number of pixels 201 per pixel block 200 is not limited thereto. In the example illustrated, m and n are equal, but m and n may differ from each other.

The pixel blocks 200 have the plurality of pixels 201, which are connected to the same control line (e.g., transfer control line 311, discharge control line 312 to be described later) in the row direction. The pixels 201 of the pixel blocks 200 are connected to the same control line so as to have set thereto the same exposure time. Specifically, for example, n pixels 201 arranged in the row direction are connected to the same control line.

Meanwhile, among different pixel blocks 200, one pixel block 200 may be set to a different exposure time than another pixel block 200. If, for example, one pixel block 200 and another pixel block 200 are arranged in the row direction, then the plurality of pixels 201 of the one pixel block 200 are connected to different control lines than the plurality of pixels 201 of the other pixel block 200. The plurality of pixels 201 in the mth row of the one pixel block 200 are all connected to a different control line than the control line to which the plurality of pixels 201 in the mth row of the other pixel block 200 are connected. Also, if one pixel block 200 and another pixel block 200 are arranged in the column direction, then the plurality of pixels 201 of the one pixel block 200 are connected to different control lines than the plurality of pixels 201 of the other pixel block 200. The plurality of pixels 201 in the mth row of the one pixel block 200 are all connected to a different control line than the control line to which the plurality of pixels 201 in the mth row of the other pixel block 200 are connected.

Also, if one pixel block 200 and another pixel block 200 are arranged in the row direction, for example, then the plurality of pixels 201 of the one pixel block 200 are connected to different signal lines 202 than the plurality of pixels 201 of the other pixel block 200. The plurality of pixels 201 in the nth column of the one pixel block 200 are all connected to a different signal line 202 than the signal line 202 to which the plurality of pixels 201 in the nth column of the other pixel block 200 are connected. Also, if one pixel block 200 and another pixel block 200 are arranged in the column direction, then the plurality of pixels 201 of the one pixel block 200 are connected to different signal lines 202 than the plurality of pixels 201 of the other pixel block 200. The plurality of pixels 201 in the nth column of the one pixel block 200 are all connected to a different signal line 202 than the signal line 202 to which the plurality of pixels 201 in the nth column of the other pixel block 200 are connected.

The pixel blocks 200 are disposed so as to correspond to control blocks 400A or 400B (see FIGS. 4 and 17) to be described later. That is, one pixel block 200 is arranged for each control block 400A or 400B.

Alternatively, a plurality of pixel blocks 200 may be arranged for each control block 400A or 400B. Even if a plurality of pixel blocks 200 are arranged for each control block 400A or 400B, different exposure times may be set for the respective pixel blocks 200. If two pixel blocks 200 arranged in the column direction are provided for each control block, then the control block 400A or 400B controls 2m×n pixels 201. Specifically, for example, the control block 400A or 400B controls 32×16 pixels 201. The number of pixels 201 per control block 400A or 400B is not limited thereto.

Figure 3:
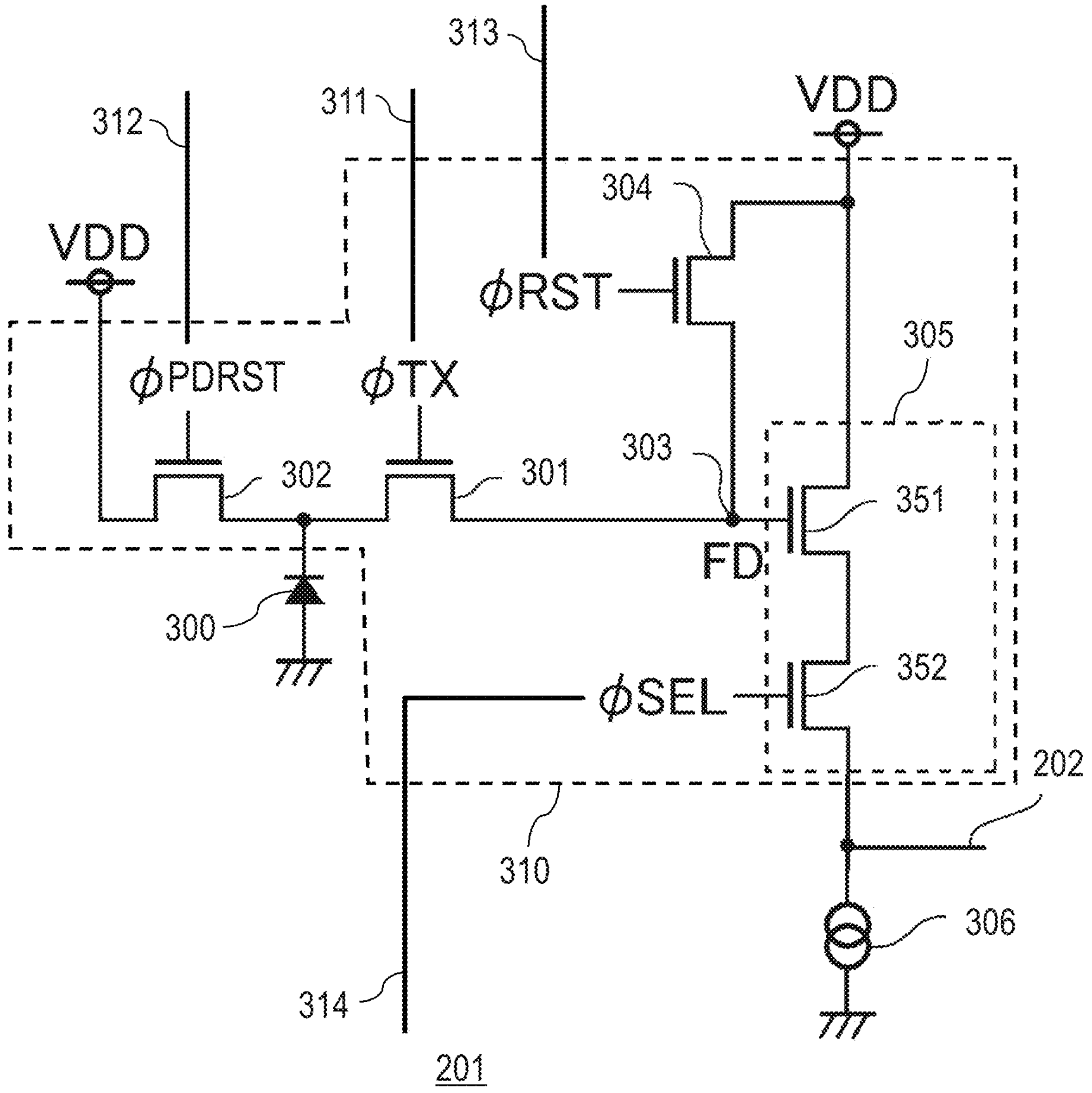
FIG. 3 is a circuit diagram showing an example of a circuit configuration of the pixel.

FIG. 3 is a circuit diagram showing an example of a circuit configuration of the pixel 201. The pixel 201 includes a photoelectric conversion unit 300 and a read unit 310. The read unit 310 has a transfer unit 301, a discharge unit 302, a floating diffusion (FD) 303, a reset unit 304, and a pixel output unit 305, and reads a pixel signal based on an electric charge yielded by conversion by the photoelectric conversion unit 300 to the signal line 202. The pixel output unit 305 has an amplification unit 351 and a selection unit 352. The transfer unit 301, the discharge unit 302, the FD 303, the reset unit 304, the amplification unit 351, and the selection unit 352 are collectively referred to as the read unit 310. The read unit 310 is described as an N-channel FET, but the transistor type is not limited thereto.

The photoelectric conversion unit 300 has a photoelectric conversion function for converting light to electric charge. The photoelectric conversion unit 300 accumulates an electric charge yielded by photoelectric conversion. The photoelectric conversion unit 300 is constituted of a photodiode, for example.

The transfer unit 301 transfers the electric charge of the photoelectric conversion unit 300 to the FD 303. The transfer unit 301 controls the electric connection between the photoelectric conversion unit 300 and the FD 303. The transfer unit 301 is constituted of a transistor, for example. The transfer unit 301 has at least a gate terminal, and may be an element constituting a portion of a transistor where a portion of the photoelectric conversion unit 300 serves as the source terminal and a portion of the FD 303 serves as the drain terminal. The gate terminal of the transfer unit 301 is connected to a transfer control line 311 for receiving input of a transfer control signal φTX. The transfer control line 311 will be described later.

The discharge unit 302 discharges the electric charge accumulated in the photoelectric conversion unit 300 to a power source line to which a power source voltage VDD is supplied. The discharge unit 302 controls the connection between the photoelectric conversion unit 300 and the power source line. The discharge unit 302 is constituted of a transistor, for example. The discharge unit 302 has at least a gate terminal, and may be an element constituting a portion of a transistor where a portion of the photoelectric conversion unit 300 serves as the source terminal and a portion of a diffusion region connected to the power source line serves as the drain terminal. The gate terminal of the discharge unit 302 is connected to a discharge control line 312 for receiving input of a discharge control signal φPDRST. The discharge unit 302 has been described as discharging the electric charge of the photoelectric conversion unit 300 to the power source line to which the power source voltage VDD is supplied, but may instead discharge the electric charge to a power source line to which a power source voltage differing from the power source voltage VDD is supplied.

The FD 303 is transferred from the transfer unit 301 to the photoelectric conversion unit 300. The FD 303 accumulates the electric charge transferred from the photoelectric conversion unit 300.

The reset unit 304 discharges the electric charge accumulated in the FD 303 to the power source line to which the power source voltage VDD is supplied. The reset unit 304 resets the potential of the FD 303 to the power source voltage VDD, which is the reference potential. The reset unit 304 controls the electric connection between FD 303 and the power source line. The reset unit 304 is constituted of a transistor, for example. The reset unit 304 has at least a gate terminal, and may be an element constituting a portion of a transistor where a portion of the FD 303 serves as the source terminal and a portion of a diffusion region connected to the power source line serves as the drain terminal. The gate terminal of the reset unit 304 is connected to a reset control line 313 for receiving input of a reset control signal φRST. The reset control line 313 will be described later.

The pixel output unit 305 outputs a pixel signal based on the potential of the FD 303 to the signal line 202. The pixel output unit 305 has an amplification unit 351 and a selection unit 352. The amplification unit 351 is constituted of a transistor. In the amplification unit 351, the gate terminal is connected to the FD 303, the drain terminal is connected to the power source line to which the power source voltage VDD is supplied, and the source terminal is connected to the drain terminal of the selection unit 352.

The selection unit 352 controls the electric connection between the pixel 201 and the signal line 202. When the selection unit 352 causes the pixel 201 to be connected to the signal line 202, the pixel signal is outputted from the pixel 201 to the signal line 202. The selection unit 352 is constituted of a transistor. The selection unit 352 has at least a gate terminal, and may be an element constituting a portion of a transistor where a portion of the amplification unit 351 serves as the source terminal and a portion of a diffusion region connected to the signal line 202 serves as the drain terminal. The gate terminal of the selection unit 352 is connected to a selection control line 314 for receiving input of a selection control signal φSEL and that spans a plurality of pixel blocks 200. The source terminal of the selection unit 352 is connected to a load current source 306.

The load current source 306 is connected to the signal line 202 and supplies a current for reading the pixel signal from the pixel 201. As a result, it is possible to stabilize the operation of the amplification unit 351. Also, the load current source 306 is connected to the signal line 202. The load current source 306 may be provided to the first semiconductor substrate 110 or to the second semiconductor substrate 120.

Also, the FD 303 may share the pixel output unit 305 with another pixel 201. The FD 303 and the pixel output unit 305 may be shared among a plurality of pixels 201 arranged in the row direction or the column direction, for example. Also, the pixel 201 may be constituted of a plurality of photoelectric conversion units 300 and the transfer unit 301.

Figure 4:
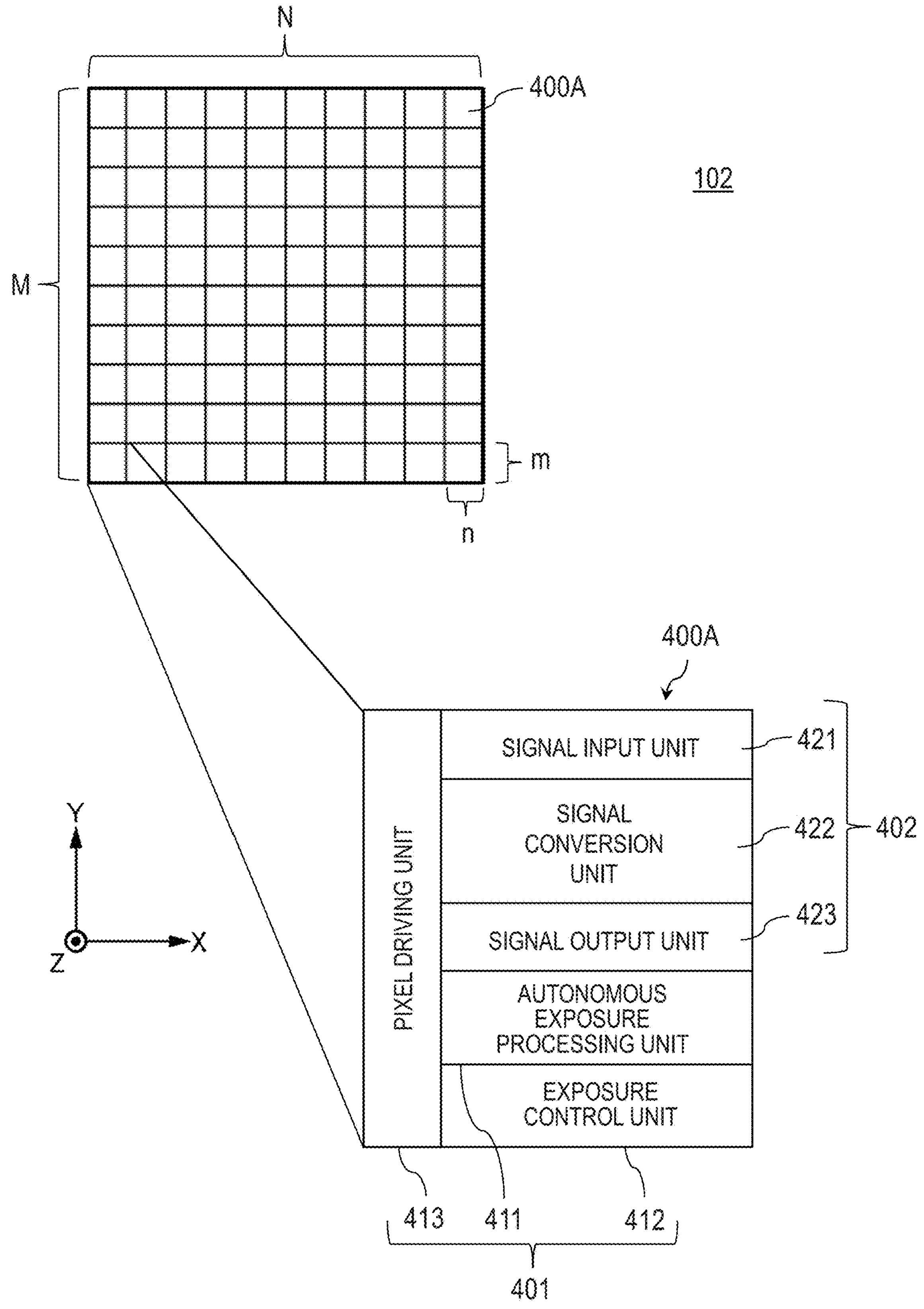
FIG. 4 is a descriptive view showing an example of a specific configuration of the control circuit unit.

FIG. 4 is a descriptive view showing an example of a specific configuration of the control circuit unit 102. The control circuit unit 102 has a plurality of control blocks 400A. The plurality of control blocks 400A are arranged in the row direction and the column direction of the control circuit unit 102. Specifically, the control circuit unit 102 has M×N control blocks 400A. If one pixel block 200 is arranged for each control block 400A, the control circuit unit 102 has the control block 400A directly below the pixel block 200. The one pixel block 200 and the one control block 400A are the same shape and size. Also, if a plurality of pixel blocks 200 aligned in the column direction are arranged for each control block 400A, the control circuit unit 102 has one control block 400A directly below the plurality of pixel blocks 200 arranged in the column direction.

The control block 400A is provided so as to correspond to the pixel block 200. As one example of the relationship between the control block and the pixel block, the control block 400A is disposed directly below the pixel block 200 in the direction in which the first semiconductor substrate 110 and the second semiconductor substrate 120 are stacked (lamination direction), for example. Also, the control block 400A is electrically connected to the pixel block 200 via the signal line 202, the transfer control line 311, and the discharge control line 312. Specifically, the control block 400A positioned directly below the pixel block 200 in the lamination direction is electrically connected to the pixel block 200 directly thereabove (hereinafter referred to as the corresponding pixel block 200) via local control lines such as the transfer control line 311 and the discharge control line 312. Also, the control block 400A receives input of the pixel signal outputted from the pixel 201 of the corresponding pixel block 200 via the signal line 202.

The control block 400A controls the driving of the corresponding pixel block 200. The control block 400A controls the exposure time of the pixel 201 included in the corresponding pixel block 200, for example. Also, the control block 400A has a signal processing unit 402 that processes the inputted signal and processes the pixel signal outputted from the pixel 201 included in the corresponding pixel block 200. The control block 400A converts the analog pixel signal outputted from the pixel 201 included in the corresponding pixel block 200 to a digital signal, for example.

The control block 400A has a pixel control unit 401 and the signal processing unit 402. The pixel control unit 401 has an autonomous exposure processing unit 411, an exposure control unit 412, and a pixel driving unit 413, and controls the pixels 201 of the pixel unit 101. The signal processing unit 402 has a signal input unit 421, a signal conversion unit 422, and a signal output unit 423, converts the analog pixel signals from the pixel unit 101 into digital signals, and transfers the resultant digital signals to the pixel control unit 401 and the data processing unit 103.

The autonomous exposure processing unit 411 is a circuit that calculates the exposure time of the pixels 201 included in the corresponding pixel block 200 on the basis of the pixel signals converted to digital signals by the signal processing unit 402. Details regarding the autonomous exposure processing unit 411 will be described later.

The exposure control unit 412 is a circuit that controls the exposure of the pixels 201 included in the corresponding pixel block 200 on the basis of the exposure time calculated by the autonomous exposure processing unit 411. Specifically, the exposure control unit 412 generates a control signal for controlling the exposure time of the pixels 201 included in the corresponding pixel block 200 (the charge accumulation time of the photoelectric conversion unit 300). The exposure control unit 412 adjusts the start timing or the end timing for exposure of the pixels 201 included in the corresponding pixel block 200 to control the exposure time of each pixel block 200, for example. The exposure control unit 412 is provided so as to be elongated in the row direction in the control block 400A.

The pixel driving unit 413 outputs the control signal generated by the exposure control unit 412 to the pixels 201 included in the corresponding pixel block 200. The pixel driving unit 413 is a driver circuit that drives the pixels 201 included in the corresponding pixel block 200. The pixel driving unit 413 drives the pixels 201 of a selected pixel row among the pixels 201 included in the corresponding pixel block 200. The pixel driving unit 413 is provided so as to extend in the column direction. As a result, the pixel driving unit 413 is disposed at a position corresponding to m pixels 201 arranged in the column direction. The autonomous exposure processing unit 411, the exposure control unit 412, and the pixel driving unit 413 are arranged in an L-shape in the control block 400A, where the pixel driving unit 413 extends in the column direction, and the autonomous exposure processing unit 411 and the exposure control unit 412 extend in the row direction.

The signal input unit 421 receives input of pixel signals outputted from the pixels 201 included in the corresponding pixel block 200. The signal input unit 421 outputs the inputted pixel signals to the signal conversion unit 422. The signal input unit 421 may be provided for each of the n pixels 201 arranged in the row direction in the corresponding pixel block 200. The signal input unit 421 may have a processing circuit that performs signal processing such as noise removal on the pixel signals outputted from the first semiconductor substrate 110. Also, the signal input unit 421 may have a voltage adjustment circuit that adjusts the voltage of the signal line 202 connected to the pixels 201 included in the corresponding pixel block 200 so as not to reach a prescribed value or less. If disposed on the second semiconductor substrate, the load current source 306 may be disposed in the signal input unit 421 included in the corresponding control block 400A.

The signal conversion unit 422 converts the pixel signals outputted from the signal input unit 421 into digital signals. The signal conversion unit 422 sequentially converts the pixel signals outputted respectively from the m pixels 201 arranged in the column direction in the corresponding pixel block 200 into digital signals. The signal conversion unit 422 converts, in a parallel fashion, the pixel signals outputted from the pixels 201 arranged in n columns in the row direction of the corresponding pixel block 200 into digital signals.

The signal output unit 423 stores the pixel signals converted by the signal conversion unit 422 into digital signals. The signal output unit 423 may have a latch circuit for storing the digital signals. The signal output unit 423 is disposed between the signal conversion unit 422 and the autonomous exposure processing unit 411 in the column direction. The signal output unit 423 outputs the pixel signals converted into digital signals to the outside of the control circuit unit 102. The signal output unit 423 is provided so as to extend in the row direction of the control block 400A. The signal output unit 423 is disposed between the signal conversion unit 422 and the autonomous exposure processing unit 411 in the column direction.

Figure 5:
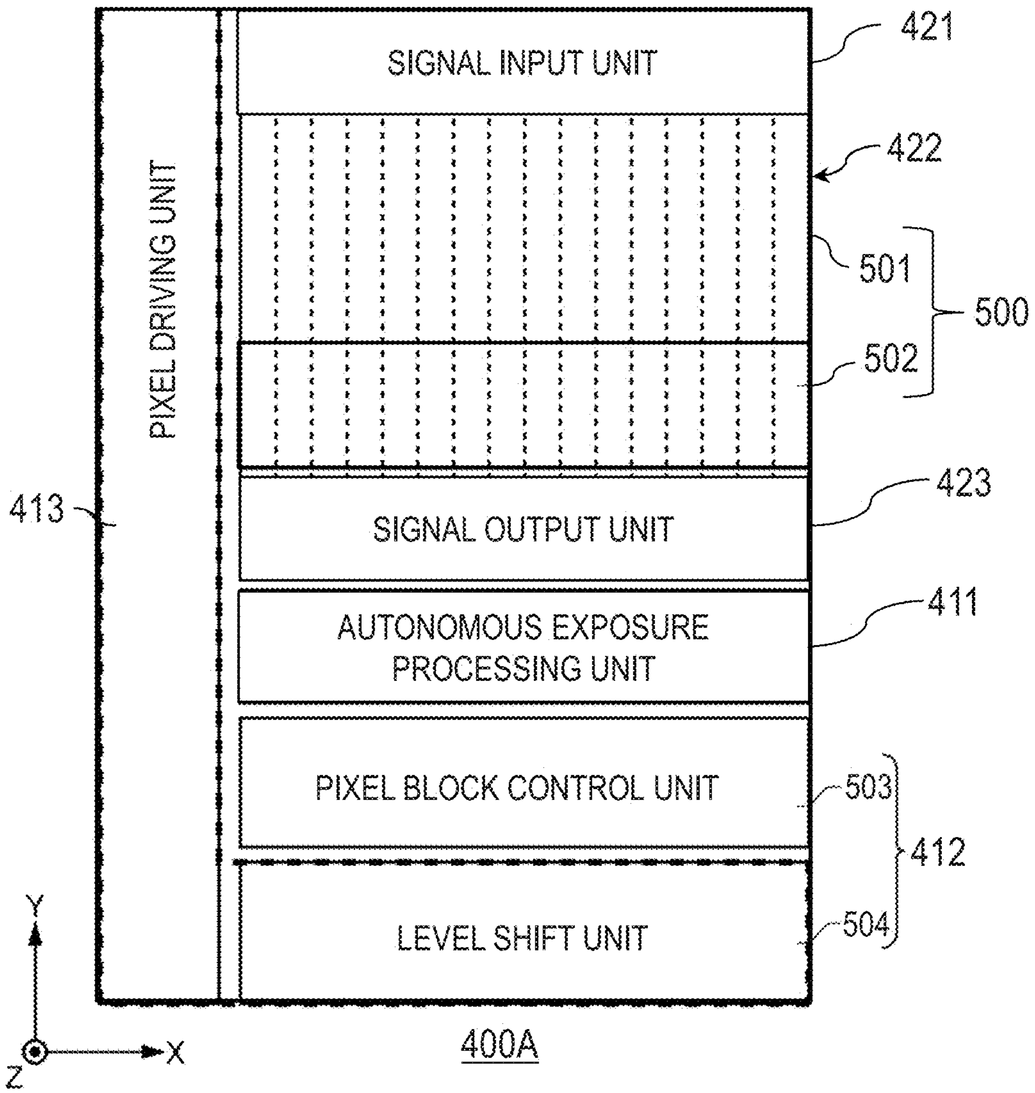
FIG. 5 is a descriptive view showing an example of an internal configuration of the control block.

FIG. 5 is a descriptive view showing an example of an internal configuration of the control block 400A. The signal conversion unit 422 includes n comparators 501 and n storage units 502. The exposure control unit 412 includes a pixel block control unit 503 and a level shift unit 504. A combination of one comparator 501 and a storage unit 502 connected to the comparator 501 constitutes one analog-to-digital converter (ADC) 500.

The comparator 501 is provided so as to extend in the column direction of the control block 400A. The n comparators 501 are arranged in the row direction. The comparators 501 are arranged for each of the m pixels 201 arranged in the column direction in the corresponding pixel block 200. The comparators 501 sequentially read the pixel signals of the m pixels 201 arranged in the column direction in the corresponding pixel block 200 and convert the pixel signals into digital signals.

The storage unit 502 stores the pixel signals converted into digital signals by using the comparator 501. The storage unit 502 is provided in the signal conversion unit 422 on the load side further in the Y axis direction than the comparator 501. The storage unit 502 has a latch circuit, for example. The storage unit 502 may have a memory constituted of an SRAM or the like.

The pixel block control unit 503 controls the operation of the transfer units 301 and the discharge units 302 of the pixels 201 included in the corresponding pixel block 200. Specifically, the pixel block control unit 503 outputs the transfer control signal φTX for controlling the transfer units 301 of the pixels 201 included in the corresponding pixel block 200 and the discharge control signal φPDRST for controlling the discharge units 302 of the pixels 201 included in the corresponding pixel block 200. The pixel block control unit 503 is provided so as to extend in the row direction in the control block 400A. The pixel block control unit 503 is disposed between the level shift unit 504 and the autonomous exposure processing unit 411 in the column direction.

The level shift unit 504 adjusts the voltage level of the control signals outputted from the pixel block control unit 503. Specifically, the level shift unit 504 raises the voltage level of the transfer control signal φTX outputted from the pixel block control unit 503. Also, the level shift unit 504 raises the voltage level of the discharge control signal φPDRST outputted from the pixel block control unit 503.

The transfer unit 301 receives, via the transfer control line 311, input of the transfer control signal φTX, the voltage of which was raised by the pixel block control unit 503. Also, the discharge unit 302 receives, via the discharge control line 312, the discharge control signal φPDRST, the voltage of which was raised by the pixel block control unit 503.

In this manner, the pixel block control unit 503 raises the voltages of the transfer control signal φTX and the discharge control signal φPDRST so as to reach voltage levels used by the transfer units 301 and the discharge units 302 of the read units 310 of the pixels 201. The level shift unit 504 is provided so as to extend in the row direction of the control block 400A.

The level shift unit 504 is provided further to the outer periphery of the control block 400A than the pixel block control unit 503. The edge on the positive side in the X axis direction of the level shift unit 504 and the edge on the negative side in the Y axis direction are positioned furthest to the outside of the control block 400A. The edge on the negative side in the X axis direction of the level shift unit 504 is in contact with the pixel driving unit 413.

The level shift unit 504 and the pixel driving unit 413 handle the signals subjected to level shifting. Meanwhile, the autonomous exposure processing unit 411, the pixel block control unit 503, the level shift unit 504, and the pixel driving unit 413 handle pixel signals outputted from the first semiconductor substrate 110.

Here, the components of the control block 400A are formed in well regions provided in the second semiconductor substrate 120. The well regions are provided separately according to the voltage level of the signal handled. The well regions are divided by whether the power source used thereby is a digital power source or an analog power source. Also, even if the signal conversion unit 422 uses the same analog power source, the signal conversion unit 422 is sometimes separated from regions that use another analog power source from the perspective of noise prevention. The separation of the well regions requires a well separation region with a gap based on manufacturing process rules.

The control block 400A separates the well region forming the level shift unit 504 and the pixel driving unit 413 from other well regions. The level shift unit 504 and the pixel driving unit 413 are arranged in an L shape, for example, thereby enabling the sharing of a well region between the level shift unit 504 and the pixel driving unit 413. As a result of sharing the well region, it is possible to omit a well separation region, thereby improving layout efficiency.

The L-shaped pixel control unit 401 constitutes a portion of the outer periphery of the control block 400A. As a result, it is possible to share a well region with another control block 400A that is adjacent thereto in the row direction and the column direction.

Figure 6:
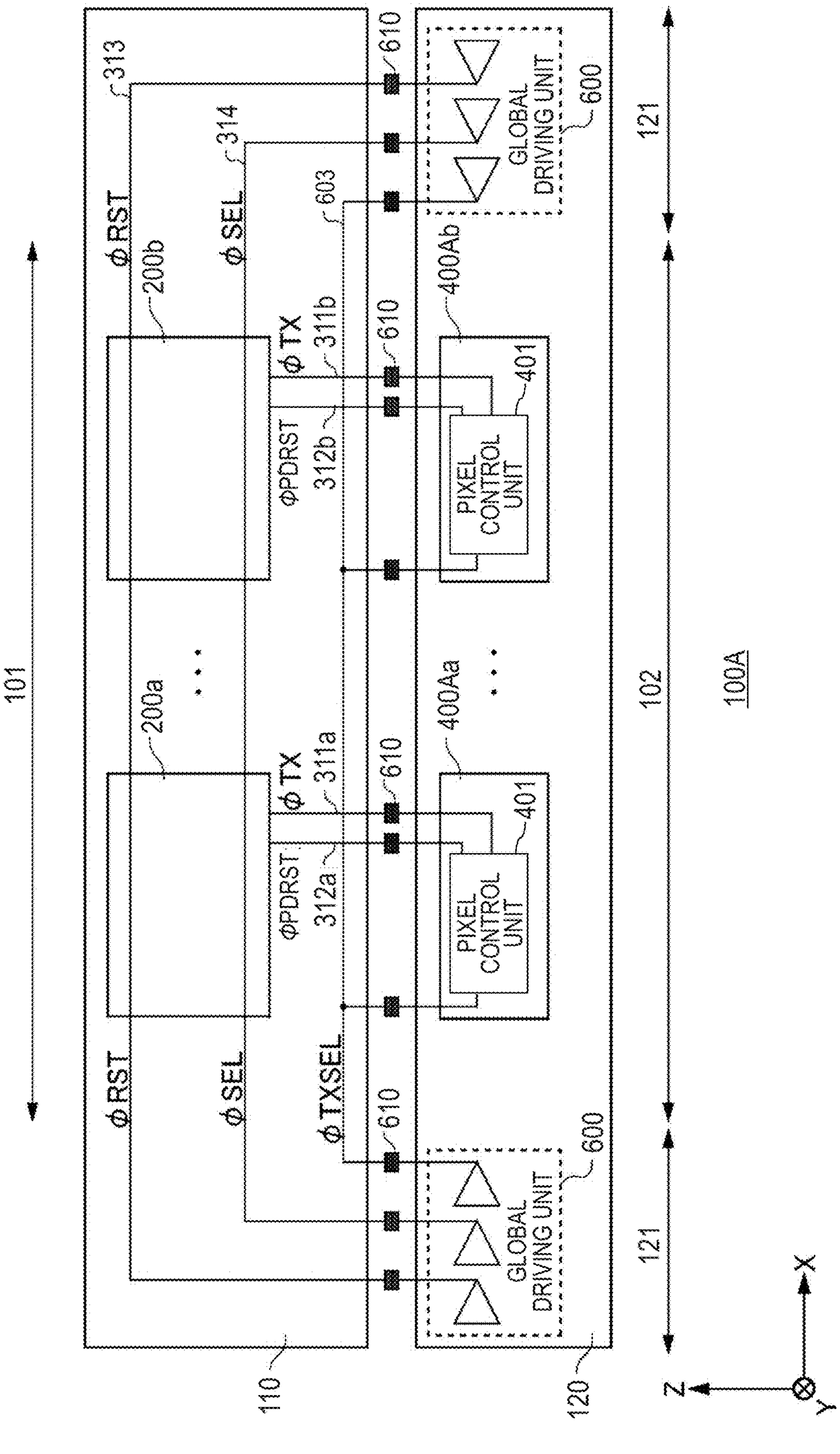
FIG. 6 is a descriptive view showing a transmission example for signals between the first semiconductor substrate and the second semiconductor substrate 120 in the imaging element.

FIG. 6 is a descriptive view showing a transmission example for signals between the first semiconductor substrate 110 and the second semiconductor substrate 120 in the imaging element 100A. Global driving units 600 are provided at the peripheral circuit units 121 that sandwich the control circuit unit 102 from both ends thereof.

A transfer control line 311*a* and a discharge control line 312*a* are respectively connected to the pixels 201 included in a pixel block 200*a*. The transfer control line 311*a* is connected to the gate terminals of the transfer units 301 of the pixels 201 included in the pixel block 200*a*, and the discharge control line 312*a* is connected to the gate terminals of the discharge control line 302 of the pixels 201 included in the pixel block 200*a*. The transfer control line 311*a* supplies the transfer control signal φTX outputted from a control block 400Aa to the transfer units 301 of the pixels 201 included in the pixel block 200*a*. The discharge control line 312*a* supplies the discharge control signal φPDRST outputted from the control block 400Aa to the discharge units 302 of the pixels 201 included in the pixel block 200*a*.

Similarly, a transfer control line 311*b* and a discharge control line 312*b* are respectively connected to the pixels 201 included in a pixel block 200*b*. The transfer control line 311*b* is connected to the gate terminals of the transfer units 301 of the pixels 201 included in the pixel block 200*b*, and the discharge control line 312*b* is connected to the gate terminals of the discharge control line 302 of the pixels 201 included in the pixel block 200*b*. The transfer control line 311*b* supplies the transfer control signal φTX outputted from a control block 400Ab to the transfer units 301 of the pixels 201 included in the pixel block 200*b*. The discharge control line 312*b* supplies the discharge control signal φPDRST outputted from the control block 400Ab to the discharge units 302 of the pixels 201 included in the pixel block 200*b*.

If not distinguishing between the transfer control lines 311*a* and 311*b*, the transfer control lines are collectively referred to as the transfer control lines 311. If not distinguishing between the discharge control lines 312*a* and 312*b*, the discharge control lines are collectively referred to as the discharge control lines 312.

The transfer control lines 311 and the discharge control lines 312 are examples of local control lines connected to first pixels of the pixel block 200. The transfer control lines 311 and the discharge control lines 312 are connected to the same n pixels 201 arranged in the row direction in the pixel block 200.

The global driving unit 600 outputs a reset control signal φRST, a selection control signal φSEL, and a transfer selection control signal φTXSEL. The global driving unit 600 is connected to the reset control line 313, the selection control line 314, and a transfer selection control line 603 that output control signals to the respective pixel blocks 200.

The global driving unit 600 supplies the reset control signal φRST and the selection control signal φSEL to the plurality of pixel blocks 200 via the reset control line 313 and the selection control line 314. The global driving unit 600 supplies the transfer selection control signal φTXSEL to the plurality of control blocks 400A via the transfer selection control line 603.

The transfer selection control signal φTXSEL is supplied from the global driving unit 600 to the control block 400A in order to control the exposure time for each pixel block 200. The control block 400A to which the transfer selection control signal φTXSEL was supplied outputs the transfer selection control signal φTXSEL to the corresponding pixel block 200. The control block 400A determines whether to input, to the pixels 201, the transfer selection control signal φTXSEL as the transfer control signal φTX or the discharge control signal φPDRST. As a result, the input of the transfer control signal φTX or the discharge control signal φPDRST to the pixels 201 is skipped.

If the transfer control signal φTX determines the end time for exposure, for example, then the control block 400A extends the exposure time by skipping the transfer control signal φTX. If the transfer control signal φTX determines the start time for exposure, then the control block 400A can shorten the exposure time by skipping the transfer control signal φTX. In this manner, the transfer selection control signal φTXSEL can be used to adjust the exposure time of the pixel block 200. This similar applies to cases in which the discharge control signal φPDRST determines the start time or the end time for exposure.

The reset control line 313, the selection control line 314, and the transfer selection control line 603 are shared by the plurality of pixel blocks 200. The reset control line 313, the selection control line 314, and the transfer selection control line 603 are wired so as to cross the first semiconductor substrate 110 in the row direction. The reset control line 313, the selection control line 314, and the transfer selection control line 603 may alternatively be wired so as to cross the first semiconductor substrate 110 in the column direction.

The reset control line 313 is connected to the gate terminals of the reset units 304 of the pixels 201 in the pixel block 200 and supply thereto the reset control signal φRST. The selection control line 314 is connected to the gate terminals of the selection units 352 of the pixels 201 in the pixel block 200 and supply thereto the selection control signal φSEL. The transfer selection control line 603 is connected to the plurality of control blocks 400A and supplies the transfer selection control signal φTXSEL to the pixel control unit 401.

The global driving unit 600 outputs the transfer selection control signal φTXSEL from the second semiconductor substrate 120 to the control block 400A via the first semiconductor substrate 110, but may output the transfer selection control signal φTXSEL to the control block 400A without passing through the first semiconductor substrate 110. In this case, the transfer selection control line 603 is provided to the second semiconductor substrate 120.

Junction units 610 are provided at a junction surface at which the first semiconductor substrate 110 and the second semiconductor substrate 120 are joined. The junction units 610 match the positions of the transfer control line 311, the discharge control line 312, and the transfer selection control line 603 between the first semiconductor substrate 110 and the second semiconductor substrate 120. The junction units 610 are each constituted of a pair of conductive junction pads, are joined by a pressurization treatment or the like between the first semiconductor substrate 110 and the second semiconductor substrate 120, and are electrically connected to each other.

The imaging element 100A changes the timing of the transfer unit 301 and/or the discharge unit 302 using local control lines such as the transfer control line 311 and the discharge control line 312, thereby controlling the exposure time for each pixel block 200. The imaging element 100A can control the exposure time with fewer control lines by combining local control lines such as the transfer control line 311 and the discharge control line 312 with global control lines such as the reset control line 313, the selection control line 314, and the transfer selection control line 603.

Figure 7:
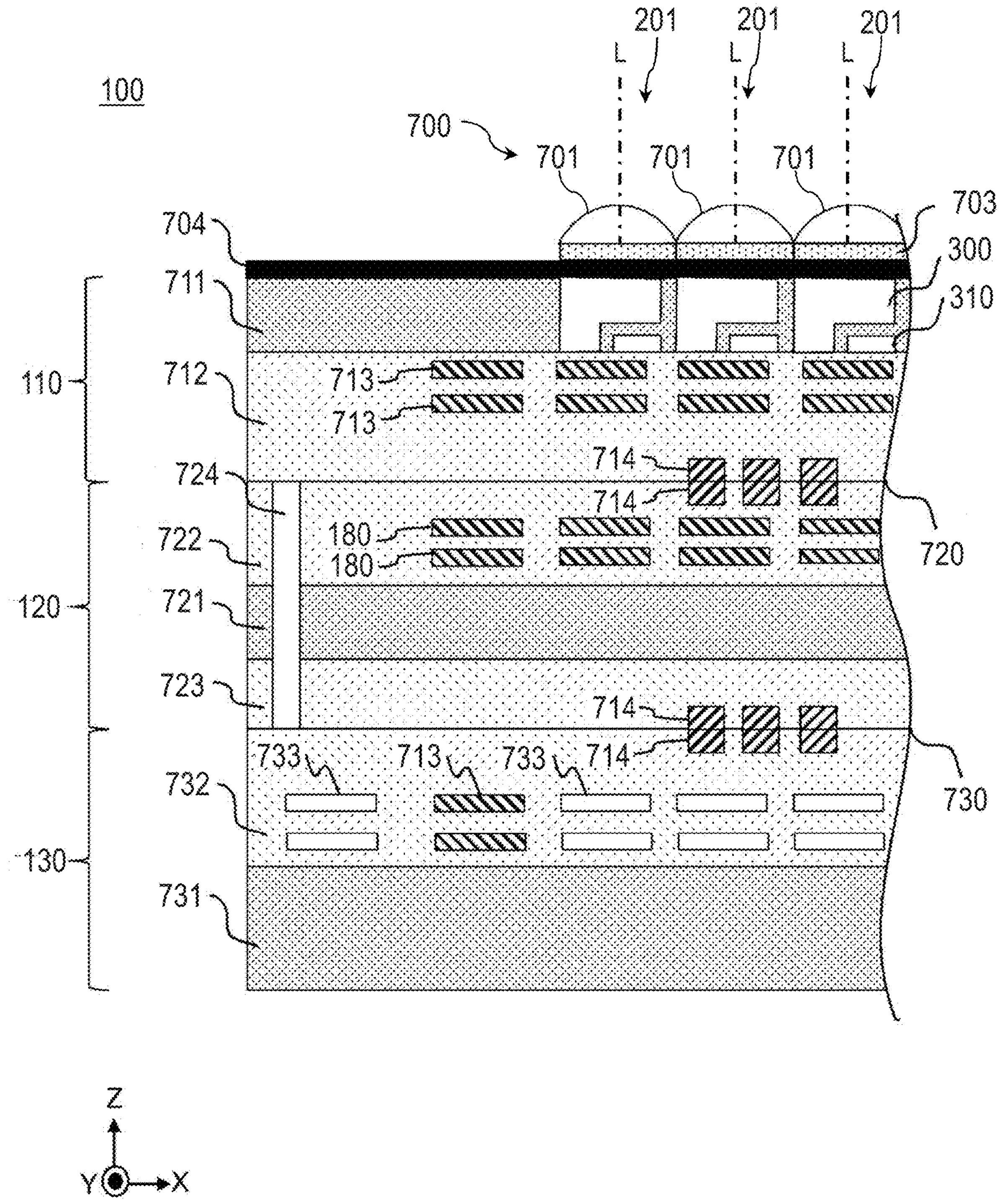
FIG. 7 is a descriptive view showing an example of an X-Z cross section of the imaging element according to the present embodiment.

FIG. 7 is a descriptive view showing an example of an X-Z cross section of the imaging element 100A according to the present embodiment. In FIG. 7, a back-illuminated imaging element 100A is shown, but the imaging element 100A is not limited to being of a back-illuminated type. The imaging element 100A includes a microlens layer 700, a color filter layer 702, the first semiconductor substrate 110, the second semiconductor substrate 120, and the third semiconductor substrate 130. As shown, light from the subject enters via the direction indicated by the white arrows (the negative Z axis direction in the drawing). The side of the first semiconductor substrate 110 at which the light enters (the positive Z axis side in the drawing) is sometimes referred to as the front surface, and the side opposite thereto (the negative Z axis side in the drawing) is sometimes referred to as the rear surface.

The microlens layer 700 has a plurality of microlenses 701. The plurality of microlenses 701 are layered on the positive Z axis side of the color filter layer 702. Light enters the microlenses 701. The microlenses 701 condense the incident light onto the photoelectric conversion units 300. The microlens 701 may be provided for each photoelectric conversion unit 300. The optical axis L of the microlens 701 is the lamination direction (direction parallel to the Z axis) of the first semiconductor substrate 110, the second semiconductor substrate 120, and the third semiconductor substrate 130.

The color filter layer 702 has a plurality of color filters 703 and a passivation film 704. The color filter layer 702 is stacked on the positive Z axis side of a first semiconductor layer 711. The color filters 703 are optical filters that allow through light in specific wavelength regions. The color filters 703 are optical filters having specific spectral characteristics. The plurality of color filters 703 have a plurality of optical filters with differing spectral characteristics, and allow through light of different wavelength regions from each other. The plurality of color filters 703 are provided in a specific arrangement (e.g., a Bayer array).

An example of the first semiconductor substrate 110 is a back-illuminated CMOS image sensor. The first semiconductor substrate 110 has the first semiconductor layer 711 and a first wiring layer 712. The first semiconductor layer 711 is provided on the positive Z axis side of the first wiring layer 712. The first semiconductor layer 711 has a plurality of pixel blocks 200 that are arranged in two dimensions: the row direction and the column direction. The first semiconductor layer 711 has the plurality of pixels 201 that are arranged in two dimensions: the row direction and the column direction. The plurality of pixels 201 have, respectively, the plurality of photoelectric conversion units 300 that accumulate an electric charge on the basis of the incident light, and the plurality of read units 310.

The first wiring layer 712 is provided on the second semiconductor substrate 120 side of the first semiconductor layer 711 (the negative Z axis side in the drawing). The first wiring layer 712 has a plurality of wiring lines 713 made of a conductive film (metal film), a plurality of junction pads 714, and an insulating film (insulating layer).

The first wiring layer 712 has the plurality of wiring lines 713 that are electrically connected to a power source, a circuit, or the like. In the first semiconductor substrate 110, the wiring lines 713 are specifically a power source line to which a prescribed power source voltage is supplied, the signal line 202 that transfers pixel signals from the first semiconductor substrate 110 (pixels) to the second semiconductor substrate 120, the transfer control line 311 that transfers the control signal from the second semiconductor substrate 120 to the first semiconductor substrate 110 (pixels), the discharge control line 312, the reset control line 313, the selection control line 314, and the transfer selection control line 603, for example. The first wiring layer 712 may be multiple layers, and may be provided with a passive element and an active element.

The junction pad 714 is provided to the surface of the first wiring layer 712 (the surface on the negative Z axis side) and the wiring line 713. As will be described later, the junction pad 714 is used to aid the connection between layers. The junction pad 714 is made of an electrically conductive material such as copper, for example. Alternatively, the junction pad 714 may be made of gold, silver, or aluminum. An insulating layer (insulating film) is formed between the plurality of wiring lines 713 and between the plurality of junction pads 714.

The second semiconductor substrate 120 has a second semiconductor layer 721, a second wiring layer 722, and a wiring layer 723. The second wiring layer 722 is provided on the first semiconductor substrate 110 side of the second semiconductor layer 721 (the positive Z axis side in the drawing). The wiring layer 723 is provided on the third semiconductor substrate 130 side of the second semiconductor layer 721 (the negative Z axis side in the drawing), and is provided between the second semiconductor layer 721 and the third semiconductor substrate 130. The second semiconductor layer 721 has the control circuit unit 102 and the peripheral circuit units 121. The control circuit unit 102 has the plurality of control blocks 400A that are arranged in two dimensions: the row direction and the column direction.

Similar to the first semiconductor substrate 110, the second semiconductor substrate 120 has the plurality of wiring lines 713 provided in the second wiring layer 722, the plurality of junction pads 714 provided in the second wiring layer 722 and the wiring layer 723, and the insulating film (insulating layer) provided on the second wiring layer 722 and the wiring layer 723.

The second wiring layer 722 has the plurality of wiring lines 713 and junction pads 714 in order to be electrically connected to a power source, a circuit, or the like, to transmit signals from the pixel unit 101 to the control circuit unit 102, and to transmit signals from the control circuit unit 102 to the pixel unit 101. In the second semiconductor substrate 120, the wiring lines 713 are specifically a power source line to which a prescribed power source voltage is supplied, the signal line 202 that transfers pixel signals from the first semiconductor substrate 110 (pixels) to the second semiconductor substrate 120, the transfer control line 311 that transfers the control signal from the second semiconductor substrate 120 to the first semiconductor substrate 110 (pixels), the discharge control line 312, the reset control line 313, the selection control line 314, and the transfer selection control line 603, for example. The second wiring layer 722 may be multiple layers, and may be provided with a passive element and an active element. The wiring lines 713 and the junction pads 714 may be further provided in the wiring layer 723.

The second semiconductor substrate 120 further has a through-silicon via (TSV) 724 that connects the circuits provided on the front and rear surfaces thereof. It is preferable that the TSV 724 be provided in a peripheral region. The TSV 724 transmits image data and the like generated by the data processing unit 103 to the first semiconductor substrate 110. The TSV 724 may be provided to the first semiconductor substrate 110 and to the third semiconductor substrate 130.

The third semiconductor substrate 130 has a third semiconductor layer 731 provided with the data processing unit 103, and a third wiring layer 732. The third wiring layer 732 is provided between the first semiconductor layer 731 and the second semiconductor substrate 120.

Similar to the first semiconductor substrate 110, the third semiconductor substrate 130 has the wiring lines 713 and the plurality of junction pads 714 provided in the third wiring layer 732. The third wiring layer 732 has the plurality of wiring lines 713 and junction pads 714 in order to be electrically connected to a power source, a circuit, or the like, to transmit signals from the control circuit unit 102 to the data processing unit 103, and to transmit the signals from the data processing unit 103 to the control circuit unit 102 of the second semiconductor substrate 120.

The first semiconductor substrate 110, the second semiconductor substrate 120, and the third semiconductor substrate 130 are stacked so as to electrically connect the junction pads 714 provided in the respective layers and the junction between the wiring layers (insulating layers) of the respective layers.

When the first semiconductor substrate 110 and the second semiconductor substrate 120 are stacked, the negative Z axis-side surface of the first wiring layer 712 and the positive Z axis-side surface of the second wiring layer 722 constitute a boundary surface 720. Similarly, when the second semiconductor substrate 120 and the third semiconductor substrate 130 are stacked, the negative Z axis-side surface of the wiring layer 723 and the positive Z axis-side surface of the third wiring layer 732 constitute a boundary surface 730. The boundary surface 720 and the boundary surface 730 have disposed thereon the plurality of junction pads 714. Specifically, opposing junction pads 714 are position-matched to each other as the two layers are stacked, thereby forming an electric connection between the position-matched junction units.

The first semiconductor substrate 110, the second semiconductor substrate 120, and the third semiconductor substrate 130 may be stacked as wafers prior to be formed into chips, with the stacked wafers being diced, or the first semiconductor substrate 110, the second semiconductor substrate 120, and the third semiconductor substrate 130, as wafers, may be diced and then stacked.

Figure 8:
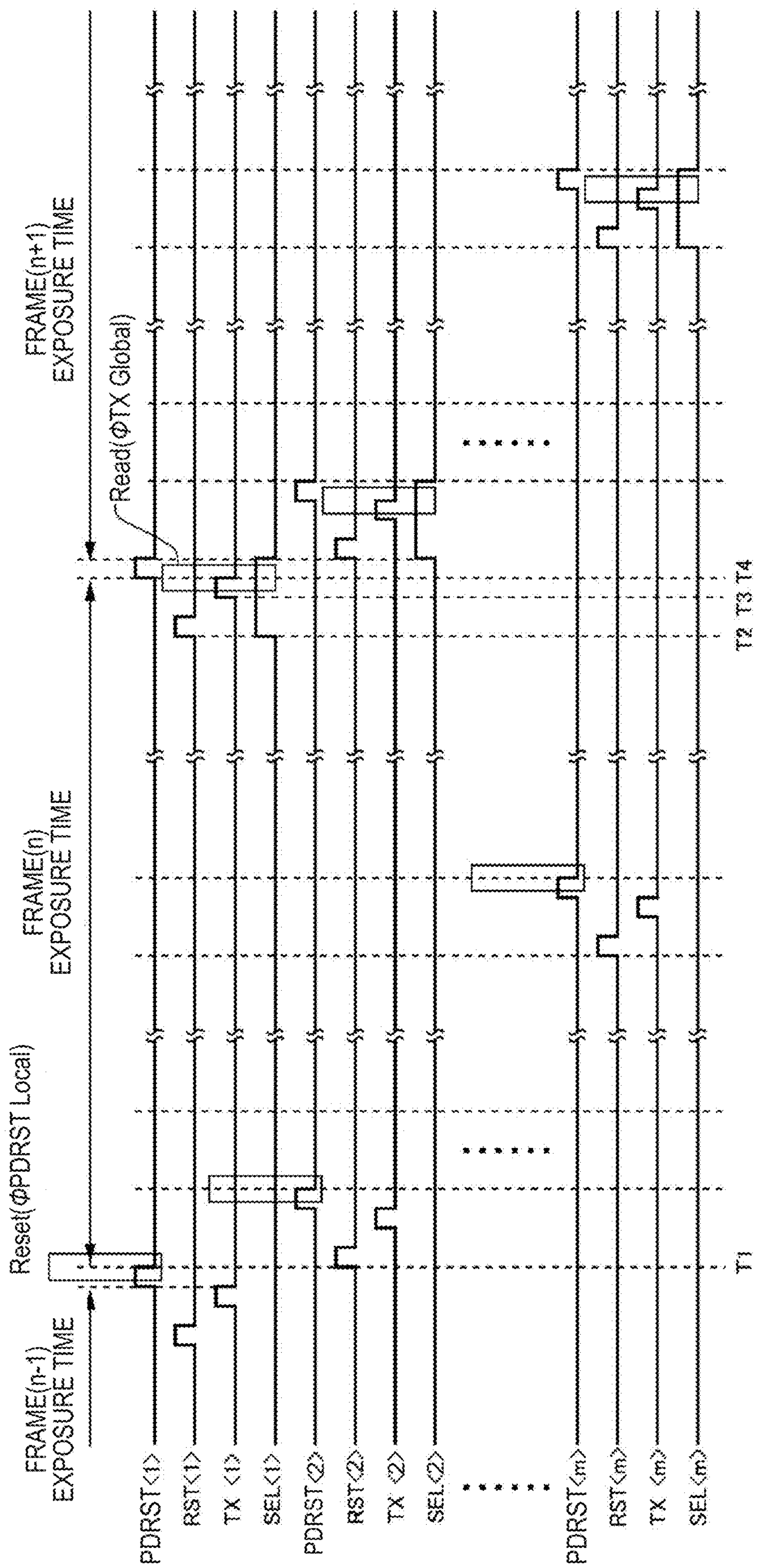
FIG. 8 is a timing chart showing an imaging operation example 1 of the imaging element.

FIG. 8 is a timing chart showing an imaging operation example 1 of the imaging element 100A. FIG. 8 is an imaging operation example by which the driving of the imaging element 100A is controlled by the transfer control signal φTX, the discharge control signal φPDRST, the reset control signal φRST, and the selection control signal φSEL. In FIG. 8, the discharge control signal φPDRST is locally controlled, and the transfer control signal φTX, the reset control signal φRST, and the selection control signal φSEL are globally controlled. The suffixes <1>, <2> . . . <m> of each signal on the left-hand side indicate the row numbers of the pixels 201 in the pixel block.

The discharge control signal φPDRST controls the timing at which exposure is started. The exposure start timing corresponds to the fall timing of the discharge control signal φPDRST (e.g., time T1). In other words, prior to the start time T1 for exposure, the discharge control signal φPDRST causes the discharge unit 302 to turn ON, resulting in the electric charge accumulated in the photoelectric conversion unit 300 to be discharged, and the fall of the discharge control signal φPDRST results in the start of exposure. The discharge control signal φPDRST is locally controlled, and thus, it is possible to adjust the exposure time for each pixel block 200.

The transfer control signal φTX controls the timing at which exposure is ended. At the time T3, the transfer control signal φTX turns ON the transfer unit 301, thereby transferring the accumulated electric charge in the photoelectric conversion unit 300 to the FD 303. The exposure end timing corresponds to the fall timing of the transfer control signal φTX (e.g., time T4). The transfer control signal φTX is a globally controlled signal, and thus, the timing at which exposure is ended is the same for all pixel blocks 200.

The reset control signal φRST controls the timing of discharge of the electric charge accumulated in the FD 303. At the time T2, the reset control signal φRST turns ON the reset unit 304, thereby discharging the electric charge of the FD 303. By discharging the electric charge in the FD 303 prior to the exposure end timing, it is possible to mitigate the effect of electric charge remaining in the FD 303 when the electric charge is transmitted from the photoelectric conversion unit 300.

The selection control signal φSEL is a signal for selecting a given pixel 201. The selection control signal φSEL controls the selection unit 352 so as to be ON or OFF. At the time T2, the selection control signal φSEL is set to high. At the time T3, pixels 201 for which the selection control signal φSEL is set to high output a pixel signal to the signal line 202 as the transfer control signal φTX turns ON. Meanwhile, no pixel signal is outputted from pixels 201 for which the selection control signal φSEL is not set to high.

The imaging element 100A locally controls the discharge control signal φPDRST to change the exposure start timing for each pixel block 200, thereby enabling control of the exposure time for each pixel block 200. Also, the imaging element 100A may locally control the transfer control signal φTX, thereby enabling control of the exposure end timing for each pixel block 200. Additionally, the imaging element 100A may locally control both the transfer control signal φTX and the discharge control signal φPDRST, thereby enabling control of both the start timing and end timing of exposure for each pixel block 200.

Figure 9:
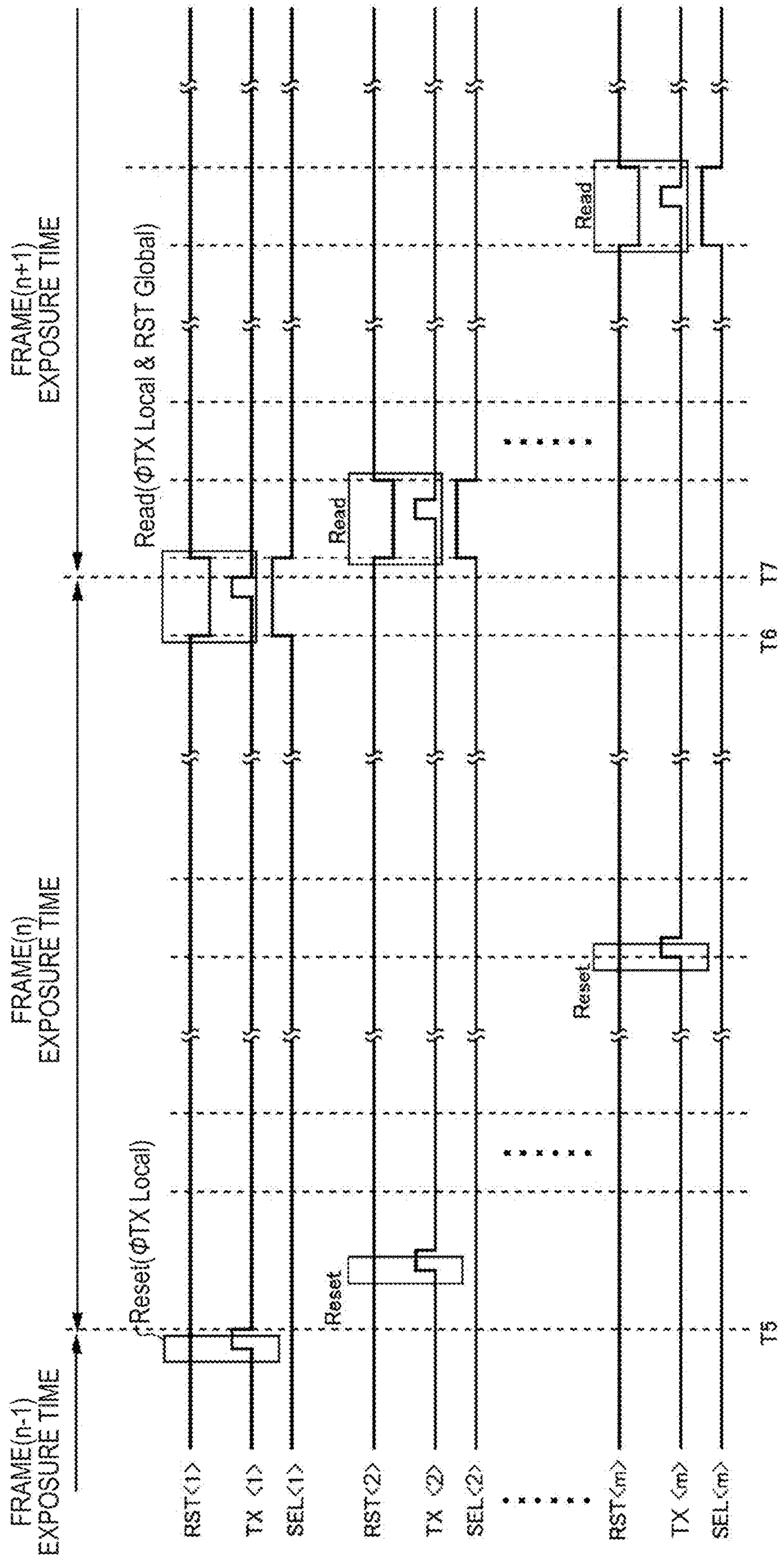
FIG. 9 is a timing chart showing an imaging operation example 2 of the imaging element.

FIG. 9 is a timing chart showing an imaging operation example 2 of the imaging element 100A. FIG. 9 is an imaging operation example by which the driving of the imaging element 100A is controlled by the transfer control signal φTX, the reset control signal φRST, and the selection control signal φSEL. This example differs from that of FIG. 8 in that the imaging element 100A controls the start timing of exposure using the transfer control signal φTX. Differences from the FIG. 8 will be described in particular.

The transfer control signal φTX controls the timing at which exposure is started and ended. During a frame (n), exposure is started at the time T5 and exposure is ended at the time T7.

At the exposure start time T5, the transfer control signal φTX falls, thereby starting exposure. In other words, prior to the start time T5 for exposure, the transfer control signal φTX causes the transfer unit 301 to turn ON in a state where the reset control signal φRST is turned ON, resulting in the electric charge accumulated in the photoelectric conversion unit 300 to be discharged, and the fall of the transfer control signal φTX results in the start of exposure. The transfer control signal φTX is a locally controlled signal, and thus, it is possible to change the timing at which exposure is started for each pixel block 200. However, the same timing for starting exposure may be used for all pixel blocks 200.

Also, at the exposure end time T7, the transfer control signal φTX falls, thereby ending exposure. In other words, prior to the end time T5 for exposure, the transfer control signal φTX causes the transfer unit 301 to turn ON in a state where the reset control signal φRST is turned OFF, resulting in the electric charge accumulated in the photoelectric conversion unit 300 to be transferred to the FD 303, and the fall of the transfer control signal φTX results in the end of exposure. The transfer control signal φTX is a locally controlled signal, and thus, it is possible to change the timing at which exposure is ended for each pixel block 200. However, the same timing for ending exposure may be used for all pixel blocks 200.

The selection control signal φSEL is a signal for selecting a given pixel 201. At the time T6, pixels 201 for which the selection control signal φSEL is set to high output a pixel signal to the signal line 202.

The reset control signal φRST controls the timing of discharge of the electric charge accumulated in the FD 303.

The reset control signal φRST may be a globally controlled signal. The reset control signal φRST is set to ON at all times except for the read timing, and thus, no electric charge accumulates in the FD 303. By turning OFF the reset control signal φRST at the read timing and then turning ON the transfer control signal φTX, electric charge is transferred from the photoelectric conversion unit 300 to the FD 303. The reset control signal φRST has the same timing for switching during reading as the selection control signal φSEL, and thus, the same pulse timing as the selection control signal φSEL can be used.

The imaging element 100A locally controls the transfer control signal φTX to change the exposure start or end timing for each pixel block 200, thereby enabling control of the exposure time for each pixel block 200. Also, the imaging element 100A uses the same pulse timing for the reset control signal φRST and the selection control signal φSEL, and thus, it is possible to further simplify the control circuit.

Figure 10:
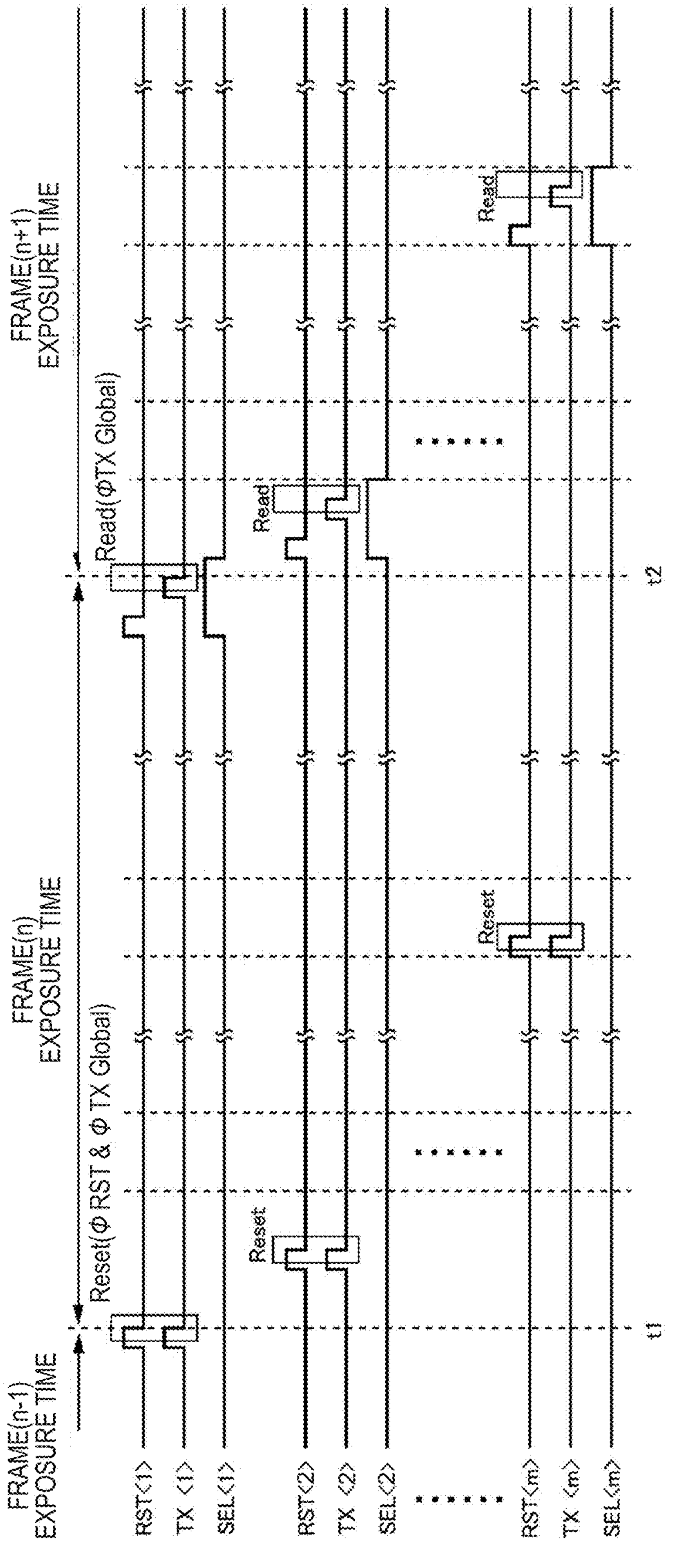
FIG. 10 is a timing chart showing an imaging operation of an imaging element according to a comparison example.

FIG. 10 is a timing chart showing an imaging operation of an imaging element according to a comparison example. FIG. 10 is an imaging operation example by which the driving of the imaging element is controlled by the transfer control signal φTX, the reset control signal φRST, and the selection control signal φSEL, and the exposure time is not individually controlled for each pixel block 200.

In the comparison example, the transfer control signal φTX and the reset control signal φRST is used to control the start of exposure. The exposure start timing is the fall timing (time T1) of the transfer control signal φTX and the reset control signal φRST. The exposure end timing is the fall timing of the transfer control signal φTX (time t2). In the comparison example, the start timing and end timing of exposure are globally controlled, and the exposure time is not individually controlled for each pixel block 200.

Figure 11:
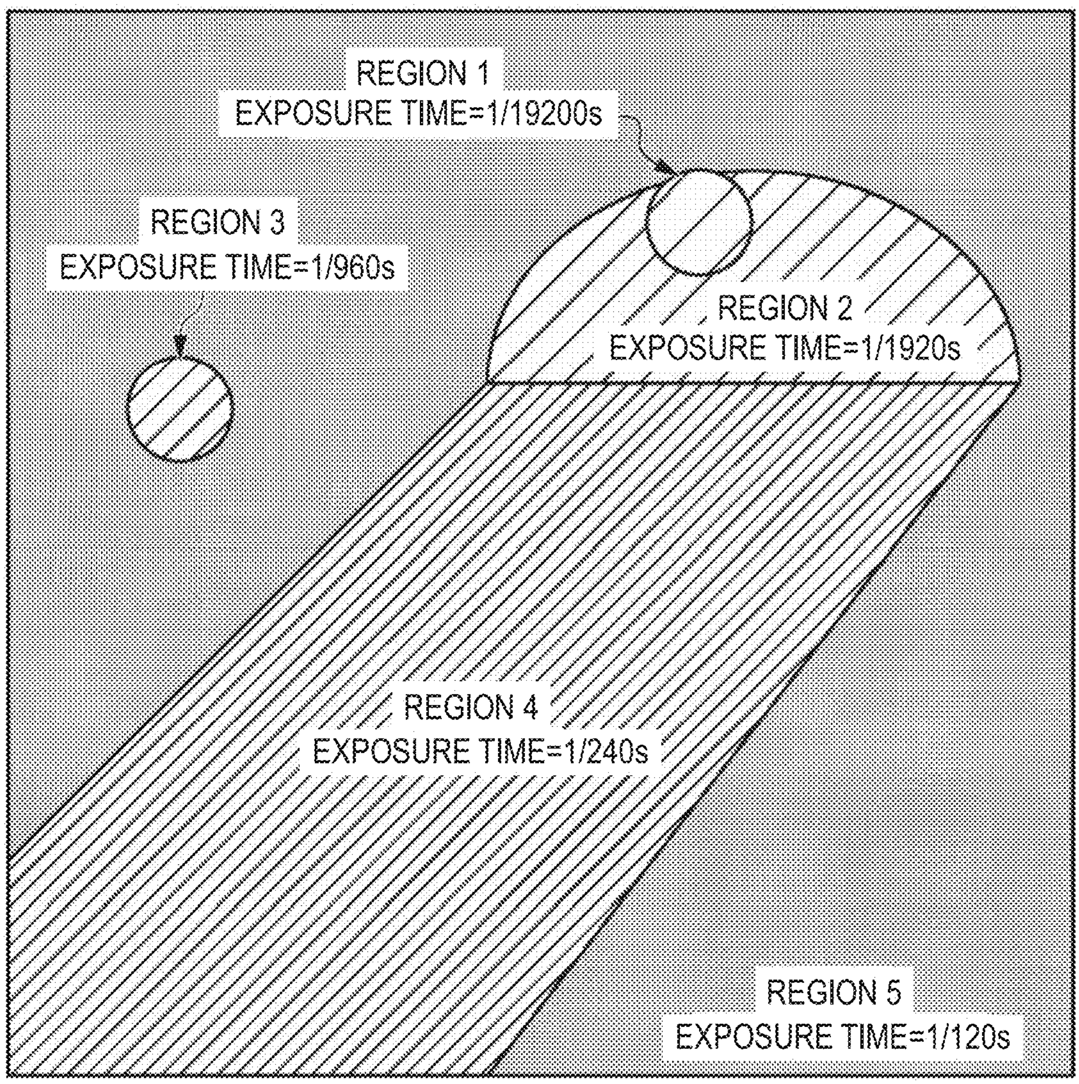
FIG. 11 is a descriptive view showing an example of a subject captured by the imaging element.

FIG. 11 is a descriptive view showing an example of a subject captured by the imaging element 100A. In FIG. 11, the imaging element 100A controls the exposure time for each pixel block 200 in a state where the sun in the west shines into a tunnel.

Regions 1 to 5 are five regions divided according to brightness. The regions 1 to 5 are assigned a number in order of brightness. The region 1 is the brightest region where the sun in the west is directly visible. The region 2 is a region corresponding to the exit of the tunnel, and is darker than the region 1. The region 3 is a region in the tunnel where the sun in the west is reflected, and is darker than the region 2. The region 4 is a region in the tunnel illuminated by the sun in the west through the exit, and is darker than the region 3. The region 5 is a region in the tunnel not illuminated by the sun in the west through the exit, and is the darkest region.

The imaging element 100A controls the exposure time for each pixel block 200 according to the brightnesses of the respective regions. The imaging element 100A controls the exposure times so as to be shorter for pixel blocks 200 in brighter regions. The exposure time for the region 1 is set to be the shortest, and the exposure time for the region 5 is set to be the longest. For example, the exposure times for the regions 1 to 5 are set to 1/19200s, 1/1920s, 1/960s, 1/240s, and 1/120s, respectively.

Figure 12:
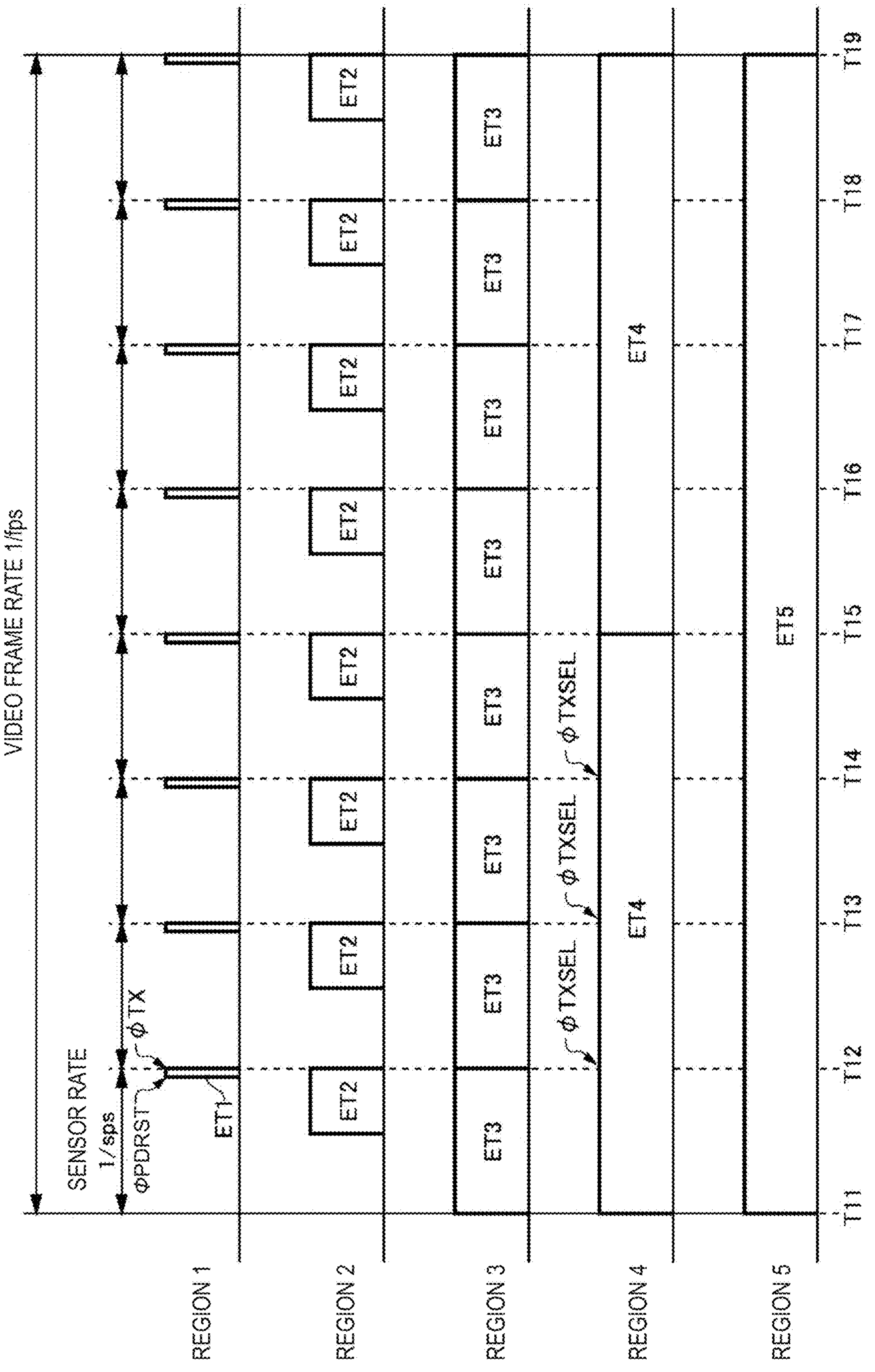
FIG. 12 is a timing chart showing the exposure times for the regions 1 to 5 shown in FIG. 11.

FIG. 12 is a timing chart showing the exposure times for the regions 1 to 5 shown in FIG. 11. In FIG. 12, the imaging element 100A controls the exposure time for each pixel block 200 in regions 1 to 5 shown in FIG. 11. The period from the time T11 to the time T19 corresponds to a video frame rate.

In the region 1, the control block 400A performs control for driving such that the exposure time in the pixel blocks 200 is a predetermined exposure time ET1. The control block 400A controls the start of exposure using the discharge control signal φPDRST and controls the end of exposure using the transfer control signal φTX. In the region 1, exposure ends at each of the times T12 to T19.

In the region 2, the control block 400A performs control for driving such that the exposure time in the pixel blocks 200 is an exposure time ET2, which is longer than the exposure time ET1. The control block 400A sets the exposure start time of the region 2 to be earlier than for the region 1 while matching the exposure end time of the region 2 with that of the region 1. Thus, in the region 2, exposure ends at each of the times T12 to T19. The exposure time ET2 of the region 2 is shorter than the sensor rate period.

In the region 3, the control block 400A performs control for driving such that the exposure time in the pixel blocks 200 is an exposure time ET3, which is longer than the exposure time ET2. The control block 400A sets the exposure start time of the region 3 to be earlier than for the region 2 while matching the exposure end time of the region 3 with that of the region 2. Thus, in the region 3, exposure ends at each of the times T12 to T19. The exposure time ET3 of the region 3 is set to be the same as the sensor rate period.

In the region 4, the control block 400A performs control for driving such that the exposure time in the pixel blocks 200 is an exposure time ET4, which is longer than the exposure time ET3. The control block 400A sets the exposure start time of the region 4 to be the same as that of region 3, while skipping the exposure end time using the transfer selection control signal φTXSEL. The control block 400A skips the exposure end time three times using the transfer selection control signal φTXSEL, causing the region 4 to have quadruple the exposure time of the region 3. In the region 4, the transfer selection control signal φTXSEL is supplied at each of the times T12 to T14.

In the region 5, the control block 400A performs control for driving such that the exposure time in the pixel blocks 200 is an exposure time ET5, which is longer than the exposure time ET4. The control block 400A sets the exposure start time of the region 5 to be the same as that of region 4, while increasing the number of instances that the exposure end time is skipped using the transfer selection control signal φTXSEL. The control block 400A skips the exposure end time seven times using the transfer selection control signal φTXSEL, causing the region 5 to have double the exposure time of the region 4. The exposure time ET5 of the region 5 is set to be the same as the sensor rate period. In the region 5, the transfer selection control signal φTXSEL is supplied at each of the times T12 to T18.

The imaging element 100A realizes short exposure by bringing the intervals of the transfer control signal φTX and the discharge control signal φPDRST to be closer to each other. Also, the imaging element 100 skips control by the transfer control signal φTX using the transfer selection control signal φTXSEL, resulting in a long exposure. This enables expansion of the dynamic range.

Figure 13:
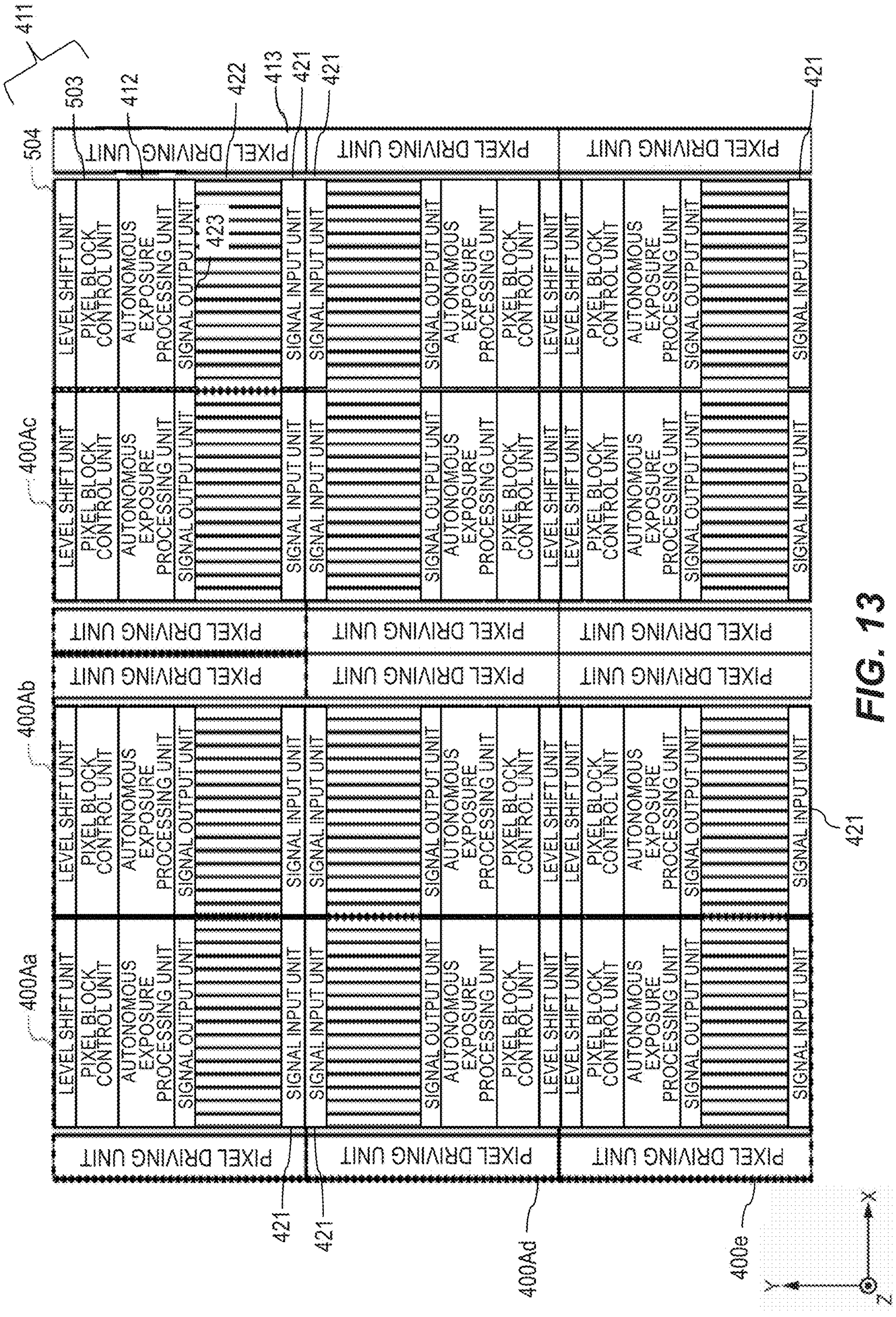
FIG. 13 is a plan view showing an example of a layout of the plurality of control blocks.

FIG. 13 is a plan view showing an example of a layout of the plurality of control blocks 400A. The plurality of control blocks 400A are disposed such that adjacent control blocks 400A are in an inverted arrangement to each other. FIG. 13 shows, as an example 12 control blocks 400A among the plurality of control blocks 400A provided in the control circuit unit 102.

An inverted arrangement refers to an arrangement whereby regions where components of the control block 400A are formed (e.g., the exposure control unit 412, the pixel driving unit 413, the signal input unit 421, the signal conversion unit 422, and the signal output unit 423) are mirrored from each other about the boundary line between the control blocks 400A. The circuits of the respective components of the control block 400A need not be in an inverted arrangement. Also, the order of reading each pixel in the control blocks 400A need not necessarily be inverted.

For example, in a case where a plurality of control blocks 400A disposed adjacent to each other in the row direction are in an inverted arrangement, the components of the control block 400A are inverted in the row direction, and thus, the respective pixel driving units 413 both control blocks 400A are arranged adjacent to each other at the boundary therebetween. As a result, the plurality of pixel driving units 413 arranged adjacent to each other in the row direction can be laid out as one pixel driving unit 413, thereby improving the layout efficiency of the control blocks 400A.

Similarly, in a case where a plurality of control blocks 400A disposed adjacent to each other in the column direction are in an inverted arrangement, the components of the control block 400A are inverted in the column direction, and thus, the same components of both control blocks 400A are arranged adjacent to each other at the boundary therebetween. As a result, the plurality of signal input units 421 arranged adjacent to each other in the column direction can be laid out as one signal input unit 421, thereby improving the layout efficiency of the control blocks 400A.

The control blocks 400A are each in an inverted arrangement with control blocks 400A disposed adjacent thereto. All control blocks 400A are in an inverted arrangement with each other in the row direction and the column direction, but may alternatively be in an inverted arrangement in either one of the row direction and the column direction. For example, the signal conversion unit 422 of the control block 400A is in an inverted arrangement with the signal conversion units 422 of the control blocks 400A adjacent thereto in the row direction. The signal conversion unit 422 of the control block 400A is also in an inverted arrangement with the signal conversion units 422 of the control blocks 400A that are adjacent thereto in the column direction.

The control block 400Aa and the control block 400Ab are arranged adjacent to each other in the row direction. The control block 400Aa is in an inverted arrangement with the control block 400Ab. The level shift unit 504 of the control block 400Aa is provided in the same well region as the level shift unit 504 of the control block 400Ab. Similarly, the pixel block control unit 503, the storage unit 502, and the signal output unit 423 are provided in the same well region for the control block 400Aa and the control block 400Ab.

The control block 400Ab and the control block 400Ac are arranged adjacent to each other in the row direction. The control block 400Ab is in an inverted arrangement with the control block 400Ac. The pixel driving unit 413 of the control block 400Ab is provided in the same well region as the pixel driving unit 413 of the control block 400Ac. The well region of the pixel driving unit 413 may be shared with the well region of the level shift unit 504.

The control block 400Aa and the control block 400Ad are arranged adjacent to each other in the column direction. The control block 400Aa is in an inverted arrangement with the control block 400Ad. The pixel driving unit 413 of the control block 400Aa is provided in the same well region as the pixel driving unit 413 of the control block 400Ad. Also, the signal conversion unit 422 of the control block 400Aa is provided in the same well region as the signal conversion unit 422 of the control block 400Ad.

The control block 400Ad and the control block 400Ae are arranged adjacent to each other in the column direction. The control block 400Ad is in an inverted arrangement with the control block 400Ae. The pixel driving unit 413 and the level shift unit 504 of the control block 400Ad is provided in the same well region as the pixel driving unit 413 and the level shift unit 504 of the control block 400Ae.

As a result of the control blocks 400A being in an inverted arrangement, the imaging element 100 can achieve increased layout efficiency even if the signals are processed in parallel between the control blocks 400A. As a result of a plurality of the control blocks 400A being in an inverted arrangement on the XY plane, the imaging element 100A can have shared well regions between adjacent control blocks 400A. As a result, the number of instances of switching of the well region is decreased and the area efficiency is improved.

Figure 14:
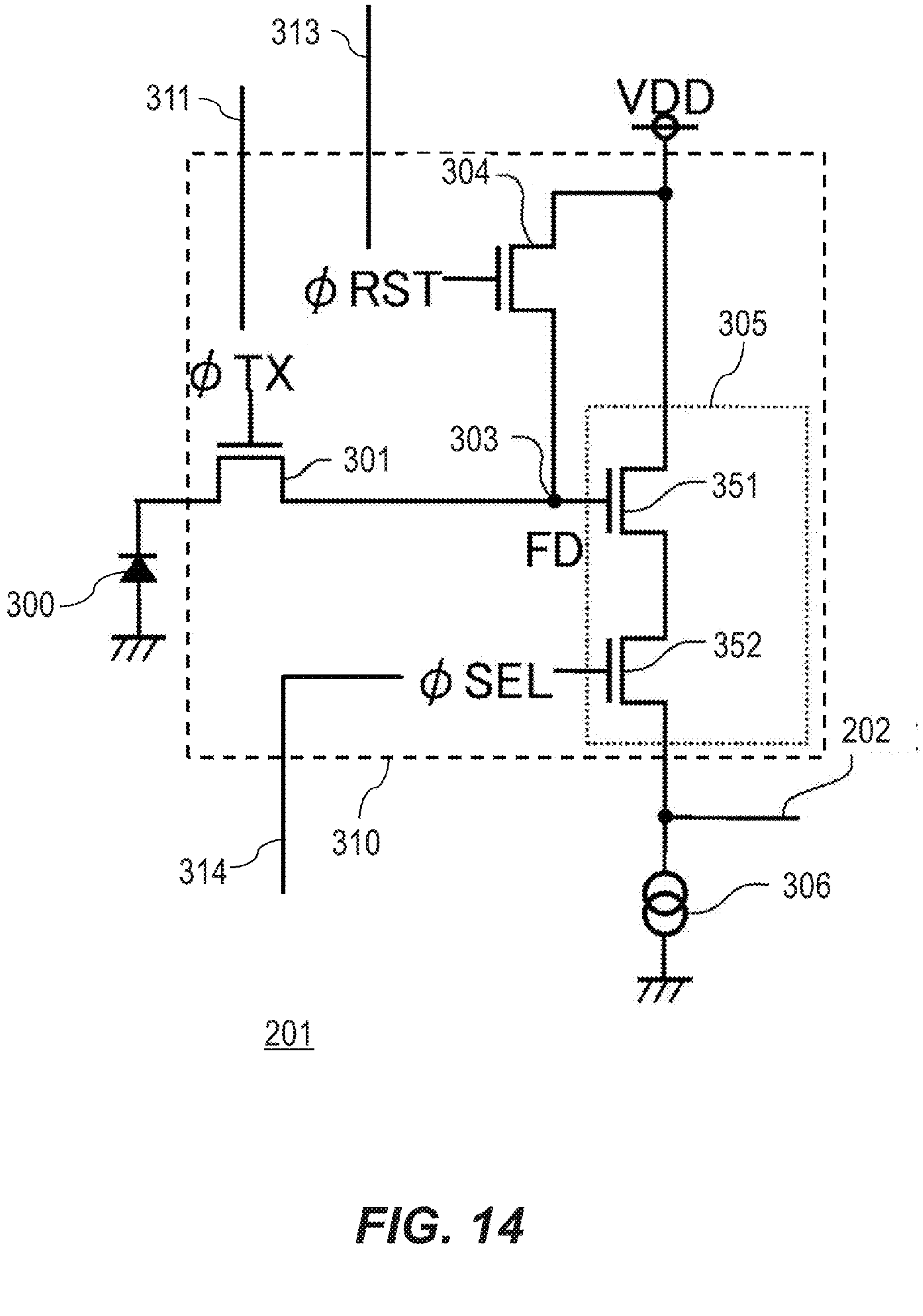
FIG. 14 is a circuit diagram showing another example of a circuit configuration of the pixel.

FIG. 14 is a circuit diagram showing another example of a circuit configuration of the pixel 201. In the pixel 201, components that are the same as those of FIG. 3 are assigned the same reference characters and explanations thereof are omitted. In the pixel 201, the discharge unit 302 provided in the previously described pixel 201 is omitted. If discharging the electric charge accumulated in the photoelectric conversion unit 300 to the power source line to which the power source voltage VDD is supplied, the transfer control signal φTX is inputted to the gate terminal of the transfer unit 301, and the reset control signal φRST is inputted to the gate terminal of the reset unit 304.

Figure 15:
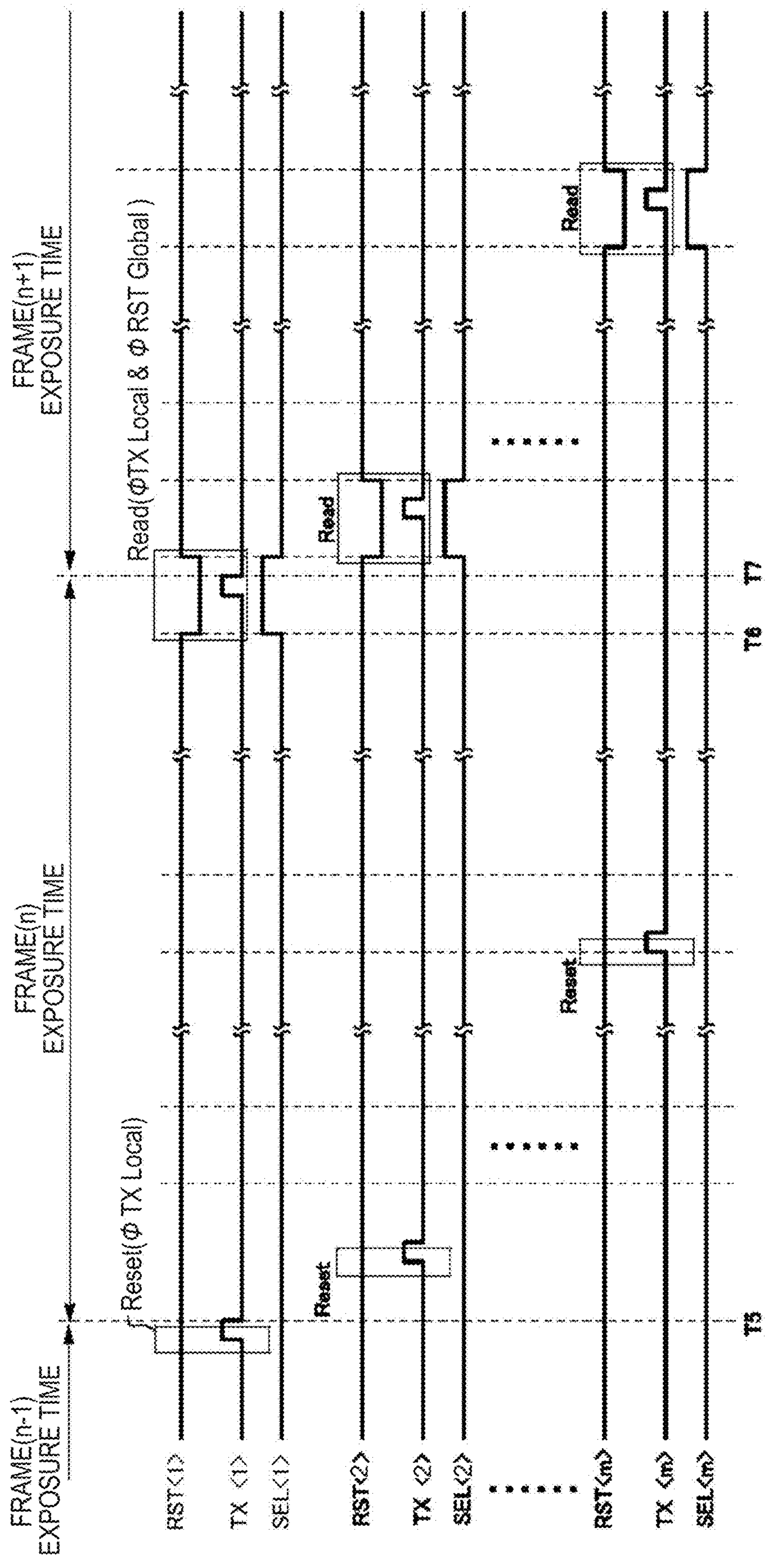
FIG. 15 is a timing chart showing an imaging operation example 3 of the imaging element.

FIG. 15 is a timing chart showing an imaging operation example 3 of the imaging element 100A. FIG. 15 is an imaging operation example by which the pixel 201 shown in FIG. 14 is used and the driving of the imaging element 100A is controlled by the transfer control signal φTX, the reset control signal φRST, and the selection control signal φφSEL. This example differs from that of FIG. 12 in that the imaging element 100A controls the start timing of exposure using the transfer control signal φTX. Differences from the FIG. 12 will be described in particular.

The transfer control signal φTX controls the timing at which exposure is started and ended. During a frame (n), exposure is started at the time T5 and exposure is ended at the time T7.

At the exposure start time T5, the transfer control signal φTX falls, thereby starting exposure. In other words, prior to the start time T5 for exposure, the transfer control signal φTX causes the transfer unit 301 to turn ON in a state where the reset control signal φRST is turned ON, resulting in the electric charge accumulated in the photoelectric conversion unit 300 to be discharged, and the fall of the transfer control signal φTX results in the start of exposure. The transfer control signal φTX is a locally controlled signal, and thus, it is also possible to change the timing at which exposure is started for each pixel block 200.

Also, at the exposure end time T7, the transfer control signal φTX falls, thereby ending exposure. In other words, prior to the end time T5 for exposure, the transfer control signal φTX causes the transfer unit 301 to turn ON in a state where the reset control signal φRST is turned OFF, resulting in the electric charge accumulated in the photoelectric conversion unit 300 to be transferred to the FD 303, and the fall of the transfer control signal φTX results in the end of exposure. The transfer control signal φTX is a locally controlled signal, and thus, it is also possible to change the timing at which exposure is ended for each pixel block 200.

The selection control signal φSEL is a signal for selecting a given pixel 201. At the time T6, pixels 201 for which the selection control signal φSEL is set to high output a pixel signal to the signal line 202.

The reset control signal φRST controls the timing of discharge of the electric charge accumulated in the FD 303. The reset control signal φRST may be a globally controlled signal. The reset control signal φRST is set to ON at all times except for the read timing, and thus, no electric charge accumulates in the FD 303. By turning OFF the reset control signal φRST at the read timing and then turning ON the transfer control signal φTX, electric charge is transferred from the photoelectric conversion unit 300 to the FD 303. The reset control signal PRST has the same timing for switching during reading as the selection control signal φSEL, and thus, the same pulse timing as the selection control signal φSEL can be used.

Thus, according to the configuration of the imaging element 100A shown in FIGS. 1 to 15, exposure can be performed for each pixel block 200 constituted of the plurality of pixels 201, with pixel signals from the pixel blocks 200 being read by each control block 400A corresponding to each pixel block 200 and the analog pixel signals being converted to digital signals. Also, the imaging element 100A uses the control blocks 400A provided for each of the pixel blocks 200 to read the pixel signals from the pixel blocks 200 in parallel. Thus, the imaging element 100A can set the exposure time for each pixel block 200 according to the intensity of incident light, and thus, can expand the dynamic range.

Next, using FIGS. 16 to 22, the configuration of an imaging element 100B will be described in which exposure is performed for each pixel block 200 individually, but the pixel signals are sequentially read for each pixel row, and A/D conversion is performed for each pixel column.

Figure 16:
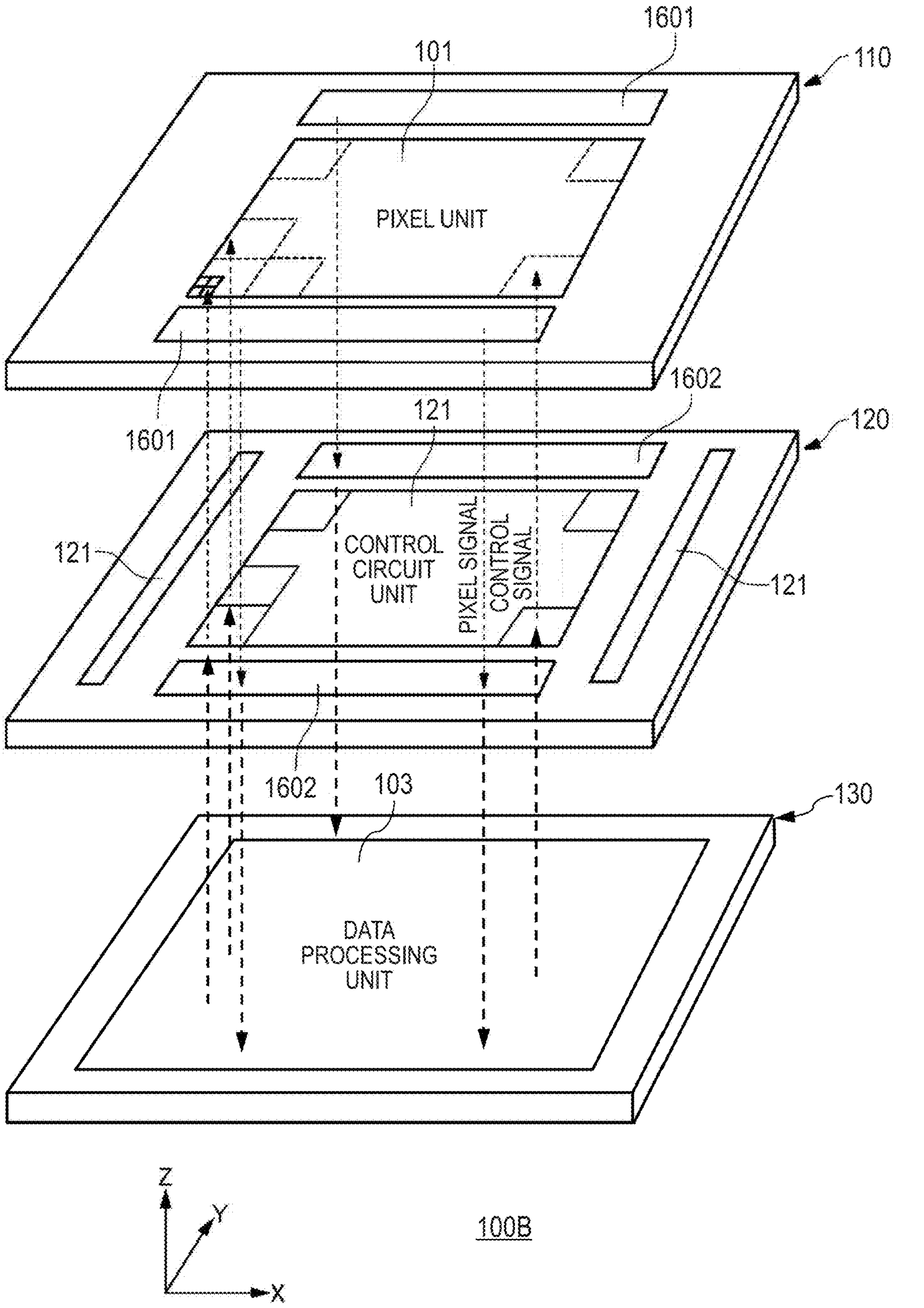
FIG. 16 is an exploded perspective view showing another example of an imaging element.

FIG. 16 is an exploded perspective view showing another example of an imaging element. The imaging element 100B includes a first semiconductor substrate 110, a second semiconductor substrate 120, and a third semiconductor substrate 130. As shown in FIG. 16, the first semiconductor substrate 110 is stacked on the second semiconductor substrate 120, and the second semiconductor substrate 120 is stacked on the third semiconductor substrate 130.

The first semiconductor substrate 110 has a pixel unit 101 and connection regions 1601. The pixel unit 101 outputs pixel signals based on incident light. The connection regions 1601 are disposed to the sides of the pixel unit 101. In the example of FIG. 16, a pair of connection regions 1601 are disposed along two opposing sides of the first semiconductor substrate 110 to the front and rear of the pixel unit 101.

The second semiconductor substrate 120 has a control circuit unit 102, peripheral circuit units 121, and signal processing units 1602.

The control circuit unit 102 outputs, to the pixel unit 101, a control signal for controlling the driving of the pixel unit 101. The control circuit unit 102 is disposed at a position in the second semiconductor substrate 120 opposing the pixel unit 101.

The peripheral circuit units 121 control the driving of the control circuit unit 102. The peripheral circuit units 121 are on the second semiconductor substrate 120 at positions in the periphery of the control circuit unit 102. Also, the peripheral circuit units 121 may be electrically connected to the first semiconductor substrate 110 and control the driving of the pixel unit 101. The peripheral circuit units 121 are disposed along two opposing sides of the second semiconductor substrate 120, but the method for arranging the peripheral circuit units 121 is not limited to this example.

The signal processing units 1602 receive input of an analog pixel signal outputted from the first semiconductor substrate 110. The signal processing units 1602 perform signal processing of the pixel signals. The signal processing units 1602 perform processing to convert the analog pixel signals to digital signals, for example. The signal processing units 1602 may perform other signal processes. Examples of other signal processes include noise removal processing such as analog or digital correlated double sampling (CDS). The signal processing units 1602 are provided in the periphery, or in other words, the outer sides of the control circuit unit 102. In the example of FIG. 16, a pair of signal processing units 1602 are disposed along two opposing sides of the second semiconductor substrate 120 to the front and rear of the control circuit unit 102. The signal processing units 1602 may be circuits included in the peripheral circuit units 121.

The third semiconductor substrate 130 has a data processing unit 103. The data processing unit 103 uses digital data outputted from the second semiconductor substrate 120 to perform addition, thinning, and other types of image processing.

Figure 17:
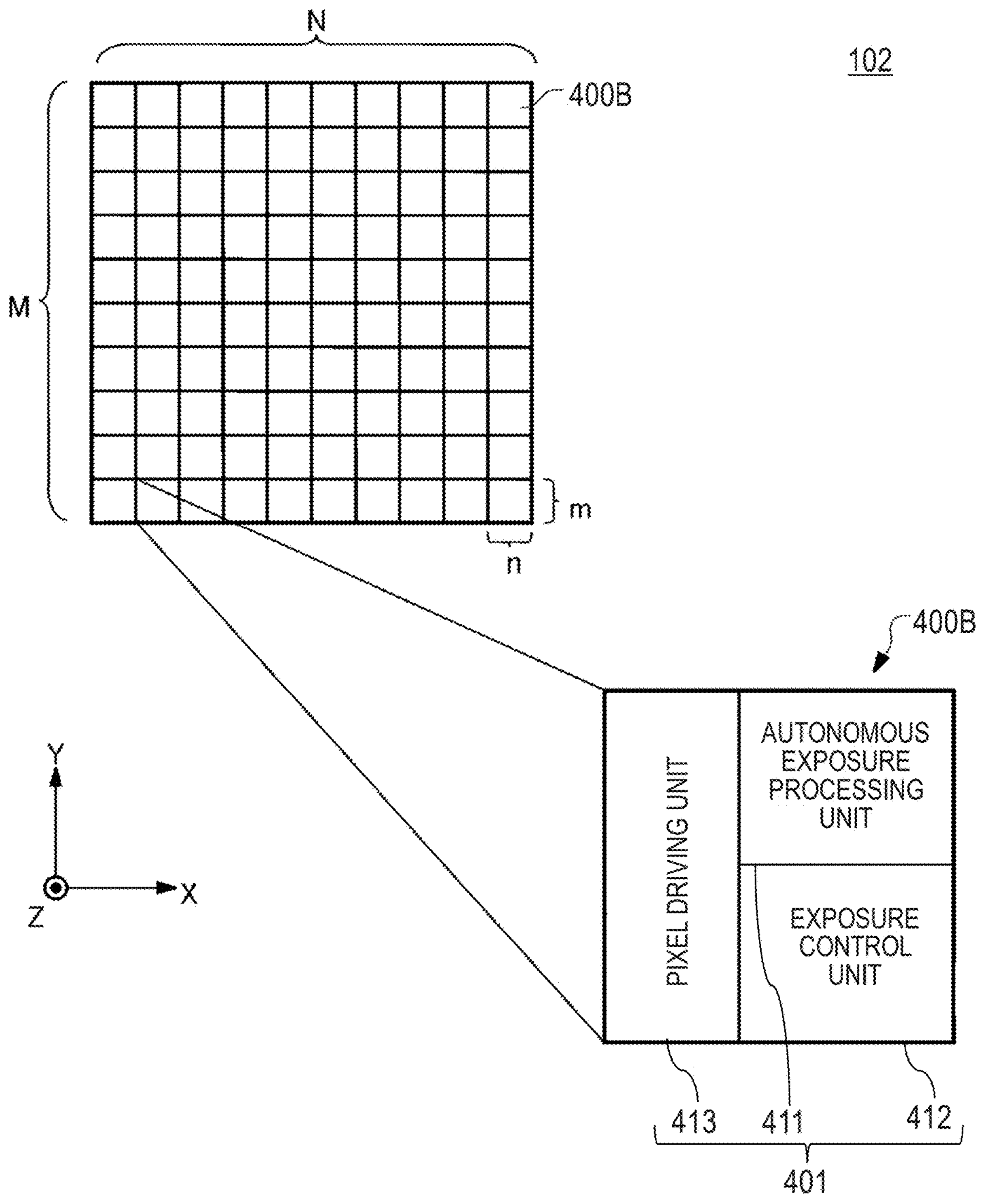
FIG. 17 is a descriptive view showing another example of a specific configuration of the control circuit unit.

FIG. 17 is a descriptive view showing another example of a specific configuration of the control circuit unit 102. In FIG. 17, the control block 400A has a pixel control unit 401 (autonomous exposure processing unit 411, exposure control unit 412, and pixel driving unit 413) but does not have the signal processing unit 402.

Instead of providing one control block 400B for each pixel block 200, one control block 400B may be provided for N (N being a natural number of 2 or greater) pixel blocks 200. The N pixel blocks 200 corresponding to each pixel block are sometimes collectively referred to as a pixel block group. For example, one control block 400B may be provided to correspond to two pixel blocks 200 arranged along the column direction as one pixel block group. In this case, the control block B may control the exposure time of the pixel blocks 200 individually.

In addition, the control block 400B is electrically connected to at least one pixel block 200, and is the minimum unit for a circuit that controls the exposure of the pixels 201 of the at least one pixel block 200.

Figure 18:
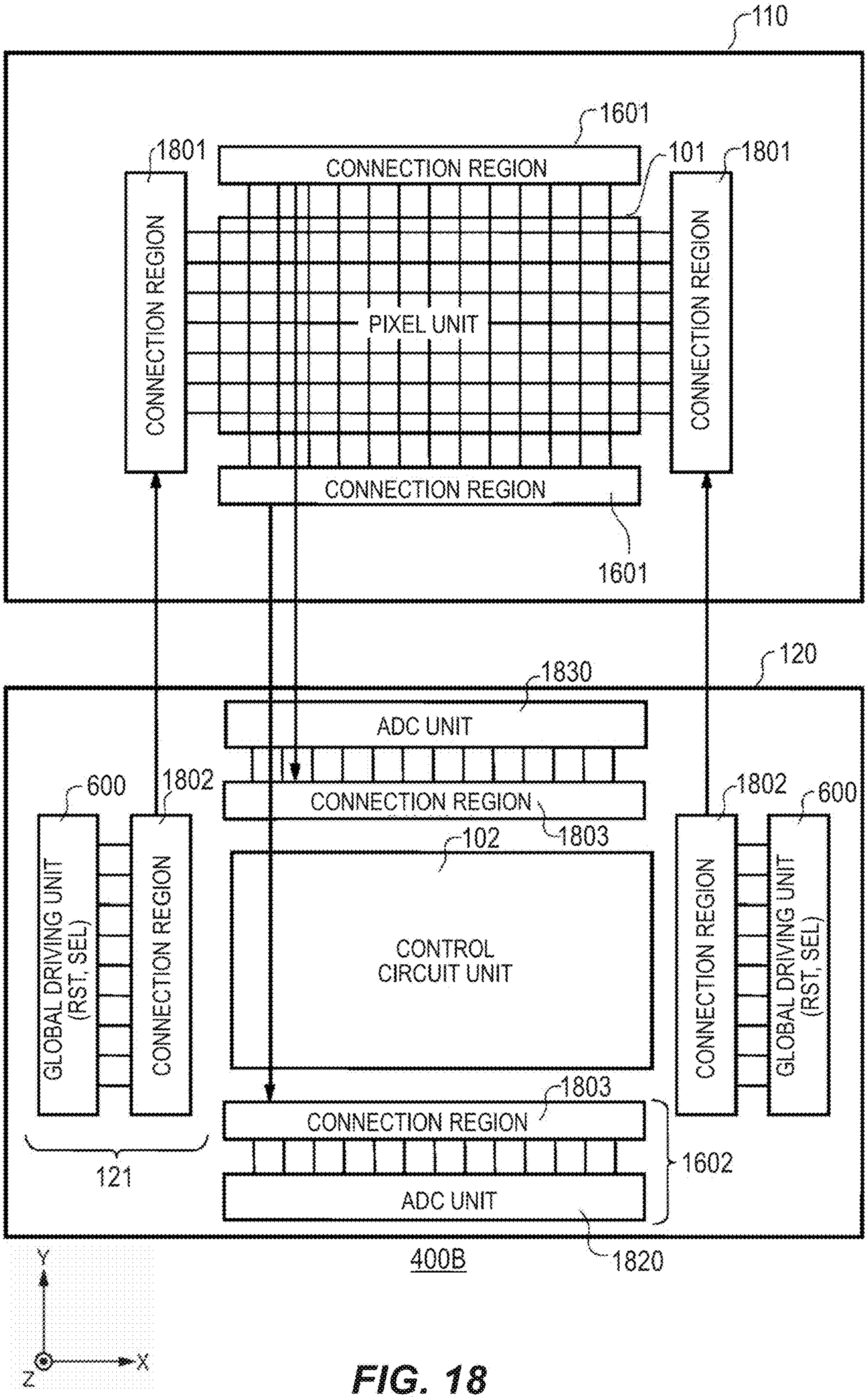
FIG. 18 is a descriptive view showing a connective relationship between the first semiconductor substrate and the second semiconductor substrate in the imaging element.

FIG. 18 is a descriptive view showing a connective relationship between the first semiconductor substrate 110 and the second semiconductor substrate 120 in the imaging element 100B. The first semiconductor substrate 110 includes connection regions 1801 that are provided in the periphery of the pixel unit 101 and that are electrically connected to the pixel unit 101, and connection regions 1601. The second semiconductor substrate 120 includes connection regions 1802 that are provided in the periphery of the control circuit unit 102 and that are electrically connected to the control circuit unit 102, and connection regions 1803.

The pair of connection regions 1801 are respectively connected to the pair of connection regions 1802 at opposing positions thereto. The connection regions 1801 and the connection regions 1802, which are connected to each other, input control signals from the global driving unit 600 to the pixel unit 101 using global control lines.

The pair of connection regions 1601 are respectively connected to the pair of connection regions 1803 at opposing positions thereto. The connection regions 1601 and the connection regions 1803, which are connected to each other, input pixel signals from the pixel unit 101 to an ADC unit 1820 and an ADC unit 1830 corresponding thereto using shared signal lines.

Figure 19:
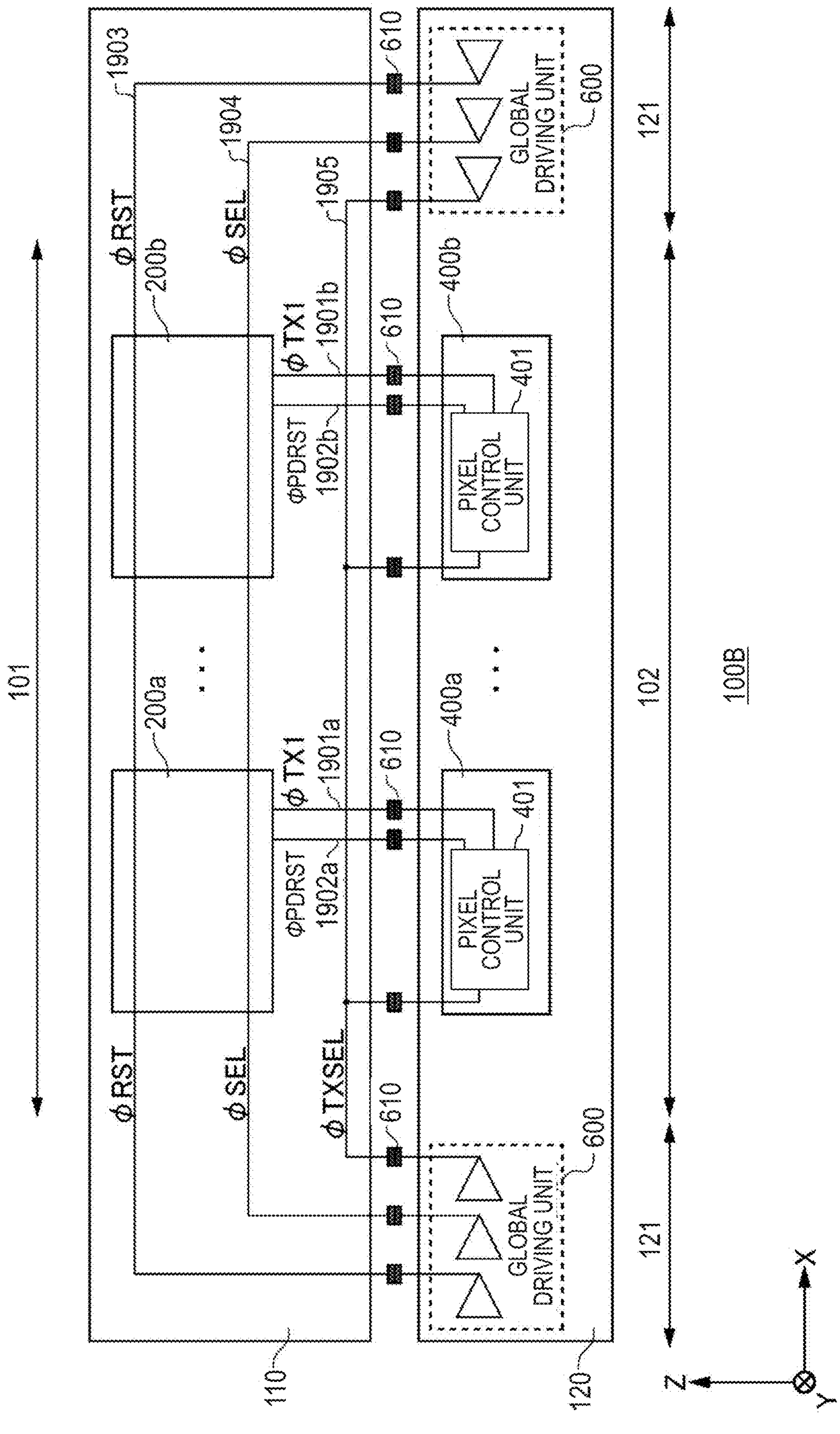
FIG. 19 is a descriptive view showing a transmission example for signals between the first semiconductor substrate and the second semiconductor substrate in the imaging element.

FIG. 19 is a descriptive view showing a transmission example for signals between the first semiconductor substrate 110 and the second semiconductor substrate 120 in the imaging element 100B. The global driving unit 600 outputs a reset control signal φRST, a selection control signal φSEL, and a transfer selection control signal φTXSEL. The global driving unit 600 is connected to a reset control line 1903 and a selection control line 1904 that output signals to the respective pixel blocks 200. The global driving unit 600 supplies the reset control signal φRST to the plurality of pixel blocks 200 via the reset control line 1903, and supplies the selection control signal φSEL via the selection control line 1904. The global driving unit 600 supplies the transfer selection control signal φTXSEL to the plurality of control blocks 400B via a transfer selection control line 1905.

The transfer selection control signal φTXSEL is supplied from the global driving unit 600 to the control block 400B in order to control the exposure time for each pixel block 200. The control block 400B to which the transfer selection control signal φTXSEL was supplied outputs the transfer selection control signal φTXSEL to the corresponding pixel block 200. The pixel block 200 determines whether to input, to the pixels 201, the transfer selection control signal φTXSEL as the transfer control signal φTX or the discharge control signal φPDRST. As a result, the input of the transfer control signal φTX or the discharge control signal φPDRST to the pixels 201 is skipped.

If the transfer control signal φTX determines the end time for exposure, for example, then the control block 400B extends the exposure time by skipping the transfer control signal φTX. If the transfer control signal φTX determines the start time for exposure, then the control block 400B can shorten the exposure time by skipping the transfer control signal φTX. In this manner, the transfer selection control signal φTXSEL can be used to adjust the exposure time of the pixel block 200. This similar applies to cases in which the discharge control signal φPDRST determines the start time or the end time for exposure.

The reset control line 1903, the selection control line 1904, and the transfer selection control line 1905 are globally wired, or in other words, shared by the plurality of pixel blocks 200. The reset control line 1903, the selection control line 1904, and the transfer selection control line 1905 are wired so as to cross the pixel unit 101 in the row direction. The reset control line 1903, the selection control line 1904, and the transfer selection control line 1905 may alternatively be wired so as to cross the pixel unit 101 in the column direction.

The reset control line 1903 is connected to the gate terminals of the reset units 304 of the pixel block 200 and supply thereto the reset control signal φRST. The selection control line 1904 is connected to the gate terminals of the selection units 352 of the pixel block 200 and supply thereto the selection control signal φSEL. Also, the transfer selection control line 1905 is connected to the plurality of control blocks 400B and supplies the transfer selection control signal φTXSEL to the pixel control unit 401.

The global driving unit 600 outputs the transfer selection control signal φTXSEL from the second semiconductor substrate 120 to the first semiconductor substrate 110, but may output the transfer selection control signal φTXSEL to the control block 400B without supplying the same to the first semiconductor substrate 110. In this case, the transfer selection control line 1905 is provided to the second semiconductor substrate 120.

Meanwhile, a transfer control line 1901*a* and a discharge control line 1902*a* are connected to a pixel block 200*a*. The transfer control line 1901*a* is connected to the gate terminals of the transfer units 301 provided to the pixel block 200*a*. The transfer control line 1901*a* supplies the transfer control signal φTX outputted from a control block 400Ba to the pixel block 200*a*. The discharge control line 1902*a* is connected to the gate terminals of the discharge units 302 provided to the pixel block 200*a*. The discharge control line 1902*a* supplies the discharge control signal φPDRST outputted from the control block 400Ba to the pixel block 200*a*.

A transfer control line 1901*b* and a discharge control line 1902*b* are connected to a pixel block 200*b*. The transfer control line 1901*b* is connected to the gate terminals of the transfer units 301 provided to the pixel block 200*b*. The transfer control line 1901*b* supplies the transfer control signal φTX outputted from a control block 400Bb to the pixel block 200*b*. The discharge control line 1902*b* is connected to the gate terminals of the discharge units 302 provided to the pixel block 200*b*. The discharge control line 1902*b* supplies the discharge control signal φPDRST outputted from the control block 400Bb to the pixel block 200*b*.

A plurality of junction units 610 are provided at a junction surface at which the first semiconductor substrate 110 and the second semiconductor substrate 120 are joined. The junction units 610 of the first semiconductor substrate 110 are position-matched with the junction units 610 of the second semiconductor substrate 120. The opposing plurality of junction units 610 are joined by a pressurization treatment or the like between the first semiconductor substrate 110 and the second semiconductor substrate 120, and are electrically connected to each other. In this case, the junction units 610 of global control lines may be disposed below the corresponding pixel blocks 200 or may be present in the connection regions 1801 and the connection regions 1802. Meanwhile, the junction units 610 of local control lines are provided below the corresponding pixel blocks 200 (which is also above the control blocks 400B).

The imaging element 1008 changes the timing of the transfer unit 301 and/or the discharge unit 302 using local control lines, thereby controlling the exposure time for each pixel block 200. The imaging element 1008 can control the exposure time with fewer control lines by combining local control lines with global control lines.

Figure 20:
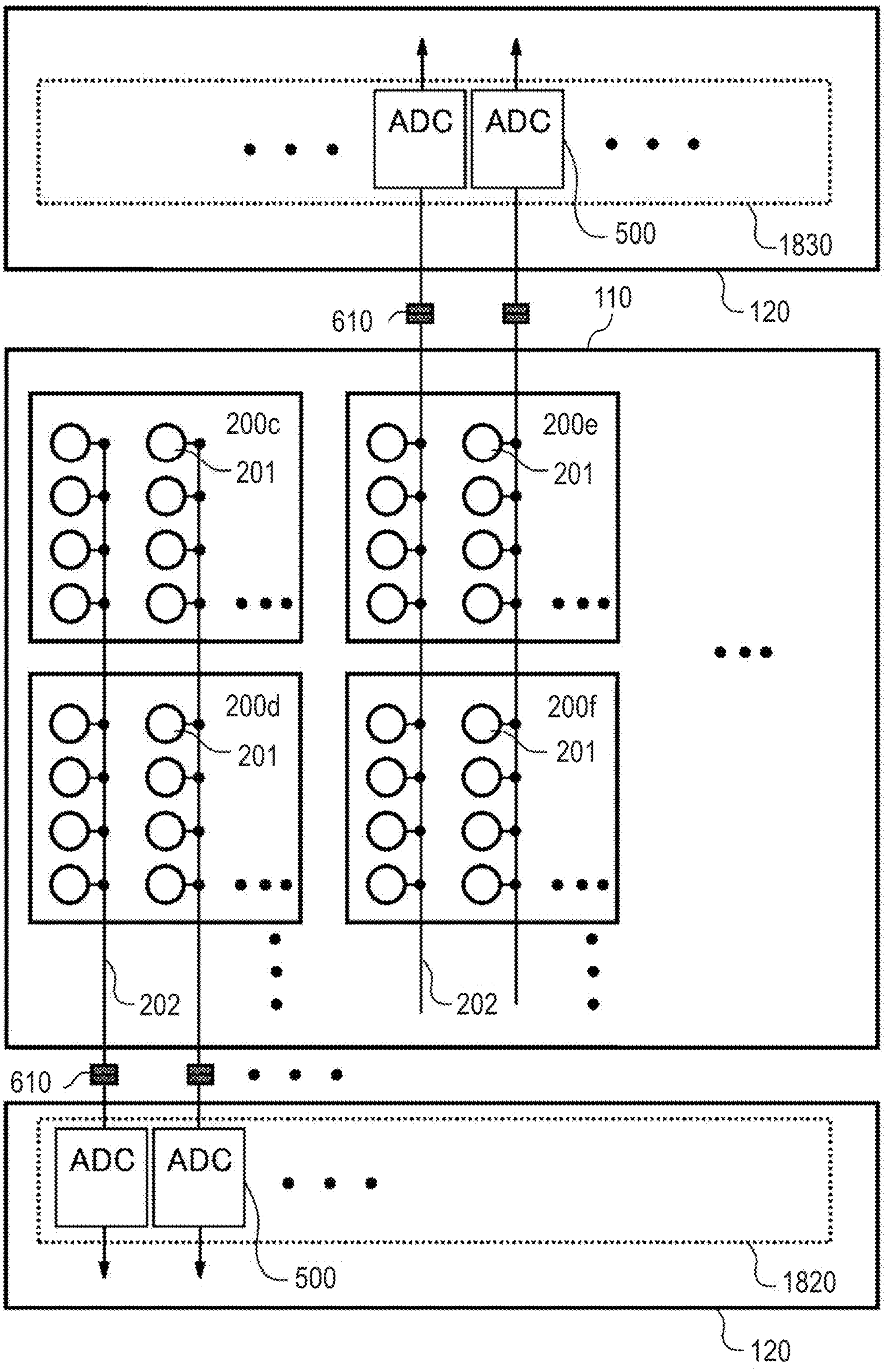
FIG. 20 is a descriptive view showing a connective relationship between ADC units and pixel blocks.

FIG. 20 is a descriptive view showing a connective relationship between ADC units and pixel blocks. As shown in FIG. 20, a shared signal line 202 extending in the column direction is disposed for each column in the pixel block 200*c*. This signal line 202 is also common to a plurality of pixel blocks 200*c* and 200*d* that are arranged in the column direction. Thus, in this example, m×M pixels 201 arranged in a column are connected to each signal line 202, and pixel signals are outputted from these pixels 201.

Each of the signal lines 202 is connected via the junction unit 610 to an ADC 2000 on the second semiconductor substrate 120. The plurality of ADCs 2000 corresponding to the plurality of signal lines 202 constitute the ADC unit 1820.

In the example of FIG. 20, the ADCs 2000 corresponding to pixel blocks 200*c* and 200*d* in odd-numbered columns are provided to the ADC unit 1820, and the ADCs 2000 corresponding to pixel blocks 200*e* and 200*f* in even-numbered columns are provided to the ADC unit 1830. However, the arrangement relationship between the pixel block 200*c* and the like and the corresponding ADC 1820 and the like is not limited thereto.

By this configuration, the respective ADCs 2000 convert the pixel signals sequentially outputted from the m×M pixels 201 in a connected column into digital signals and output the digital signals. In this case, the ADC units 1820 and 1830 overall convert, in a parallel fashion, the pixel signals outputted from the pixels 201 arranged in n×N columns in the row direction into digital signals. From this perspective, this digital conversion can be said to be one type of so-called column ADCs. Single slope ADCs are an example of ADCs here, but other digital conversion modes may be employed. The connecting position between the pixels 201 and the signal line 202 is not limited to the aspect shown in FIG. 20, and as another example, may be inside each of the pixel blocks 200*c* or the like.

Figure 21:
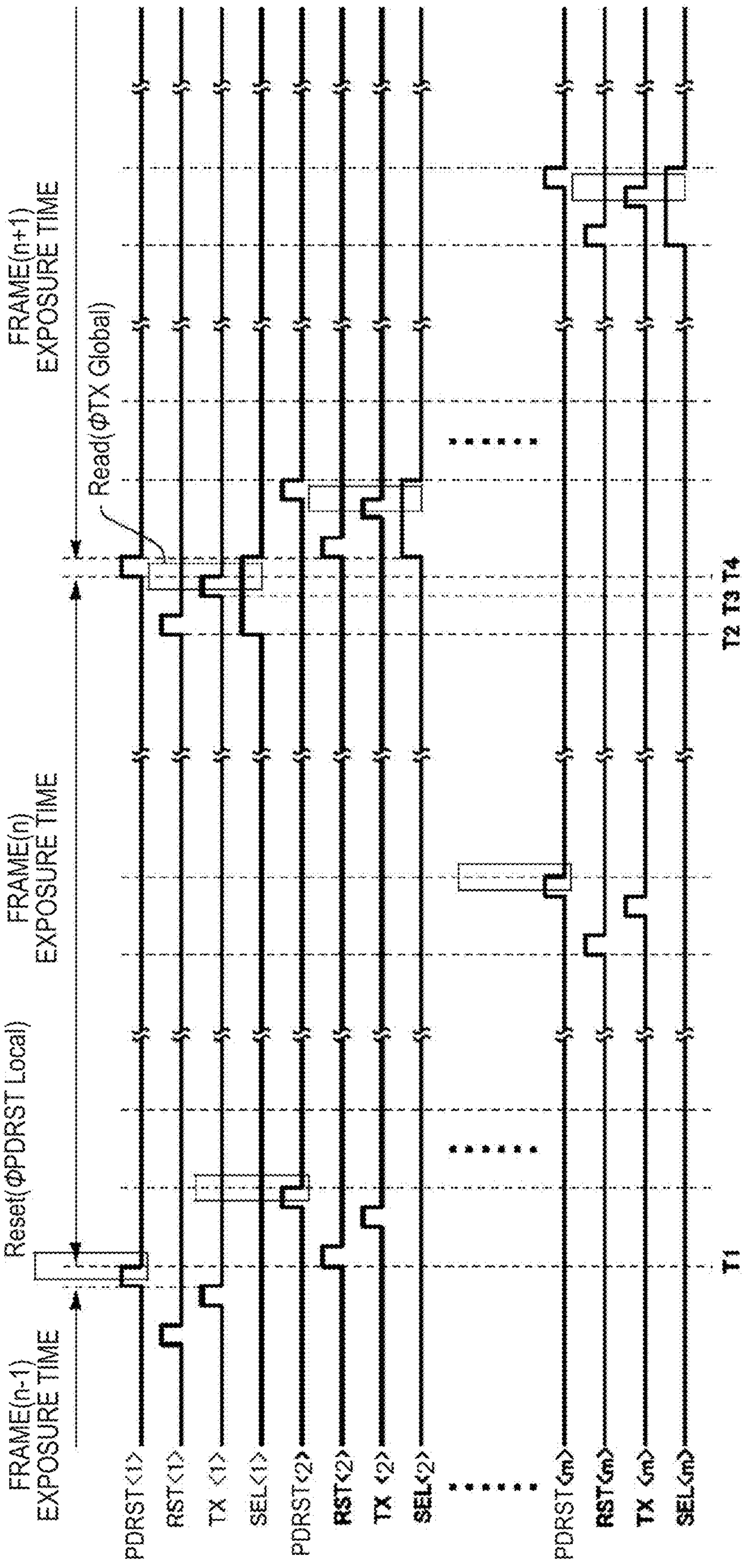
FIG. 21 is a timing chart showing an imaging operation in the pixel block of the imaging element.

FIG. 21 is a timing chart showing an imaging operation in the pixel block 200 of the imaging element 100B. The driving of the pixel blocks 200 is controlled by the transfer control signal φTX, the discharge control signal φPDRST, the reset control signal φRST, and the selection control signal φSEL.

The discharge control signal φPDRST controls the timing at which exposure is started. The exposure start timing corresponds to the fall timing of the discharge control signal φPDRST (e.g., time T1). In other words, prior to the start time T1 for exposure, the discharge control signal φPDRST causes the discharge unit 302 to turn ON, resulting in the electric charge accumulated in the photoelectric conversion unit 300 to be discharged, and the fall of the discharge control signal φPDRST results in the start of exposure. The discharge control signal φPDRST is locally controlled, and thus, it is possible to adjust the exposure time for each pixel block 200.

The transfer control signal φTX controls the timing at which exposure is ended. At the time T3, the transfer control signal φTX turns ON the transfer unit 301, thereby transferring the accumulated electric charge in the photoelectric conversion unit 300 to the FD 303. The exposure end timing corresponds to the fall timing of the transfer control signal φTX (e.g., time T4).

The reset control signal φRST controls the timing of discharge of the electric charge accumulated in the FD 303. At the time T2, the reset control signal PRST turns ON the reset unit 304, thereby discharging the electric charge of the FD 303. By discharging the electric charge in the FD 303 prior to the exposure end timing, it is possible to mitigate the effect of electric charge remaining in the FD 303 when the electric charge is transmitted from the photoelectric conversion unit 300.

The selection control signal φSEL is a signal for selecting a given pixel 201. The selection control signal φSEL controls the selection unit 352 so as to be ON or OFF. At the time T2, the selection control signal φφSEL is set to high. At the time T3, pixels 201 for which the selection control signal φSEL is set to high output a pixel signal to the signal line 202 as the transfer control signal φTX turns ON. Meanwhile, no pixel signal is outputted from pixels 201 for which the selection control signal φSEL is not set to high.

The imaging element 100B locally controls the discharge control signal φPDRST to change the exposure start timing for each pixel block 200, thereby enabling control of the exposure time for each pixel block 200. Also, the imaging element 100B may locally control the transfer control signal φTX, thereby enabling control of the exposure end timing for each pixel block 200. Also, the imaging element 100B may locally control both the transfer control signal φTX and the discharge control signal φPDRST, thereby enabling control of both the start timing and end timing of exposure for each pixel block 200.

The pixel signals of the pixels 201 correspond to the quantity of electric charge accumulated in the photoelectric conversion units 300. Thus, controlling the exposure timings of the pixels 201 entails controlling the timings at which the photoelectric conversion units 300 accumulate the electric charge. More specifically, controlling the exposure timings of the pixels 201 entails controlling the timings and lengths of the electric charge accumulation time from discharge to transfer of the electric charge.

Figure 22:
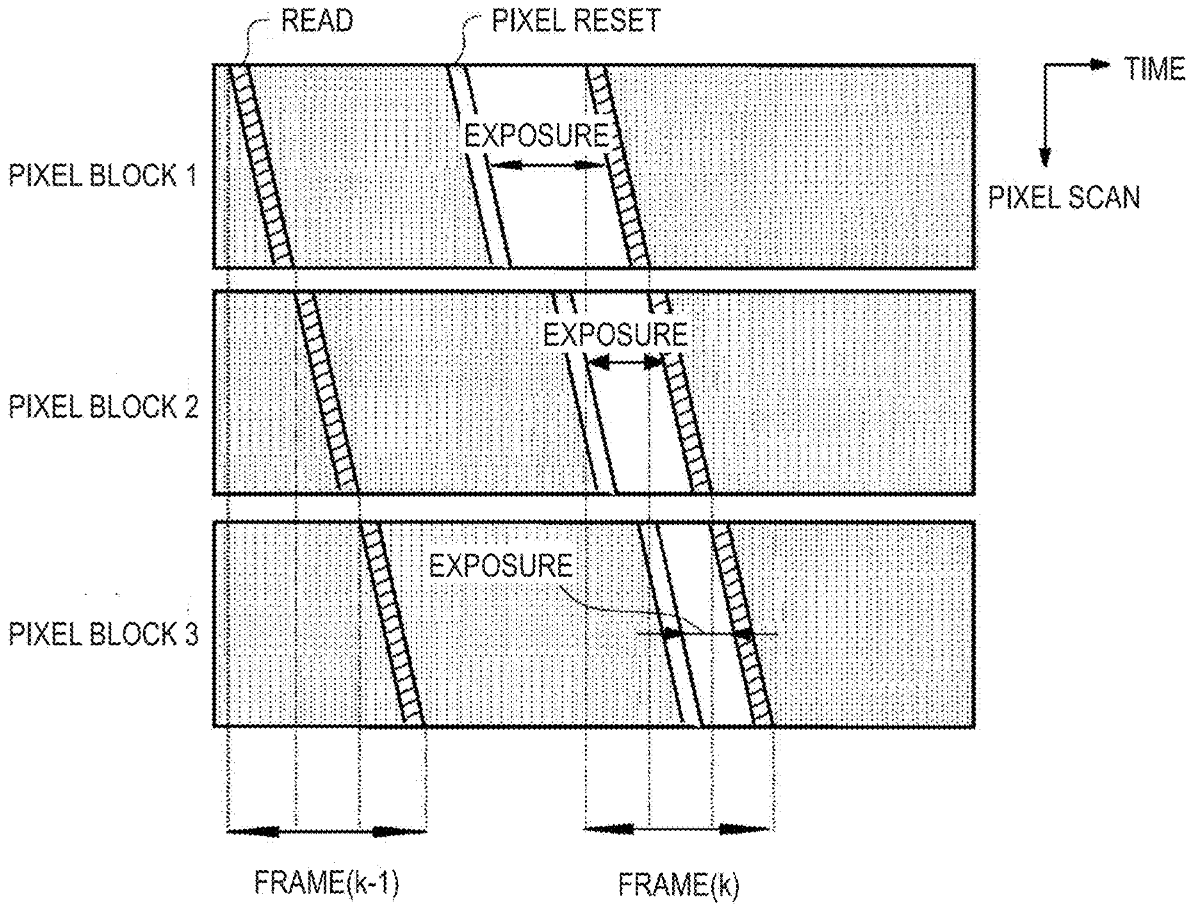
FIG. 22 is a descriptive diagram showing an example of an exposure timing of each pixel block.

FIG. 22 is a descriptive diagram showing an example of an exposure timing of each pixel block 200. The exposure time is controlled for each of the three pixel blocks 200 arranged in a column. Here, the imaging element 100B offsets the pixel reset times of the respective pixel blocks 200, thereby changing the exposure amount.

Meanwhile, the read timings for the pixel signals are in sequence from the topmost pixel block 200. In other words, the pixel signals are read from pixels 201 of a "pixel block 1," pixel signals are read from pixels 201 of a "pixel block 2," and then pixel signals are read from pixels 201 of a "pixel block 3."

Additionally, even in the pixel block 200, as described with reference to FIG. 21, the pixel signals are sequentially read from pixels 201 starting in the top row. Thus, in the pixel unit 101 overall, pixel signals are read in sequence from the top row of the m×M pixels 201 in the same column connected to the same signal line 202. In other words, the global driving unit 600 covers a plurality of pixel blocks 200 arranged in a row from the 1st row to the m×Mth row in setting the selection control signal φSEL to high, one row at a time.

In this case, as described in FIG. 20, for the plurality of pixel blocks 200 arranged in a row, the same selection control line 1904 is connected to the n×N pixels arranged in the same row. Thus, pixel signals are read in parallel from the n×N pixels 201 connected in a row for which the selection control signal φφSEL is set to high. As a result, it is possible to output an entire frame of pixel signals.

These pixel signals are, as described with reference to FIG. 20, converted to digital signals by the ADC units 1820 and 252. The pixel signals converted to digital signals are outputted to the next stage of image processing, thereby forming one frame of image.

As described above, the reading of the pixel signals is conducted sequentially from the top row of the same column among the plurality of pixel blocks 200, and from that perspective, the read method of the present embodiment can be said to be the so-called rolling shutter mode in the pixel unit 101 overall. However, even in such a case, different exposure times can be set for each pixel block 200.

In this manner, the imaging element 100B shown in FIGS. 16 to 22 performs exposure for each pixel block 200 individually, but the pixel signals are sequentially read for each pixel row, and A/D conversion is performed for each pixel column. Specifically, the imaging element 100B reads the pixel signals from the pixels 201 of the top pixel block 200 among the plurality of pixel blocks 200 arranged in a column, and then reads the pixel signals from pixels 201 in the pixel block 200 therebelow. Thus, distortions in the image resulting from the read order when capturing a moving subject are smoothed, and it is possible to display images with a more natural appearance to the viewer. More specifically, if a moving subject is read in parallel from the plurality of pixel blocks 200 arranged in a column, a plurality of stair-like shapes corresponding to the individual pixel blocks 200 forming a jagged edge appear in the vertical direction (i.e., the column direction of the pixels) of the image, resulting in an unnatural appearance to the viewer. By contrast, in the imaging element 100B shown in FIGS. 16 to 22, the plurality of stair-like shapes do not appear in the image.

The imaging element 100B shown in FIGS. 16 to 22 is not provided with ADC units, inside the control block 400B, that convert the analog signals to digital signals, and has signal processing units 1602 disposed outside of the control circuit unit 102. Thus, it is possible to reduce the area of the control block 400B, and reduce the size of the pixel blocks 200 disposed at positions corresponding to the control block 400B, or in other words, to perform exposure control by the control block 400B of fewer pixels. As a result, it is possible to perform precise exposure time control within the image, allowing for the boundaries between the pixel blocks 200 not to be conspicuous within the image. Additionally, it is possible to prevent the effect of noise on the pixels 201 resulting from heating, since digital conversion is not performed directly below the pixels 201.

Thus, the signal processing units 1602 need not be provided at a plurality of distant regions, and may instead be provided in one region for the overall pixel unit 101.

As described above, similar to the imaging element 100A, the reading of the pixel signals is conducted sequentially from the top row of the same column among the plurality of pixel blocks 200, and from that perspective, the read method of the imaging element 100B can also be said to be the so-called rolling shutter mode in the pixel unit 101 overall. However, like the imaging element 100A, even in such a case, different exposure times can be set for each pixel block 200. Thus, like the imaging element 100A, in the imaging element 100B as well, distortions in the image resulting from the read order when capturing a moving subject are smoothed, and it is possible to display images with a more natural appearance to the viewer.

[Autonomous Exposure Processing Unit 411]

Next, details regarding the above-mentioned autonomous exposure processing unit 411 will be described. In the description below, if not distinguishing between the imaging elements 100A and 100B, the reference character 100 is used for the imaging element, and if not distinguishing between the control blocks 400A and 400B, the reference character 400 is used for the control block.

As indicated in FIGS. 4 and 17, the autonomous exposure processing unit 411 is mounted in the control block 400. Alternatively, the autonomous exposure processing unit 411 can be mounted in the peripheral circuit units 121 instead of the control block 400, or can be mounted in both the control block 400 and the peripheral circuit units 121. Below, these three patterns will be described with reference to FIGS. 23 to 25.

Figure 23:
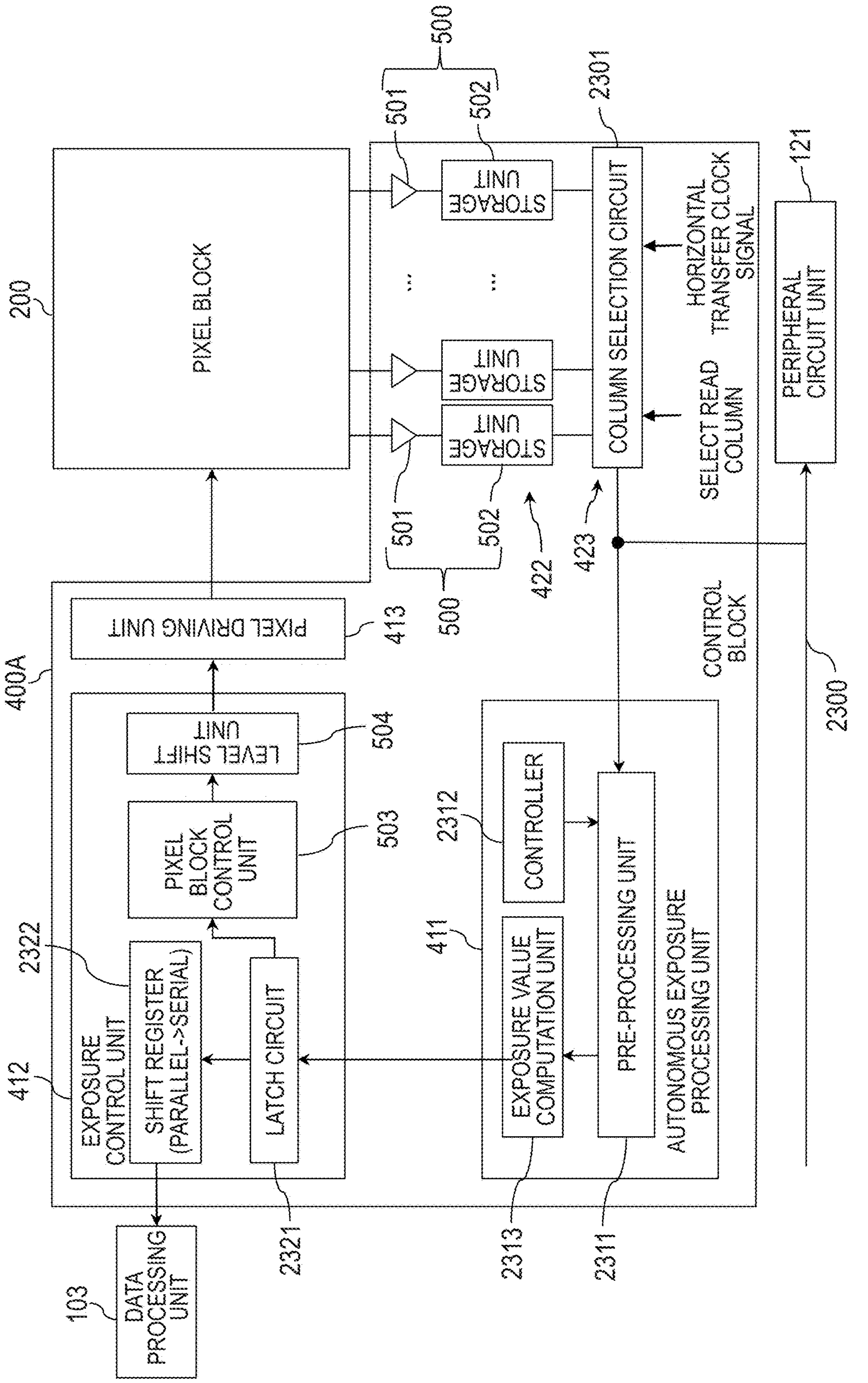
FIG. 23 is a block diagram showing a configuration example of an autonomous exposure control mode 1.

FIG. 23 is a block diagram showing a configuration example of an autonomous exposure control mode 1. The autonomous exposure control mode 1 is a configuration example in which the autonomous exposure processing unit 411 is mounted in the control block 400. As a result of the autonomous exposure processing unit 411 being added inside the control block 400, the circuit size of the control block 400 increases, but the size of each pixel 201 in the pixel block 200 correspondingly increases, and thus, it is possible to increase the light reception area.

Figure 25:
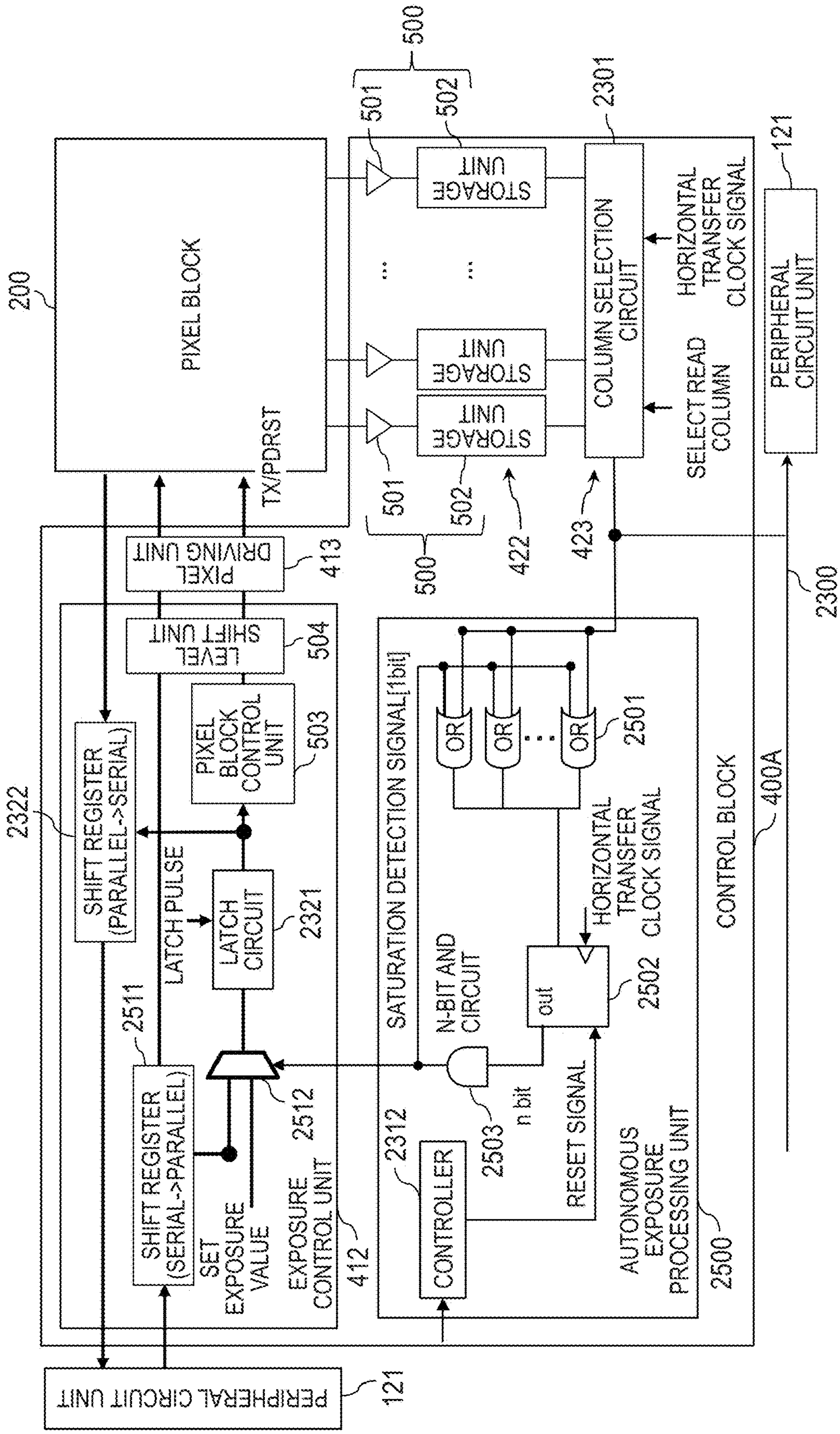
FIG. 25 is a block diagram showing a configuration example of an autonomous exposure control mode 3.

In FIG. 23, the control block 400A is the described example (similarly applies to FIG. 25). The control block 400A has the signal conversion unit 422, the signal output unit 423, the autonomous exposure processing unit 411, the exposure control unit 412, and the pixel driving unit 413. For ease of description, the signal input unit 421 is omitted. In the case of the control block 400B, the signal input unit 421, the signal conversion unit 422, and the signal output unit 423 are not included in the control block 400B, and are disposed on the second semiconductor substrate 120 as the signal processing unit 1602 (similarly applies to FIG. 25).

The signal conversion unit 422 has n ADCs 500. Each of the n ADCs 500 converts the analog pixel signals from the m pixels 201 connected to each other in the column direction to digital signals. The ADC 500 is constituted of a comparator 501 and a storage unit 502.

A column selection circuit 2301 is included in the signal output unit 423. The column selection circuit 2301 sequentially selects the columns of the pixel block 200 every time a read column selection signal is inputted from the outside. The column selection circuit 2301 outputs the digital pixel signals from the m pixels 201 in the selected column to the peripheral circuit unit 121 via a horizontal transfer line 2300 and also outputs the digital pixel signals to the autonomous exposure processing unit 411 every time a horizontal transfer clock signal is inputted from the outside.

The autonomous exposure processing unit 411 calculates the exposure value indicating the exposure time of the pixel block 200. Specifically, for example, the autonomous exposure processing unit 411 has a pre-processing unit 2311, a controller 2312, and an exposure value computation unit 2313.

The pre-processing unit 2311 acquires digital pixel signals for each pixel column of the pixel block 200 from the column selection circuit 2301. Then, the pre-processing unit 2311 calculates a statistical value for the acquired pixel signals (e.g., the mean, medium, maximum, or minimum). The pre-processing unit 2311 outputs this calculation result to the exposure value computation unit 2313.

The controller 2312 inputs the reset signal to the pre-processing unit 2311 to reset the pre-processing by the pre-processing unit 2311. As a result, the pre-processing unit 2311 calculates the statistical value of the pixel signals from the pixel block 200 for every reset, or in other words, every frame.

The exposure value computation unit 2313 determines the next exposure value on the basis of the calculation result from the pre-processing unit 2311 (the statistical value of the pixel signal). Specifically, for example, the exposure value computation unit determines the next exposure value on the basis of the calculation result to prevent underexposure or overexposure. The exposure value computation unit 2313 retains a first threshold and a second threshold, for example. The first threshold is for determining whether the calculation result indicates an underexposure. The second threshold is greater than the first threshold, and is for determining whether the calculation result indicates an overexposure.

The exposure value computation unit 2313 determines whether the calculation result is within a range from the first threshold to the second threshold. If the calculation result is within the range from the first threshold to the second threshold, then the exposure value computation unit outputs the calculation result as the exposure value to a latch circuit 2321 of the exposure control unit 412. If the calculation result is less than the first threshold, then the exposure value computation unit 2313 outputs the first threshold as the exposure value to the latch circuit 2321 of the exposure control unit 412. If the calculation result exceeds the second threshold, then the exposure value computation unit outputs the second threshold as the exposure value to the latch circuit 2321 of the exposure control unit 412.

Also, the exposure value computation unit 2313 may retain a plurality of different exposure value ranges. In such a case, if the calculation result is within the range from the first threshold to the second threshold, then the exposure value computation unit 2313 outputs a number indicating the exposure value range that includes the calculation result as the exposure value to the latch circuit 2321 of the exposure control unit 412.

If the calculation result is less than the first threshold, then the exposure value computation unit 2313 outputs a number indicating one or more ranges above the exposure value range including the calculation result as the exposure value to the latch circuit 2321 of the exposure control unit 412. If the calculation result exceeds the second threshold, then the exposure value computation unit 2313 outputs a number indicating one or more ranges below the exposure value range that includes the calculation result as the exposure value to the latch circuit 2321 of the exposure control unit 412.

The exposure control unit 412 has the latch circuit 2321, a shift register 2322, a pixel block control unit, and a level shift unit, for example. The latch circuit 2321 retains the exposure value from the autonomous exposure processing unit. The latch circuit 2321 outputs the retained exposure value to the pixel block control unit and the shift register 2322 every time a latch pulse is inputted from the outside.

The shift register 2322 performs parallel/serial conversion of the exposure value from the latch circuit 2321 and outputs the resulting exposure value as a serial signal to the data processing unit.

When the exposure time is calculated in an external system outside of the imaging element 100 and the calculation result is fed back to the imaging element 100, it takes more time for the calculation result to be reflected in the exposure time of the imaging element 100, and power consumption is also increased. By contrast, by providing the autonomous exposure processing unit 411 in the control block 400, it is possible to improve the speed at which the calculation result is reflected in the exposure time of the pixel block 200 and to reduce power consumption.

In FIG. 23, a case was described in which one control block 400 performed exposure control on each pixel block 200, but if the one control block 400 performs exposure control on a plurality of pixel blocks 200, the autonomous exposure processing unit 411 may sequentially select each pixel block 200 from the plurality of pixel blocks 200 in synchronization with the reset signal to calculate the exposure value. A selector is provided on the output side of the exposure value computation unit 2313, and the controller 2312 outputs to the selector a selection signal that selects each of the plurality of pixel blocks 200.

In this case, the exposure control unit 412 has a latch circuit 2321 and a shift register 2322 for each pixel block 200. Each latch circuit 2321 is connected to a selector (not shown) within the autonomous exposure processing unit 411, and upon receiving input of the exposure value from the selector, outputs the retained exposure value to the pixel block control unit 503 and the shift register 2322 every time a latch pulse is inputted. As a result, it is possible to realize autonomous exposure even when one control block 400 performs exposure control on a plurality of pixel blocks 200.

Figure 24:
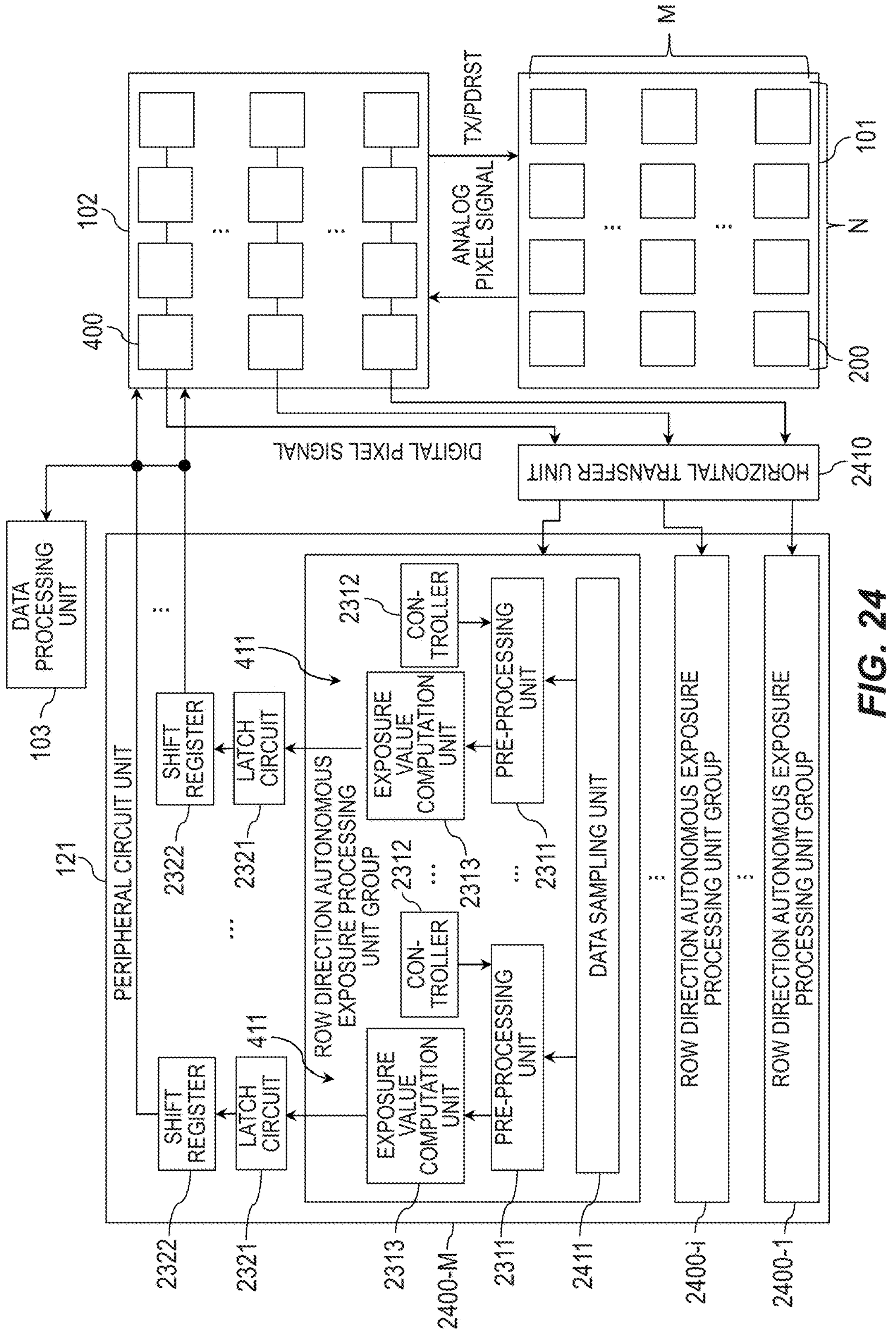
FIG. 24 is a block diagram showing a configuration example of an autonomous exposure control mode 2.

FIG. 24 is a block diagram showing a configuration example of an autonomous exposure control mode 2. The autonomous exposure control mode 2 is a configuration example in which the autonomous exposure processing unit 411 is mounted in the peripheral circuit unit 121. The autonomous exposure processing unit 411 is mounted in the peripheral circuit unit 121 instead of inside the control block. Thus, compared to FIG. 23, the control block 400 can have a smaller circuit size.

The peripheral circuit unit 121 is connected to the pixel unit 101 via a horizontal transfer unit 2410. The horizontal transfer unit 2410 is connected to each pixel block 200 (hereinafter referred to as the pixel block row) arranged in the row direction, and transfers the pixel signals for each pixel block row to the peripheral circuit unit 121. The pixel unit 101 is a collection of M rows by N columns of pixel blocks 200, and thus, the horizontal transfer unit 2410 transfers the pixel signals for each row of M pixel blocks to the peripheral circuit unit 121.

The peripheral circuit unit 121 has row direction autonomous exposure processing unit groups 2400-1 to 2400-M (if not distinguishing therebetween, these are simply referred to as the row direction autonomous exposure processing unit group 2400) for each pixel block. The row direction autonomous exposure processing unit group 2400 has a data sampling unit 2411 and an autonomous exposure processing unit 411 (pre-processing unit 2311, controller 2312, and exposure value computation unit 2313) for N columns of the pixel block. In FIG. 24, N=4, and thus, there are four sets of pre-processing units 2311, controllers 2312, and exposure value computation units 2313.

The data sampling unit 2411 subdivides the pixel signal array of pixel block rows from the horizontal transfer unit 2410 into N equal parts. The data sampling unit 2411 outputs the sampled pixel signal arrays to the corresponding pre-processing units 2311.

As described above, the pre-processing unit 2311 calculates the statistical values of the pixel signals from the corresponding pixel blocks 200. Also, the peripheral circuit unit 121 can be formed at a larger circuit size than the control block 400, and thus, the pre-processing unit 2311 can execute other processes besides calculating the statistical values of the pixel signals.

If, for example, the pre-processing unit 2311 has a memory for storing the pixel number of a defective pixel at the time of manufacturing within the corresponding pixel block 200 and the data sampling unit 2411 samples the pixel signal from said pixel number, then the pre-processing unit 2311 does not use this pixel signal for calculating the statistical values. As a result, it is possible to improve the accuracy of calculating the statistical values of the pixel signals.

Also, the pre-processing unit 2311 may acquire calculation results from another pre-processing unit 2311 that handles the pixel block 200 adjacent to the corresponding pixel block 200, and calculate the statistical values of the pixel signals from the corresponding pixel block 200 on the basis of the calculation results acquired from the other pre-processing unit 2311. As a result, it is possible to smooth the exposed jagged edge of adjacent pixel blocks 200.

Also, the exposure value computation unit 2313 has set thereto the first threshold and the second threshold, but a configuration may be adopted in which the first threshold and/or the second threshold can be modified according to the imaging mode of the imaging device in which the imaging element 100 is installed. As a result, an optimal exposure calculation according to the imaging mode is possible.

Also, the peripheral circuit unit 121 has the latch circuit 2321 and the shift register 2322 for each exposure value computation unit 2313. The shift register 2322 performs parallel/serial conversion of the exposure value from the latch circuit 2321 and outputs the resulting exposure value as a serial signal to the data processing unit 103 and outputs the exposure value to the exposure control unit 412 in the control block 400 corresponding to the pixel block 200.

Thus, according to the configuration shown in FIG. 24, the control block 400 can have a smaller circuit size compared to the configuration depicted in FIG. 23, and it is possible to reduce the size of the corresponding pixel block 200. Therefore, it is possible to increase the number of pixel blocks, enabling more precise autonomous exposure control. Also, the exposure control unit 412 and the pixel driving unit 413 may be installed in the peripheral circuit unit 121. As a result, the control block 400 can have an even smaller circuit size, and it is possible to reduce the size of the corresponding pixel block 200.

FIG. 25 is a block diagram showing a configuration example of an autonomous exposure control mode 3. The autonomous exposure control mode 3 is a configuration example in which the autonomous exposure processing unit 411 is mounted in both the control block 400A and the peripheral circuit unit 121. If executing autonomous exposure control in the control block 400A, this obviates the need for data transmission such as transmission of the pixel signals from the control block 400A to the peripheral circuit unit 121 and transmission of the exposure value from the peripheral circuit unit 121 to the pixel block 200. Thus, feedback to the corresponding pixel block 200 is more rapid compared to a case where the autonomous exposure control is executed by the peripheral circuit unit 121.

Meanwhile, the area of the control block 400A is limited by the dependence thereof on the area of the corresponding pixel block 200, and thus, it is possible to expand the circuit size of the autonomous exposure processing unit 411 if the same is installed in the peripheral circuit unit 121 rather than installed in the control block 400A. Thus, it is possible to provide higher level functionality (e.g., elimination of pixel signals of defective pixels described with reference to FIG. 24, control of exposed jagged edge formed with adjacent pixel block 200, calculation of optimal exposure according to imaging mode) for autonomous exposure control if the autonomous exposure processing unit 411 is installed in the peripheral circuit unit 121.

Thus, in the autonomous exposure control mode 3, depending on the state, the imaging element 100 executes autonomous exposure control using the peripheral circuit unit 121 if executing high functionality computation related to autonomous exposure control, and using the control block 400A if providing high speed feedback of the exposure value. In FIG. 25, as an example, in the autonomous exposure control mode 3, autonomous exposure control is executed by the row direction autonomous exposure processing unit group 2400 in the peripheral circuit unit 121, but the imaging element 100 executes autonomous exposure control for each control block 400A if some trigger is applied to the control circuit unit 102.

The imaging element 100 executes autonomous exposure control using the peripheral circuit unit 121 if high functionality computation related to autonomous exposure control is selected by user operation, and using the control block 400A if high speed feedback of the exposure value is selected by user operation. Also, if the remaining battery level is at or below a prescribed level, the imaging element 100 may select and execute the lower power consumption process among the high functionality computation regarding autonomous exposure control and high speed feedback of the exposure value.

The row direction autonomous exposure processing unit group 2400 installed in the peripheral circuit unit 121 is the same as the configuration shown in FIG. 24, and thus, depiction thereof is omitted in FIG. 25.

The column selection circuit 2301 outputs n bits of the digital pixel signal to n OR circuits 2501. In addition to the controller 2312, the autonomous exposure processing unit 2500 in the control block 400A has the n OR circuits 2501, an output data latch circuit 2502, and an n-bit AND circuit 2503.

Upon output of an n-bit signal from the output data latch circuit 2502, the controller 2312 inputs a reset signal to the output data latch circuit 2502.

The OR circuit 2501 is a 2-input 1-output OR circuit. One input of the OR circuit 2501 is connected to the column selection circuit, and the other input is connected to the output of the n-bit AND circuit 2503.

The n OR circuits 2501 are connected to the input of the output data latch circuit 2502. The output data latch circuit 2502 retains an n-bit signal from the n OR circuits 2501. Upon input of a horizontal transfer clock signal, the output data latch circuit 2502 outputs the n-bit signal to the n-bit AND circuit 2503. Also, upon input of the reset signal from the controller 2312, the output data latch circuit 2502 resets the retained n-bit signal and outputs, to the n-bit AND circuit 2503, an n-bit signal in which at least one of the n bits is 0.

The n-bit AND circuit 2503 is an n-input 1-output AND circuit, and the output of the output data latch circuit 2502 is connected to the input of the n-bit AND circuit 2503. The output of the n-bit AND circuit 2503 is connected to the selector 2512 of the exposure control unit 412 and the inputs of the respective OR circuit 2501. If the output from the n-bit AND circuit 2503 is "0," this indicates that the pixel column that outputted the n-bit digital pixel signal is not saturated. If the output from the n-bit AND circuit 2503 is "1," this indicates that the pixel column that outputted the n-bit digital pixel signal is saturated. Below, a 1-bit signal of "1" outputted from the n-bit AND circuit 2503 is referred to as a saturation detection signal.

If the value of the digital pixel signal from a pixel 201 of a pixel column is "1," this indicates that the pixel 201 is saturated. If the values of the n-bit signal from the column selection circuit 2301 are all "1," this indicates that the entire pixel column is saturated. In this case, "1," is inputted to the one input of all of the OR circuits 2501, and thus, the OR circuits 2501 output a 1-bit signal with a value of "1" to the output data latch circuit 2502.

The output data latch circuit 2502 retains the n bit signal indicating that all the values are "1," and upon input of the horizontal transfer clock signal, outputs the retained n-bit signal to the n-bit AND circuit 2503.

If receiving input of an n-bit signal where all values are "1," then the n-bit AND circuit 2503 outputs a saturation detection signal with a value of "1" to the selector 2512 and the OR circuits 2501. As a result, until the reset signal is inputted, the output data latch circuit 2502 outputs the n-bit signal with all values being "1" to the n-bit AND circuit 2503. Thus, the n-bit AND circuit 2503 outputs the saturation detection signal until the reset signal is inputted from the controller 2312 to the output data latch circuit 2502.

The exposure control unit 412 has, in addition to the configuration shown in FIG. 24, the shift register 2511 and the selector 2512. The shift register 2511 performs serial/parallel conversion on the exposure value from the peripheral circuit unit 121, and outputs the result to the level shift unit 504 and the selector 2512.

The selector 2512 receives input of the exposure value from the shift register 2511 and the set exposure value. The selector 2512 selects the exposure value from the shift register 2511 or the set exposure value on the basis of the output signal from the n-bit AND circuit 2503, and outputs the selected exposure value to the latch circuit 2321. The set exposure value is an exposure value corresponding to an exposure time at which the pixels 201 are not saturated, and is set such that the exposure time is at a minimum, for example.

The set exposure value is set by being calculated by an external system outside of the control block 400A, for example. The set exposure value may be a fixed value and may be selected from the external system. The external system is an image processing unit that is connected to the peripheral circuit unit 121 in the imaging element 100, the data processing unit 103 of the third semiconductor substrate 130, or the imaging element 100 in the imaging device having the imaging element 100.

Specifically, if the output signal from the n-bit AND circuit 2503 is not a saturation detection signal, for example, the selector 2512 selects an exposure value from the shift register 2511 and outputs the same to the latch circuit 2321. On the other hand, if the output signal from the n-bit AND circuit 2503 is a saturation detection signal, the selector 2512 selects the set exposure value and outputs the same to the latch circuit 2321.

The autonomous exposure processing unit 2500 and the exposure control unit 412 in the control block 400A execute autonomous exposure control using the exposure value from the peripheral circuit unit 121 until saturation is detected in the control block 400A. If saturation is detected in the control block 400A, the set exposure value within the exposure control unit 412 is used to execute autonomous exposure control.

As a result, it is possible to select between a process of setting a high accuracy exposure value according to the exposure value from the peripheral circuit unit 121 for non-saturated pixel columns, and a process enabling simple and high-speed feedback of switching to the set exposure value such that the saturation state of the pixel column becomes non-saturated.

The autonomous exposure processing unit 2500 in the control block 400 may be the autonomous exposure processing unit 411 shown in FIG. 23. In this case, a configuration may be adopted to allow user operation to select between the autonomous exposure processing unit 411 in the peripheral circuit unit 121 and the autonomous exposure processing unit 411 in the control block 400, for example.

The imaging device in which the imaging element 100 is installed may select between the autonomous exposure processing unit 411 in the peripheral circuit unit 121 and the autonomous exposure processing unit 411 in the control block 400, on the basis of the remaining battery level, for example. In this case, the imaging device may select the autonomous exposure control by the autonomous exposure processing unit 411 in the peripheral circuit unit 121 if the battery level is at or above a prescribed value, and select the autonomous exposure control by the autonomous exposure processing unit 411 in the control block 400 if the battery level is not at or above the prescribed value. Also, if high quality imaging is desired, the user would select the autonomous exposure processing unit 411 in the peripheral circuit unit 121, and if reduced power consumption is desired, the user would select the autonomous exposure processing unit 411 in the control block 400.

<Autonomous Exposure Control 1 by Addition of Memory>

Next, details regarding autonomous exposure control 1 by the addition of a memory to the above-mentioned basic configuration will be described. In the description below, if not distinguishing between the imaging elements 100A and 1008, the reference character 100 is used for the imaging element, and if not distinguishing between the control blocks 400A and 400B, the reference character 400 is used for the control block. Autonomous exposure control 1 by the addition of a memory is performed by pixels 201 resulting from adding an analog memory to each of the above-mentioned pixels 201, and will be described with reference to FIGS. 26 to 45. By adding an analog memory to the pixel 201, distortion in the image by the rolling shutter operation shown in FIGS. 8, 9, 15, and 21 is mitigated. Here, local control and global control of the above-mentioned imaging element 100 will be described specifically.

Figure 26:
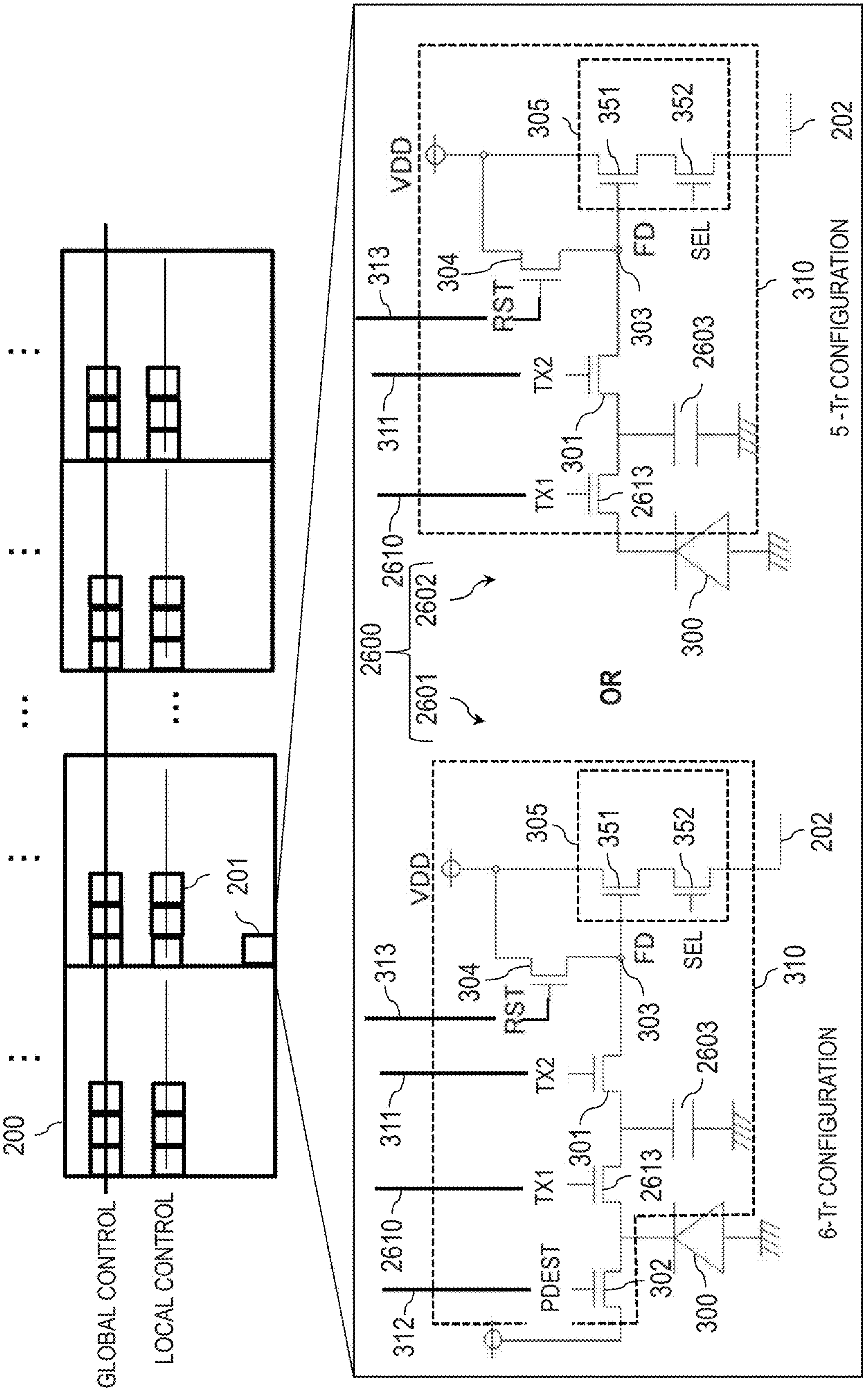
FIG. 26 is a descriptive view showing local control and global control.

FIG. 26 is a descriptive view showing local control and global control. Local control refers to a configuration in which the pixel control unit 401 of the control block 400 controls the pixel block 200 to which the pixel control unit 401 is connected such that pixels in the same pixel row of differing pixel blocks 200 positioned in the same pixel block row conduct differing operations. Global control refers to a configuration in which the peripheral circuit unit 121 controls the pixel blocks 200 such that pixels in the same pixel row of differing pixel blocks 200 positioned in the same pixel block row conduct the same operation throughout the entire pixel unit 101. In global control, pixels belonging to the same pixel row but different pixel block rows are controlled to conduct the same operation.

The pixel 201 is provided with a first transfer unit 2613 between the transfer unit 301 and the photoelectric conversion unit 300 (below, the transfer unit 301 is referred to as a second transfer unit 301, the transfer control signal φTX inputted to the gate terminal of the second transfer unit 301 is referred to as a second transfer control signal φTX2, and the transfer control line 311 thereof is referred to as a second transfer control line 311), and a retention unit 2603 that is an analog memory. A pixel 2601 having a 6-transistor (6-Tr) configuration on the left side is a pixel 201 resulting from adding the first transfer unit 2613 and the retention unit 2603 to the circuit configuration of the pixel 201 shown in FIG. 3.

The gate terminal of the first transfer unit 2613 is connected to a first transfer control line 2610 for receiving input of the first transfer control signal φTX1. The first transfer control line 2610 is connected to the pixel control unit 401 of the control block 400 that controls the pixel block 200 including the pixels 201 in a locally controllable configuration, and is connected to the peripheral circuit unit 121 in a globally controllable configuration.

A pixel 2602 having a 5-Tr configuration on the right side is a pixel 201 resulting from adding the first transfer unit 2613 and the retention unit 2603 to the circuit configuration of the pixel 201 shown in FIG. 14.

The retention unit 2603 is constituted of a capacitor, and the first transfer unit 2613 is constituted of a transistor. The retention unit 310 retains the electric charge of the photoelectric conversion unit 300. In the pixels 2601 and 2602, after resetting the photoelectric conversion unit 300 (PD reset) but prior to reading by the second transfer unit 301, the first transfer unit 2613 transfers the electric charge accumulated in the photoelectric conversion unit 300 to the retention unit 2603 upon input to the gate terminal of the first transfer unit 2613 of the first transfer control signal φTX1. The second transfer unit 301 reads the electric charge retained in the retention unit 2603, and transfers the electric charge to the FD 303 functioning as an accumulation unit. The pixel output unit 305 outputs a voltage signal based on the electric charge accumulated in the FD 303 to the signal line 202. If not distinguishing between the pixels 2601 and 2602, the pixels are collectively referred to as the pixels 2600.

Autonomous exposure control of the pixel blocks 200 involves: an autonomous exposure control mode performed by the imaging element 100A by which autonomous exposure control is performed at the pixel block 200 level in the imaging element 100A, analog pixel signals are read at the pixel block 200 level, and A/D conversion is performed thereon; and an autonomous exposure control mode performed by the imaging element 100B in which autonomous exposure control is performed at the level of the pixel blocks 200 in the imaging element 100B, but the analog pixel signals are read sequentially for each pixel row, and the analog pixel signals are subjected to A/D conversion at the level of pixel columns across pixel blocks 200 in the same pixel block column. In the case of the autonomous exposure control mode by the imaging element 100B, the analog pixel signals are read at the same timing for all pixels in the same pixel column in differing pixel block columns.

Adjustment of the exposure time at the pixel block 200 involves "PD reset" in which a reset is applied by the photoelectric conversion unit 300, "PD→ memory transfer" in which the electric charge from the photoelectric conversion unit 300 is temporarily retained in the retention unit 2603, and "PD→FD transfer" in which the electric charge retained in the retention unit 2603 is transferred to the FD 303 (FD read).

In the case of PD reset, the exposure time can be adjusted by the start timing for exposure. Also, in the case of PD reset, in the pixel 2601, the discharge unit 302 is the transistor necessary for local control, and in the pixel 2602, the second transfer unit 301, the reset unit 304, and the first transfer unit 2613 are the transistors necessary for local control.

In the case of PD→FD transfer, the exposure time can be adjusted by the end timing for exposure. Also, in the case of PD→FD transfer, the first transfer unit 2613 is the transistor necessary for local control.

Control for each combination of the autonomous exposure control mode (imaging element 100A or imaging element 100B), the circuit configuration of the pixel 201 (pixel 2601 or pixel 2602), and the exposure time adjustment mode (PD reset or PD→FD transfer) will be described. In order to simplify the explanation, an example will be described of a pixel block column constituted of six pixel blocks 200-1 to 200-6.

[Autonomous Exposure Control Mode by Imaging Element 100A Including 6-Tr Pixels 2601]

Figure 27:
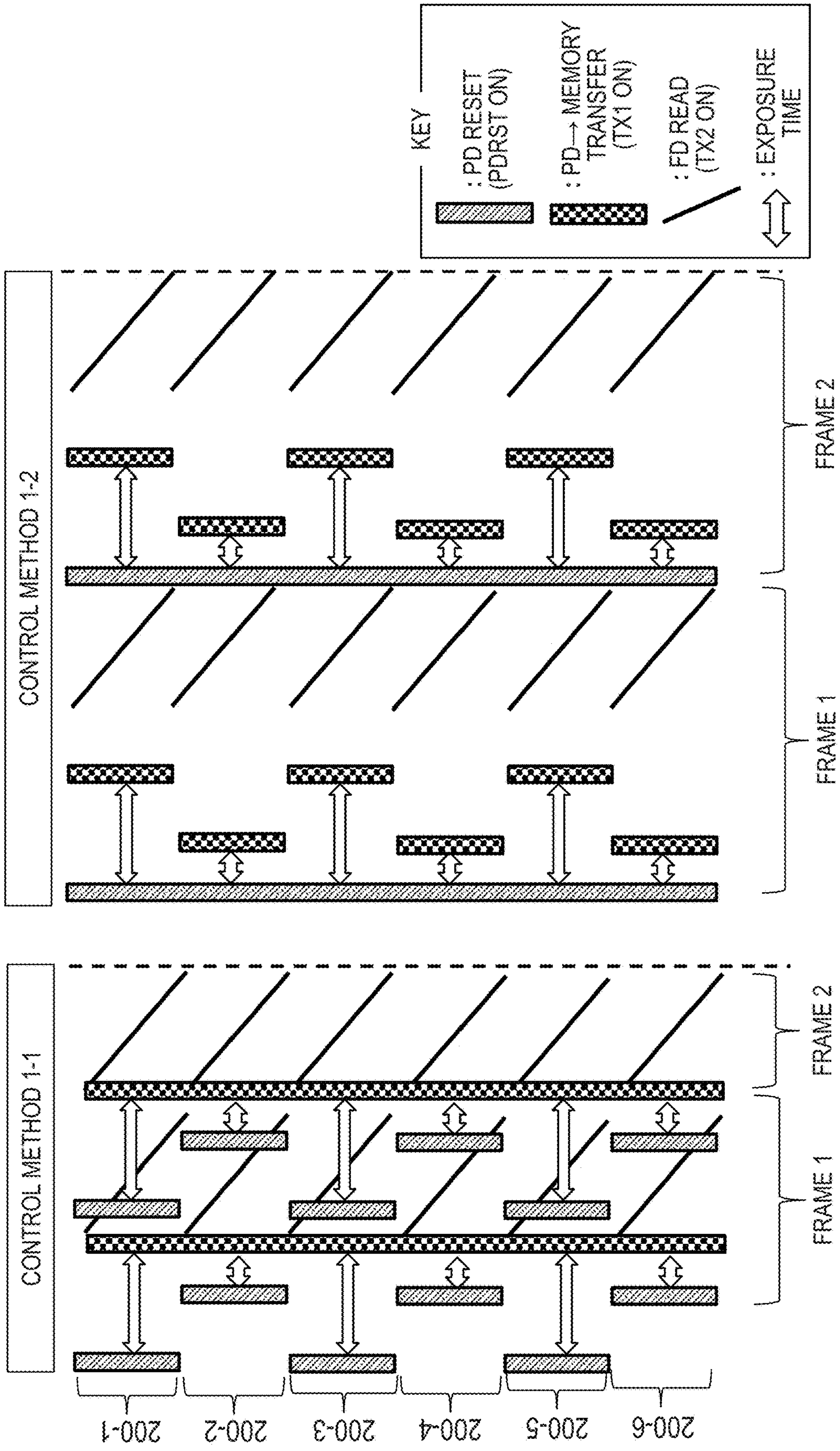
FIG. 27 is a descriptive view showing a control method example by an autonomous exposure control mode by the imaging element including 6-Tr pixels 2601.

FIG. 27 is a descriptive view showing a control method example by an autonomous exposure control mode by the imaging element 100A including 6-Tr pixels 2601. In FIG. 27, the control method 1-1 is a control example for when the exposure time adjustment mode is PD reset, and the control method 1-2 is a control example for when the exposure time adjustment mode is PD→FD transfer. Below, a branch number of "1" for the control method indicates that the exposure time adjustment mode is PD reset, and a branch number of "2" indicates that the exposure time adjustment mode is PD→FD transfer. In FIG. 27, the vertical direction indicates the column direction of the pixel blocks 200, and the horizontal direction indicates the passage of time. This similarly applies to descriptive views showing other control method examples below.

Figure 28:
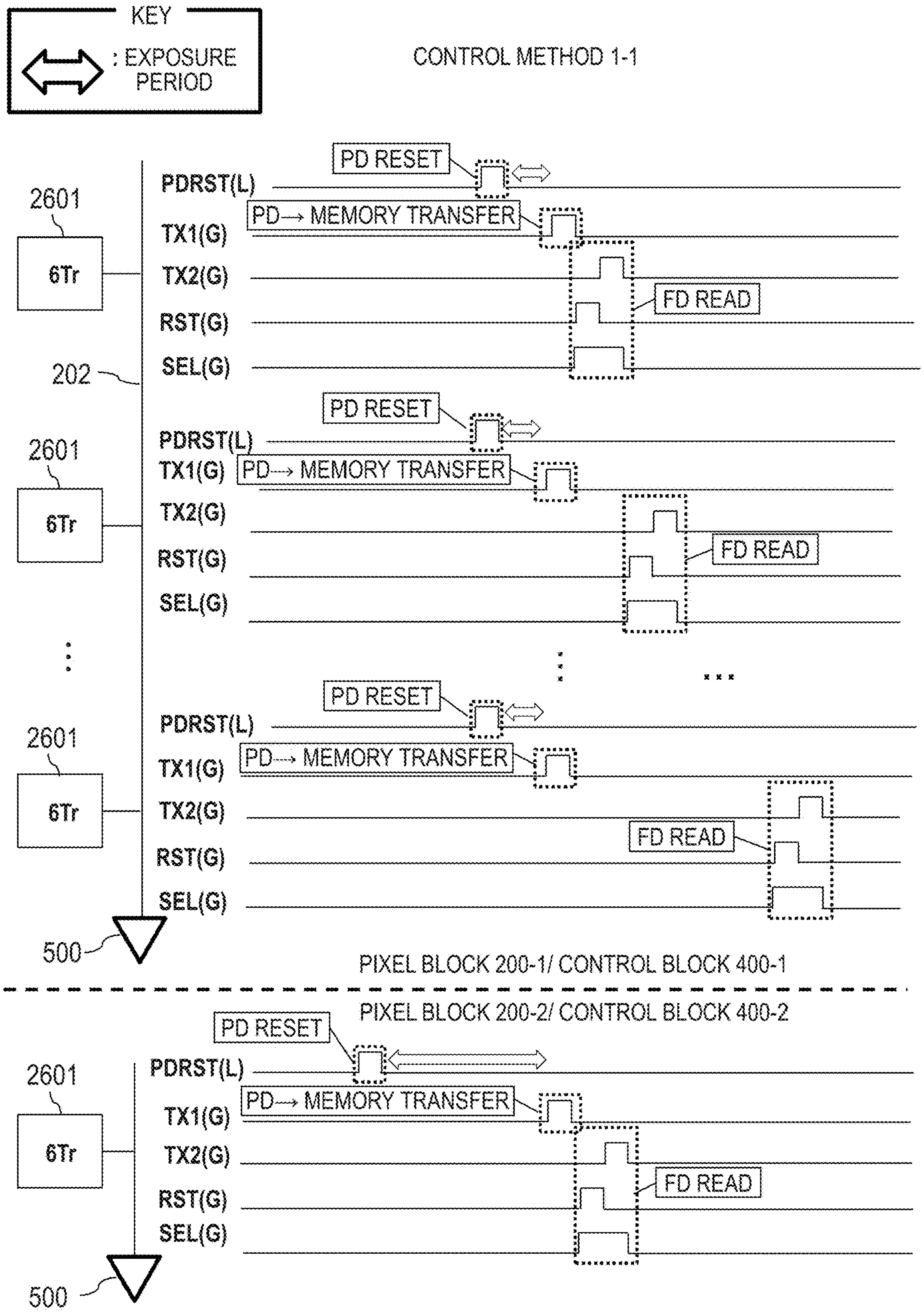
FIG. 28 is a pulse chart for the control method 1-1.
Figure 29:
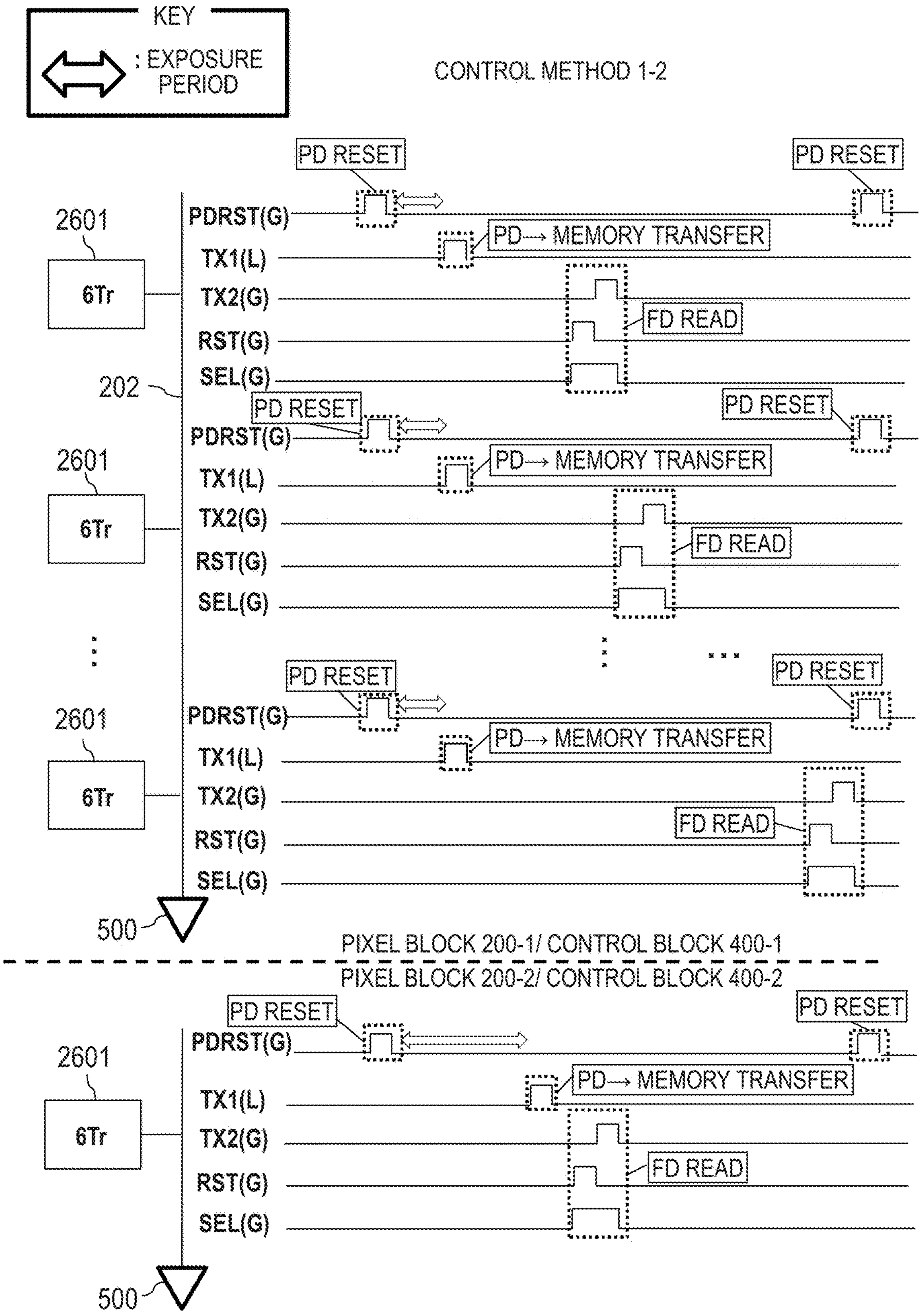
FIG. 29 is a pulse chart for the control method 1-2.

FIG. 28 is a pulse chart for the control method 1-1, and FIG. 29 is a pulse chart for the control method 1-2. In FIGS. 28 and 29, the symbols (G) and (L) in parentheses at the end of the signal names refer to global signals (G) resulting from global control and local signals (L) resulting from local control. This similarly applies to pulse charts described below.

In FIGS. 27 and 28, in the control method 1-1, the discharge unit 302 is a transistor necessary for local control. In each of the pixel blocks 200-1 to 200-6, when the discharge control signal φPDRST is inputted through local control to the gate terminal of the discharge unit 302 of the pixel 2601, the photoelectric conversion unit 300 is reset, resulting in the start of exposure at the photoelectric conversion unit 300 (PD reset).

Next, PD→FD transfer is performed in the pixel blocks 200-1 to 200-6. Specifically, for example, the electric charge accumulated in the photoelectric conversion unit 300 is transferred to the retention unit 2603 upon input by global control of the first transfer control signal φTX1 to the gate terminal of the first transfer unit 2613 of the pixel 2601 (PD→ memory transfer). Since global control is being performed, a different exposure time is set respectively for the pixel blocks 200-1 to 200-6 with differing start timings for exposure.

In the pixel blocks 200-1 to 200-6, when the reset control signal φRST is inputted by global control to the gate terminal of the reset unit 304 of the pixel 2601, the second transfer control signal φTX2 is inputted by global control to the gate terminal of the second transfer unit 301, and the selection signal SEL is inputted by global control to the gate terminal of the selection unit 352, then the electric charge accumulated in the retention unit 2603 is transferred to the FD 303 and outputted from the selection unit 352 as an analog pixel signal (FD read).

In FIG. 27, in the control method 1-1, the PD reset and the FD read are performed through different paths in the pixel 2601, and thus, the PD reset of the frame 2 can be performed prior to the end of the FD read of the frame 1.

In FIGS. 27 and 29, in the control method 1-2, the first transfer unit 2613 is a transistor necessary for local control. In the pixel blocks 200-1 to 200-6, when the discharge control signal φPDRST is inputted through global control to the gate terminal of the discharge unit 302 of the pixel 2601, the photoelectric conversion unit 300 is reset, resulting in the start of exposure at the photoelectric conversion unit 300 (PD reset).

Next, PD→FD transfer is performed in each of the pixel blocks 200-1 to 200-6. Specifically, for example, the electric charge accumulated in the photoelectric conversion unit 300 is transferred to the retention unit 2603 upon input by local control of the first transfer control signal φTX1 to the gate terminal of the first transfer unit 2613 of the pixel 2601 (PD→ memory transfer). Since local control is being performed, the end timings for exposure differ respectively for the pixel blocks 200-1 to 200-6. Thus, different exposure times are set respectively for the pixel blocks 200-1 to 200-6.

In the pixel blocks 200-1 to 200-6, when the reset control signal φRST is inputted by global control to the gate terminal of the reset unit 304 of the pixel 2601, the second transfer control signal φTX2 is inputted by global control to the gate terminal of the second transfer unit 301, and the selection signal SEL is inputted by global control to the gate terminal of the selection unit 352, then the electric charge accumulated in the retention unit 2603 is transferred to the FD 303 and outputted from the selection unit 352 as an analog pixel signal (FD read).

In FIG. 27, similar to the control method 1-1, in the control method 1-2, the PD reset and the FD read are performed through different paths in the pixel 2601, but the PD→ memory transfer of the frame 2 by the first transfer unit 2613 is performed after the end of the FD read of the frame 1.

[Autonomous Exposure Control Mode by Imaging Element 100A Including 6-Tr Pixels 2602]

Figure 30:
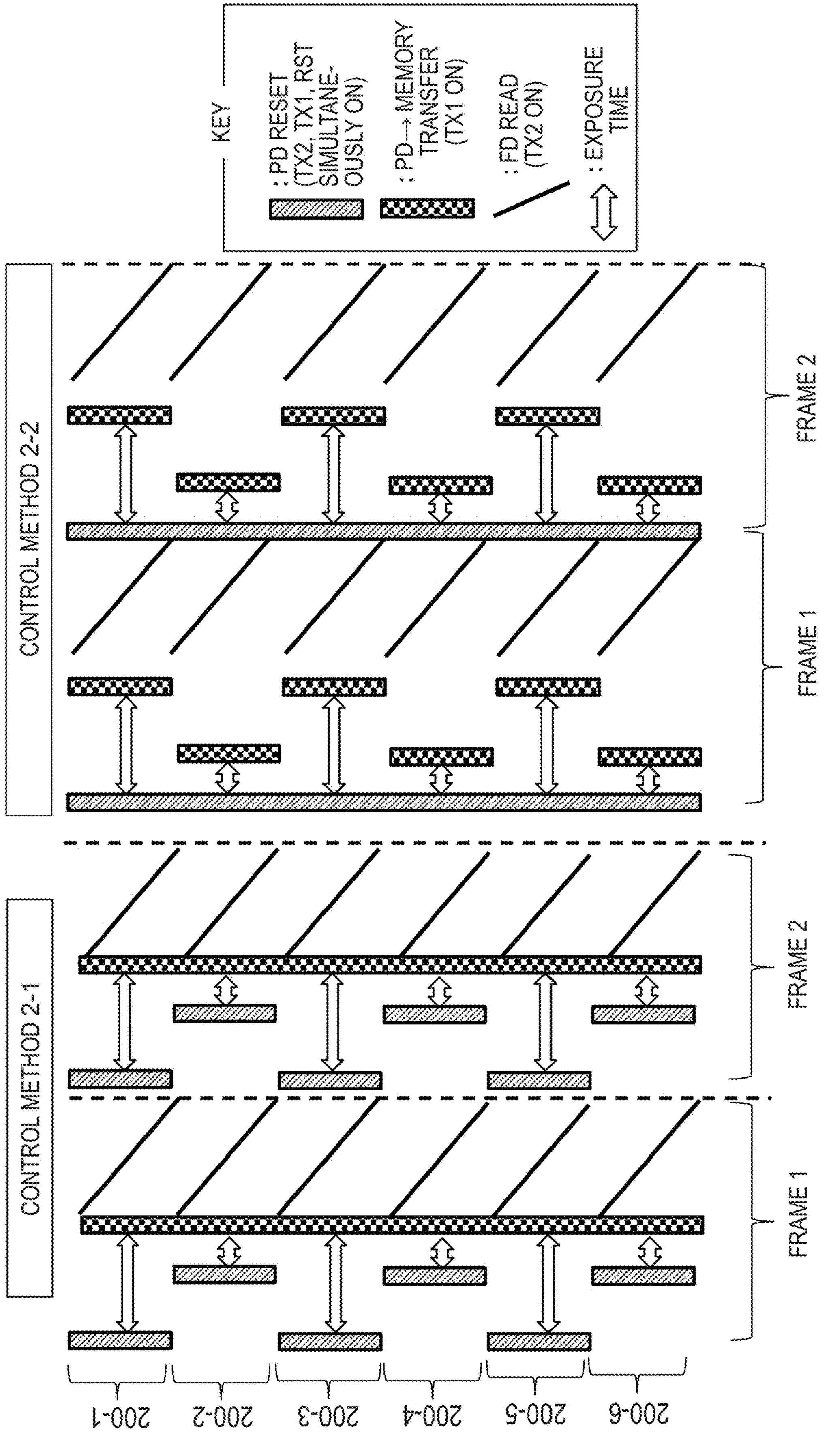
FIG. 30 is a descriptive view showing a control method example by an autonomous exposure control mode by the imaging element including 5-Tr pixels.

FIG. 30 is a descriptive view showing a control method example by an autonomous exposure control mode by the imaging element 100A including 5-Tr pixels 2602. In FIG. 30, the control method 2-1 is a control example for when the exposure time adjustment mode is PD reset, and the control method 2-2 is a control example for when the exposure time adjustment mode is PD→FD transfer.

Figure 31:
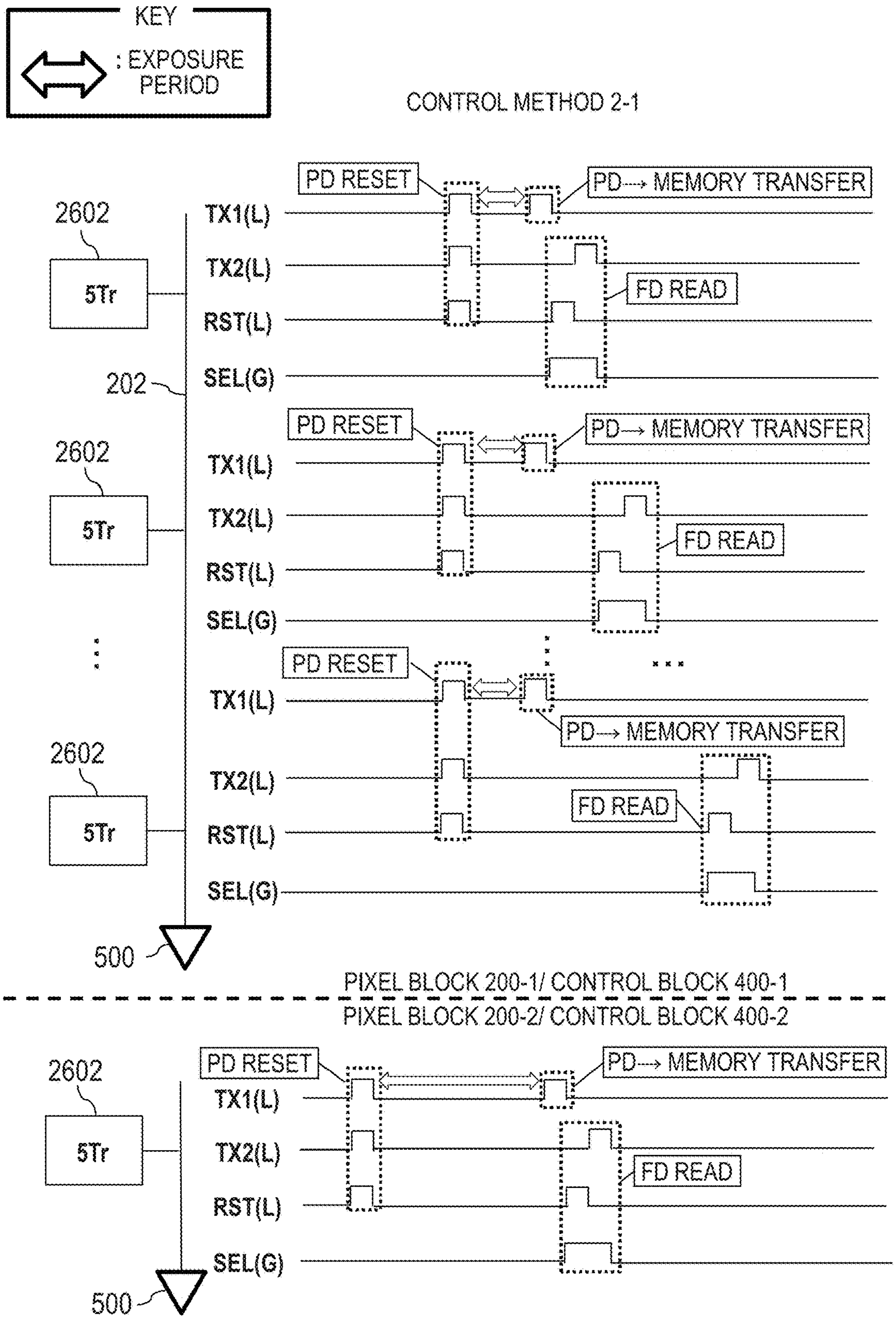
FIG. 31 is a pulse chart for the control method 2-1.
Figure 32:
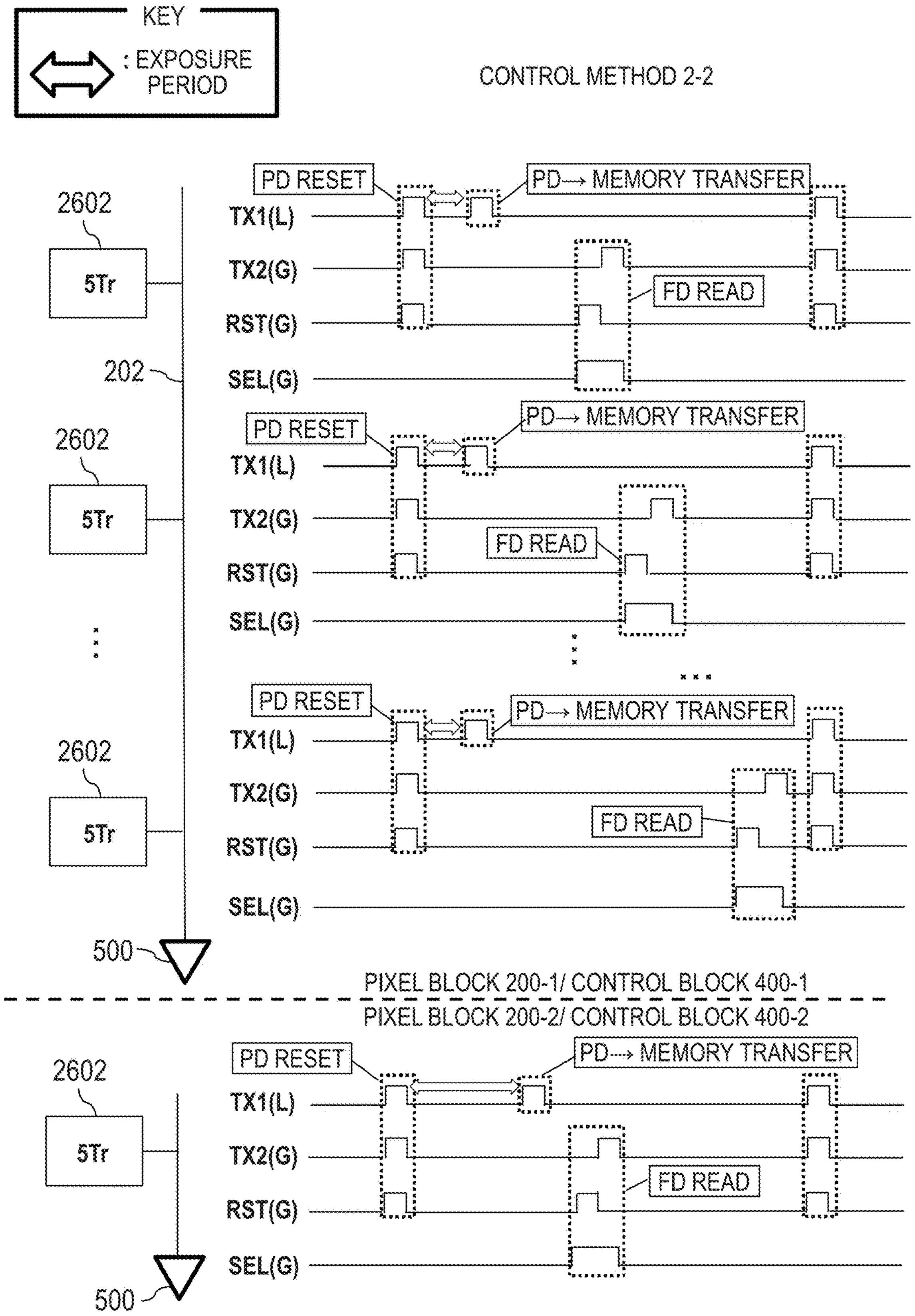
FIG. 32 is a pulse chart for the control method 2-2.

FIG. 31 is a pulse chart for the control method 2-1, and FIG. 32 is a pulse chart for the control method 2-2. In FIGS. 30 and 31, in the control method 2-1, the second transfer unit 301, the reset unit 304, and the first transfer unit 2613 are transistors necessary for local control. In each of the pixel blocks 200-1 to 200-6, when the first transfer control signal φTX1 is inputted by local control to the gate terminal of the first transfer unit 2613 of the pixel 2602, the second transfer control signal φTX2 is inputted by local control to the gate terminal of the second transfer unit 301, and the reset control signal φRST is inputted by local control to the gate terminal of the reset unit 304, then the photoelectric conversion unit 300 is reset, resulting in the start of exposure at the photoelectric conversion unit 300 (PD reset).

Next, PD→FD transfer is performed in the pixel blocks 200-1 to 200-6. Specifically, for example, the electric charge accumulated in the photoelectric conversion unit 300 is transferred to the retention unit 2603 upon input through the locally controllable first transfer control line 2610 of the first transfer control signal φTX1 to the gate terminal of the first transfer unit 2613 of the pixel unit 2601 (however, the timing for transfer is determined by global operation over the entire pixel unit 101) (PD→ memory transfer). Since the PD reset is being performed by local control, a different exposure time is set respectively for the pixel blocks 200-1 to 200-6 with differing start timings for exposure.

In the pixel blocks 200-1 to 200-6, when the reset control signal φRST is inputted through the locally controllable reset control line 313 to the gate terminal of the reset unit 304 of the pixel 2602 (however, the read timing is determined by global operation with the same timing for all pixels in the row direction for the entire pixel unit 101), the second transfer control signal φTX2 is inputted through the locally controllable second transfer control line 311 to the gate terminal of the second transfer unit 301 (however, the read timing is determined by a global operation with the same timing for all pixels in the row direction for the entire pixel unit 101), and the selection signal SEL is inputted by global control to the gate terminal of the selection unit 352, then the electric charge accumulated in the retention unit 2603 is transferred to the FD 303 and outputted from the selection unit 352 as an analog pixel signal (FD read).

In FIGS. 30 and 32, in the control method 2-2, the first transfer unit 2613 is a transistor necessary for local control. In the pixel blocks 200-1 to 200-6, when the first transfer control signal φTX1 is inputted through the locally controllable first transfer control line 2610 to the gate terminal of the first transfer unit 2613 of the pixel 2602 (however, the reset timing is determined by a global operation with the same timing for all pixels in the row direction for the entire pixel unit 101), the second transfer control signal φTX2 is inputted by global control to the gate terminal of the second transfer unit 301, and the reset control signal φRST is inputted by global control to the gate terminal of the reset unit 304, then the photoelectric conversion unit 300 is reset, resulting in the start of exposure at the photoelectric conversion unit 300 (PD reset).

Next, PD→FD transfer is performed in each of the pixel blocks 200-1 to 200-6. Specifically, for example, the electric charge accumulated in the photoelectric conversion unit 300 is transferred to the retention unit 2603 upon input by local control of the first transfer control signal φTX1 to the gate terminal of the first transfer unit 2613 of the pixel 2601 (PD→ memory transfer). Since local control is being performed, the end timings for exposure differ respectively for the pixel blocks 200-1 to 200-6. Thus, different exposure times are set respectively for the pixel blocks 200-1 to 200-6.

In the pixel blocks 200-1 to 200-6, when the reset control signal φRST is inputted by global control to the gate terminal of the reset unit 304 of the pixel 2601, the second transfer control signal φTX2 is inputted by global control to the gate terminal of the second transfer unit 301, and the selection signal SEL is inputted by global control to the gate terminal of the selection unit 352, then the electric charge accumulated in the retention unit 2603 is transferred to the FD 303 and outputted from the selection unit 352 as an analog pixel signal (FD read).

[Autonomous Exposure Control Mode by Imaging Element 100B Including 6-Tr Pixels 2601]

Figure 33:
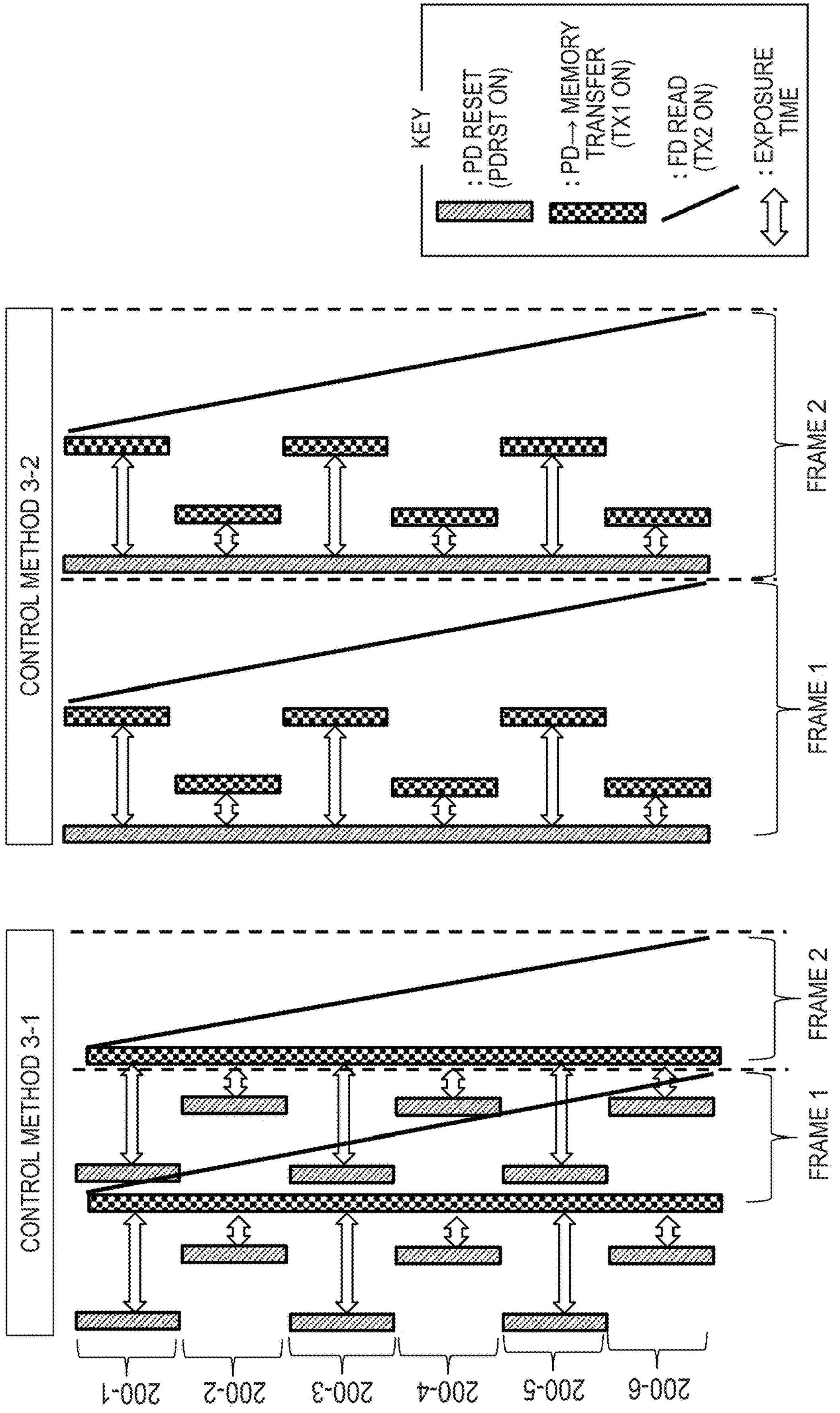
FIG. 33 is a descriptive view showing a control method example by autonomous exposure control mode by the imaging element including 6-Tr pixels.

FIG. 33 is a descriptive view showing a control method example by autonomous exposure control mode by the imaging element 100B including 6-Tr pixels 2601. In FIG. 33, the control method 3-1 is a control example for when the exposure time adjustment mode is PD reset, and the control method 3-2 is a control example for when the exposure time adjustment mode is PD→FD transfer.

Figure 34:
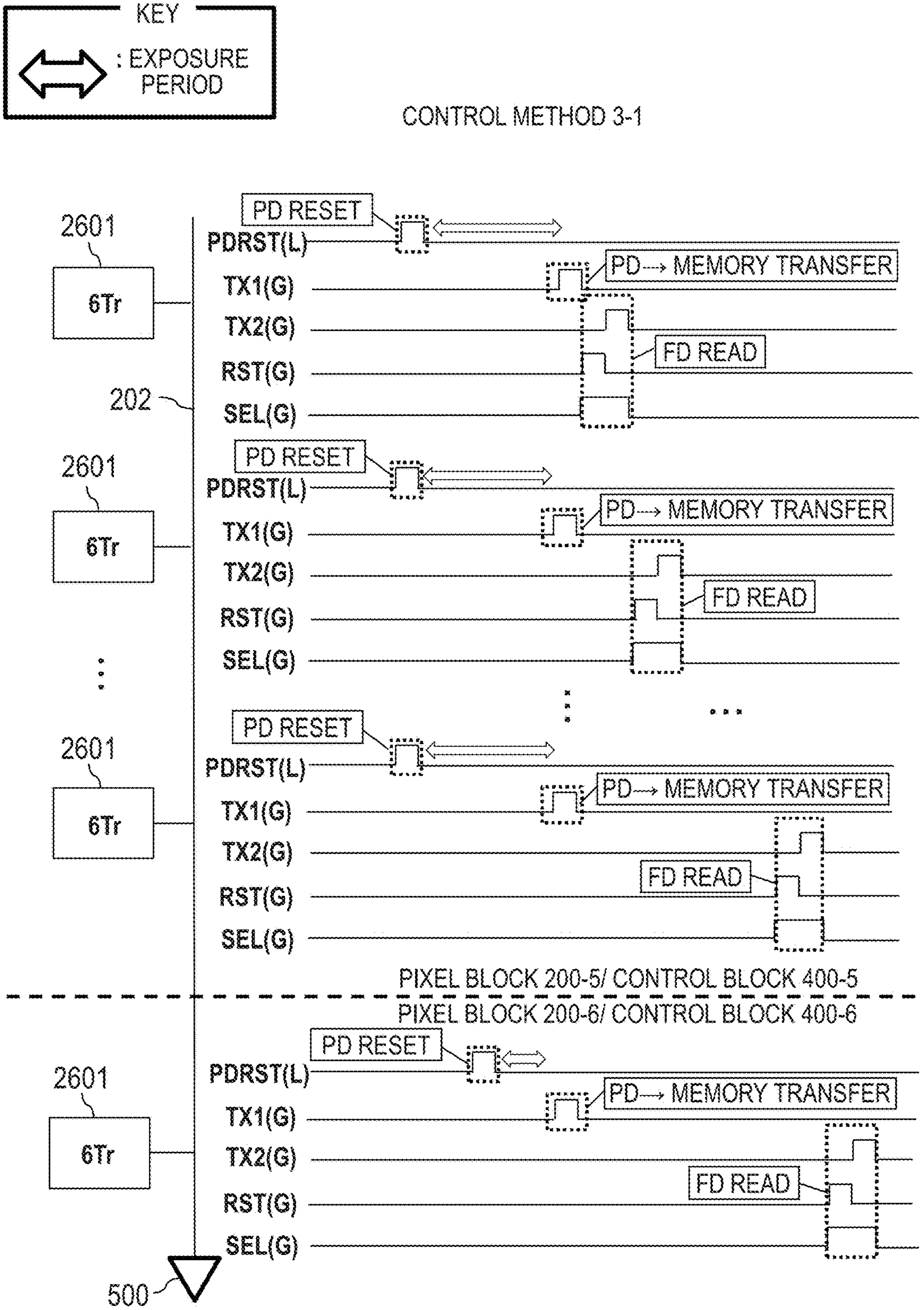
FIG. 34 is a pulse chart for the control method 3-1.
Figure 35:
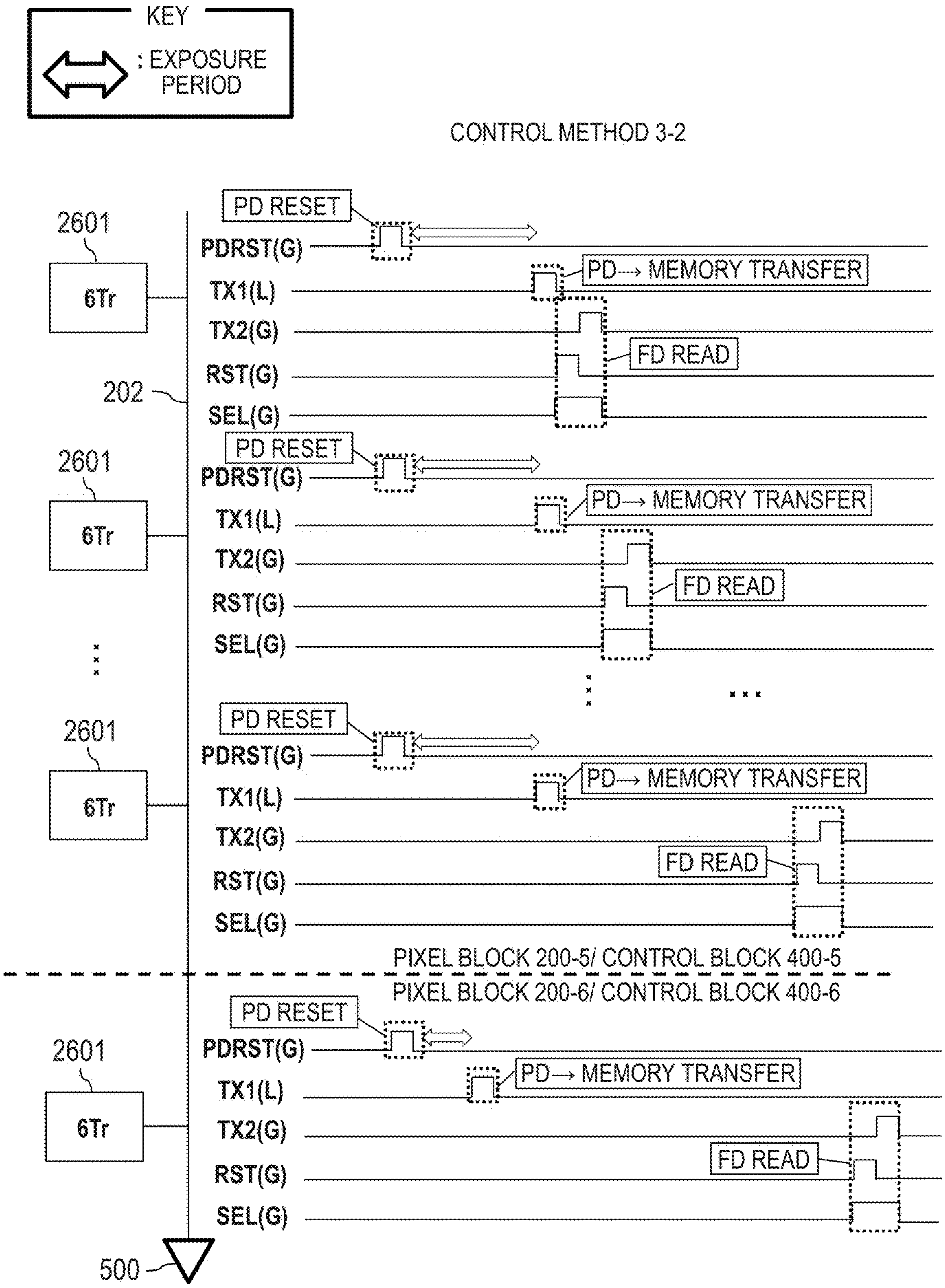
FIG. 35 is a pulse chart for the control method 3-2.

FIG. 34 is a pulse chart for the control method 3-1, and FIG. 35 is a pulse chart for the control method 3-2. In FIGS. 33 and 34, in the control method 3-1, the discharge unit 302 is a transistor necessary for local control. In each of the pixel blocks 200-1 to 200-6, when the discharge control signal φPDRST is inputted through local control to the gate terminal of the discharge unit 302 of the pixel 2601, the photoelectric conversion unit 300 is reset, resulting in the start of exposure at the photoelectric conversion unit 300 (PD reset).

Next, PD→FD transfer is performed in the pixel blocks 200-1 to 200-6. Specifically, for example, the electric charge accumulated in the photoelectric conversion unit 300 is transferred to the retention unit 2603 upon input by global control of the first transfer control signal φTX1 to the gate terminal of the first transfer unit 2613 of the pixel 2601 (PD→ memory transfer). Since global control is being performed, a different exposure time is set respectively for the pixel blocks 200-1 to 200-6 with differing start timings for exposure.

In the pixel blocks 200-1 to 200-6, when the reset control signal φRST is inputted by global control to the gate terminal of the reset unit 304 of the pixel 2601, the second transfer control signal φTX2 is inputted by global control to the gate terminal of the second transfer unit 301, and the selection signal SEL is inputted by global control to the gate terminal of the selection unit 352, then the electric charge accumulated in the retention unit 2603 is transferred to the FD 303 and outputted from the selection unit 352 as an analog pixel signal (FD read).

In FIG. 33, in the control method 3-1, the PD reset and the FD read are performed through different paths in the pixel 2601, and thus, the PD reset of the frame 2 can be performed prior to the end of the FD read of the frame 1.

In FIGS. 33 and 35, in the control method 3-2, the first transfer unit 2613 is a transistor necessary for local control. In the pixel blocks 200-1 to 200-6, when the discharge control signal φPDRST is inputted through global control to the gate terminal of the discharge unit 302 of the pixel 2601, the photoelectric conversion unit 300 is reset, resulting in the start of exposure at the photoelectric conversion unit 300 (PD reset).

Next, PD→FD transfer is performed in each of the pixel blocks 200-1 to 200-6. Specifically, for example, the electric charge accumulated in the photoelectric conversion unit 300 is transferred to the retention unit 2603 upon input by local control of the first transfer control signal φTX1 to the gate terminal of the first transfer unit 2613 of the pixel 2601 (PD→ memory transfer). Since local control is being performed, the end timings for exposure differ respectively for the pixel blocks 200-1 to 200-6. Thus, different exposure times are set respectively for the pixel blocks 200-1 to 200-6.

In the pixel blocks 200-1 to 200-6, when the reset control signal φRST is inputted by global control to the gate terminal of the reset unit 304 of the pixel 2601, the second transfer control signal φTX2 is inputted by global control to the gate terminal of the second transfer unit 301, and the selection signal SEL is inputted by global control to the gate terminal of the selection unit 352, then the electric charge accumulated in the retention unit 2603 is transferred to the FD 303 and outputted from the selection unit 352 as an analog pixel signal (FD read).

In FIG. 33, similar to the control method 3-1, in the control method 3-2, the PD reset and the FD read are performed through different paths in the pixel 2601, but the PD→ memory transfer of the frame 2 by the first transfer unit 2613 is performed after the end of the FD read of the frame 1.

[Autonomous Exposure Control Mode by Imaging Element 100B Including 5-Tr Pixels 2602]

Figure 36:
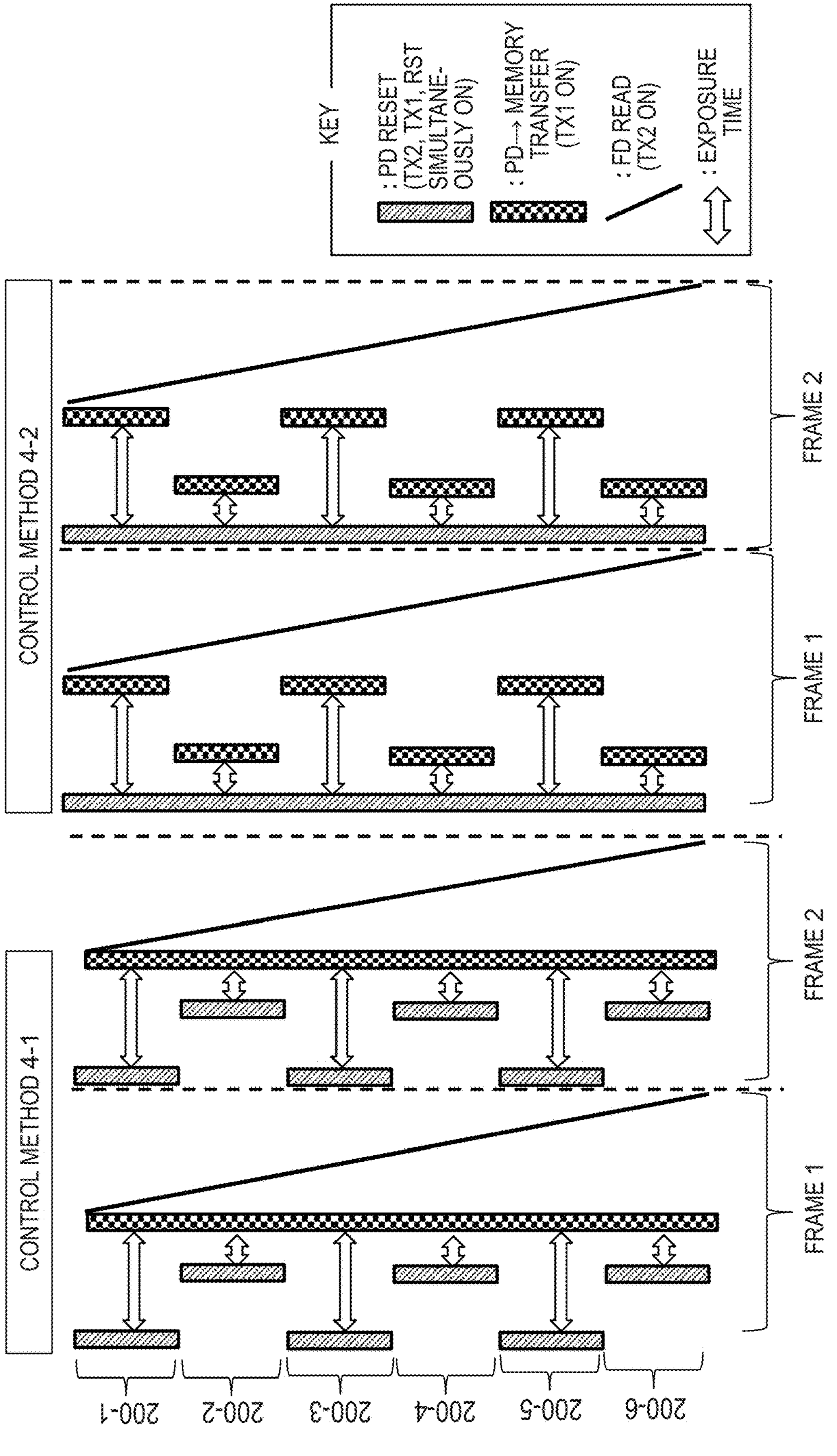
FIG. 36 is a descriptive view showing a control method example by autonomous exposure control mode by the imaging element including 6-Tr pixels.

FIG. 36 is a descriptive view showing a control method example by autonomous exposure control mode by the imaging element 100B including 6-Tr pixels 2602. In FIG. 36, the control method 4-1 is a control example for when the exposure time adjustment mode is PD reset, and the control method 4-2 is a control example for when the exposure time adjustment mode is PD→FD transfer.

Figure 37:
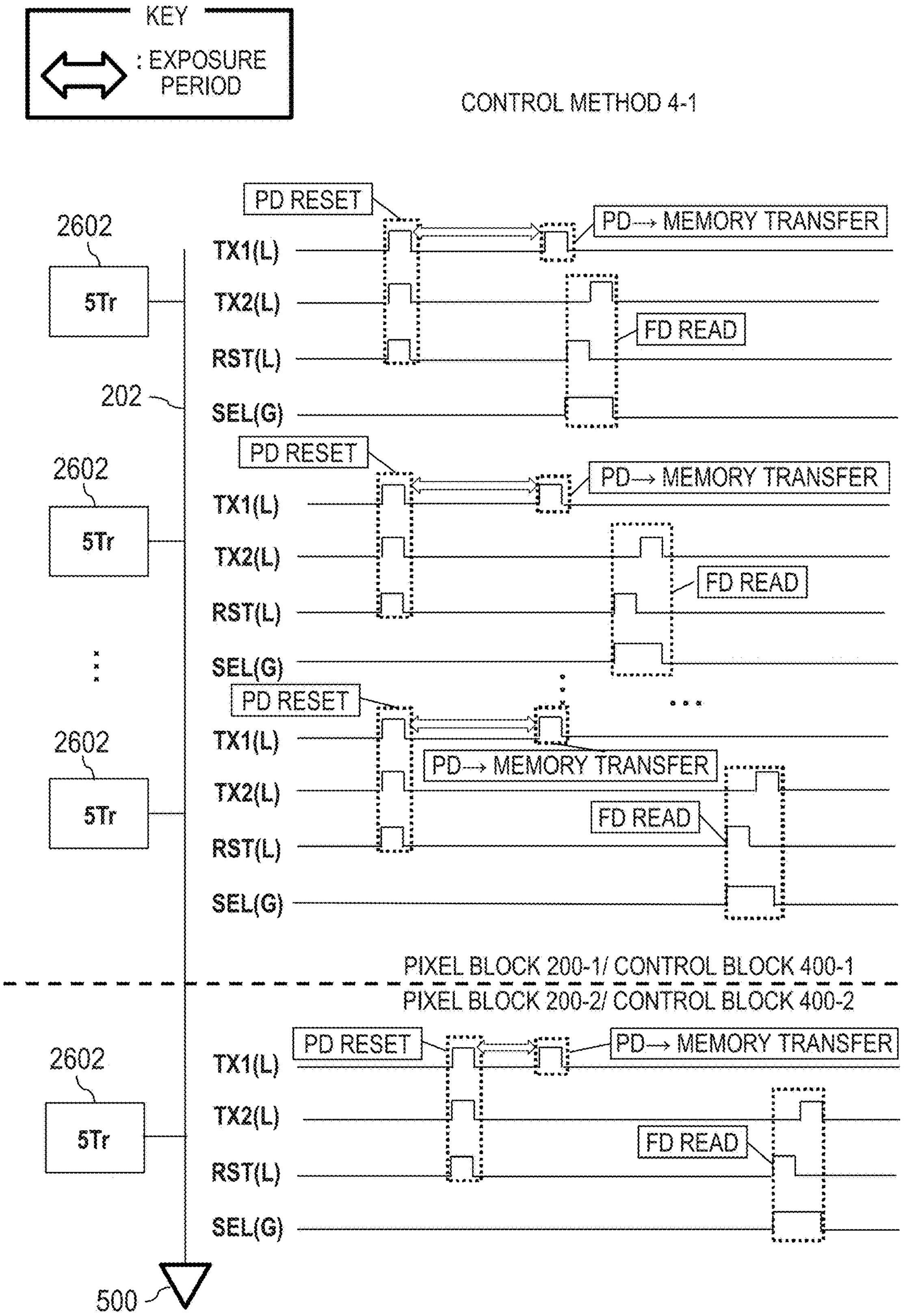
FIG. 37 is a pulse chart for the control method 4-1.
Figure 38:
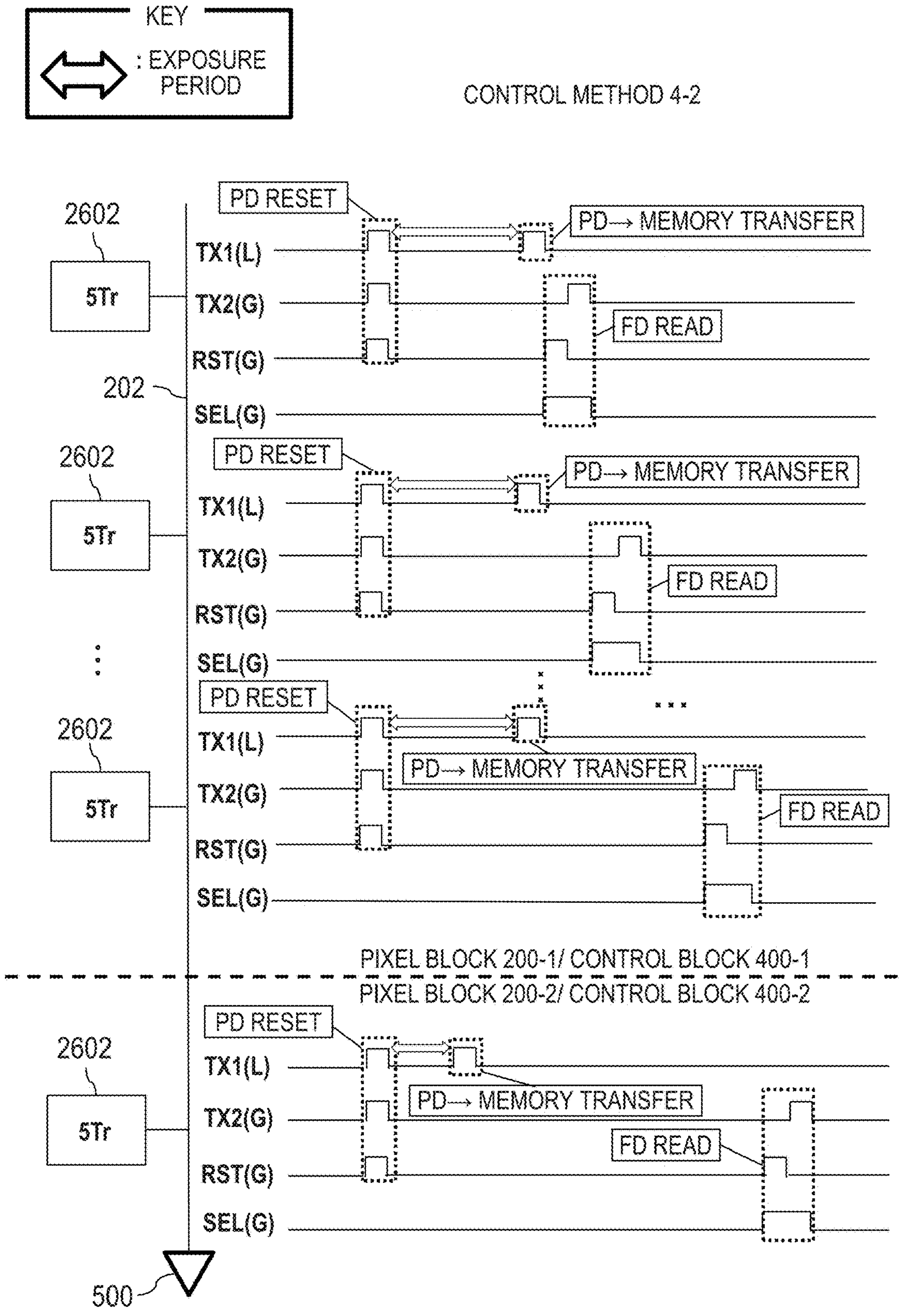
FIG. 38 is a pulse chart for the control method 4-2.

FIG. 37 is a pulse chart for the control method 4-1, and FIG. 38 is a pulse chart for the control method 4-2. In FIGS. 36 and 37, in the control method 4-1, the second transfer unit 301, the reset unit 304, and the first transfer unit 2613 are transistors necessary for local control. In each of the pixel blocks 200-1 to 200-6, when the first transfer control signal φTX1 is inputted by local control to the gate terminal of the first transfer unit 2613 of the pixel 2602, the second transfer control signal φTX2 is inputted by local control to the gate terminal of the second transfer unit 301, and the reset control signal φRST is inputted by local control to the gate terminal of the reset unit 304, then the photoelectric conversion unit 300 is reset, resulting in the start of exposure at the photoelectric conversion unit 300 (PD reset).

Next, PD→FD transfer is performed in the pixel blocks 200-1 to 200-6. Specifically, for example, the electric charge accumulated in the photoelectric conversion unit 300 is transferred to the retention unit 2603 upon input through the locally controllable first transfer control line 2610 of the first transfer control signal φTX1 to the gate terminal of the first transfer unit 2613 of the pixel unit 2601 (however, the timing for transfer is determined by global operation over the entire pixel unit 101) (PD→ memory transfer). Since the PD reset is being performed by local control, a different exposure time is set respectively for the pixel blocks 200-1 to 200-6 with differing start timings for exposure.

In the pixel blocks 200-1 to 200-6, when the reset control signal φRST is inputted through the locally controllable reset control line 313 to the gate terminal of the reset unit 304 of the pixel 2602, the second transfer control signal φTX2 is inputted through the locally controllable second transfer control line 311 to the gate terminal of the second transfer unit 301, and the selection signal SEL is inputted by global control to the gate terminal of the selection unit 352, then the electric charge accumulated in the retention unit 2603 is transferred to the FD 303 and outputted from the selection unit 352 as an analog pixel signal (FD read).

In FIGS. 36 and 38, in the control method 4-2, the first transfer unit 2613 is a transistor necessary for local control. In the pixel blocks 200-1 to 200-6, when the first transfer control signal φTX1 is inputted through the locally controllable first transfer control line 2610 to the gate terminal of the first transfer unit 2613 of the pixel 2602 (however, the reset timing is determined by a global operation with the same timing for all pixels in the row direction for the entire pixel unit 101), the second transfer control signal φTX2 is inputted by global control to the gate terminal of the second transfer unit 301, and the reset control signal φRST is inputted by global control to the gate terminal of the reset unit 304, then the photoelectric conversion unit 300 is reset, resulting in the start of exposure at the photoelectric conversion unit 300 (PD reset).

Next, PD→FD transfer is performed in each of the pixel blocks 200-1 to 200-6. Specifically, for example, the electric charge accumulated in the photoelectric conversion unit 300 is transferred to the retention unit 2603 upon input by local control of the first transfer control signal φTX1 to the gate terminal of the first transfer unit 2613 of the pixel 2601 (PD→ memory transfer). Since local control is being performed, the end timings for exposure differ respectively for the pixel blocks 200-1 to 200-6. Thus, different exposure times are set respectively for the pixel blocks 200-1 to 200-6.

In the pixel blocks 200-1 to 200-6, when the reset control signal φRST is inputted by global control to the gate terminal of the reset unit 304 of the pixel 2601, the second transfer control signal φTX2 is inputted by global control to the gate terminal of the second transfer unit 301, and the selection signal SEL is inputted by global control to the gate terminal of the selection unit 352, then the electric charge accumulated in the retention unit 2603 is transferred to the FD 303 and outputted from the selection unit 352 as an analog pixel signal (FD read).

Thus, in each of eight combinations of the autonomous exposure control mode (imaging element 100A or imaging element 100B), the circuit configuration of the pixel 201 (pixel 2601 or pixel 2602), and the exposure time adjustment mode (PD reset or PD→FD transfer), it is possible to mitigate distortion in the image resulting from the rolling shutter operation.

[Cross-Frame Exposure]

Next, cross-frame control exposure will be described. Cross-frame exposure refers to exposure controlled to take place at an exposure time of one frame or longer, or a similar exposure time. By executing cross-frame exposure at the level of each pixel block 200, it is possible to perform long exposure with an exposure time of one frame or longer for each pixel block 200. Control methods that can execute cross-frame exposure including control methods 1-1, 2-1, 3-1, and 4-1. That is, the control method allows for exposure time adjustment to be executed by PD reset.

Figure 39:
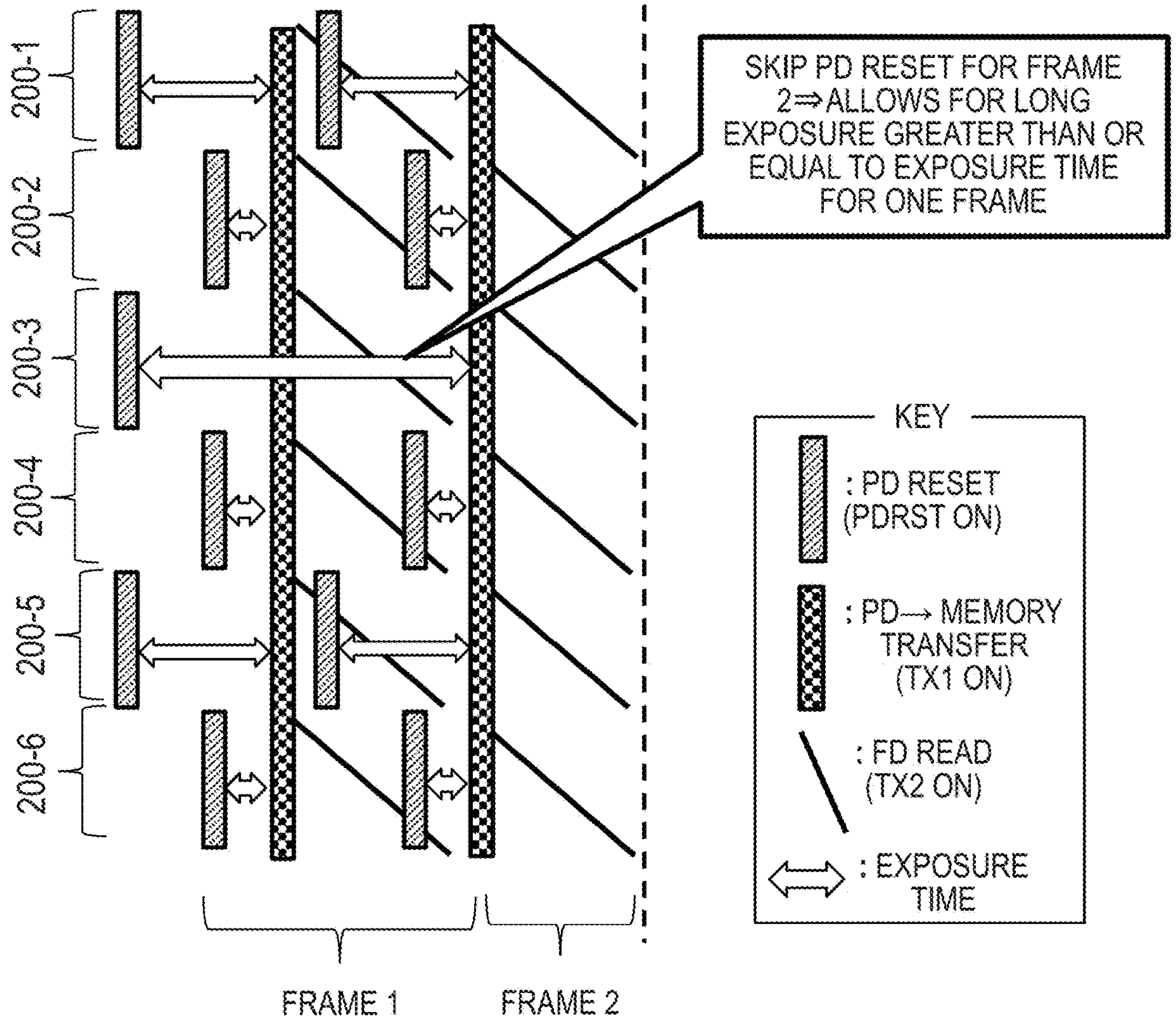
FIG. 39 is a descriptive view showing an example of cross-frame exposure.

FIG. 39 is a descriptive view showing an example of cross-frame exposure. In FIG. 39, an example of cross-frame exposure for the control method 1-1 will be described, but the cross-frame exposure is performed similarly for the control methods 2-1, 3-1, and 4-1. In FIG. 39, the control block 400-3 that controls the pixel block 200-3 performs control so as to perform PD reset and PD→ memory transfer on the frame 1, after which PD reset is not executed on the frame 2 while performing a specific FD read or skipping FD read. The specific FD read is an operation in which the reset unit 304 and the selection unit 352 are turned ON while the second transfer unit 301 remains OFF.

The control block 400-3 performs control such that if the exposure value of the frame prior to the frame 1 is less than a prescribed threshold, then in frame 1, cross-frame exposure is performed; in other words, the PD reset is not executed for the frame 2. As a result, it is possible to realize cross-frame exposure at the level of each pixel block 200.

[Flickering Reduction Control]

Figure 40:
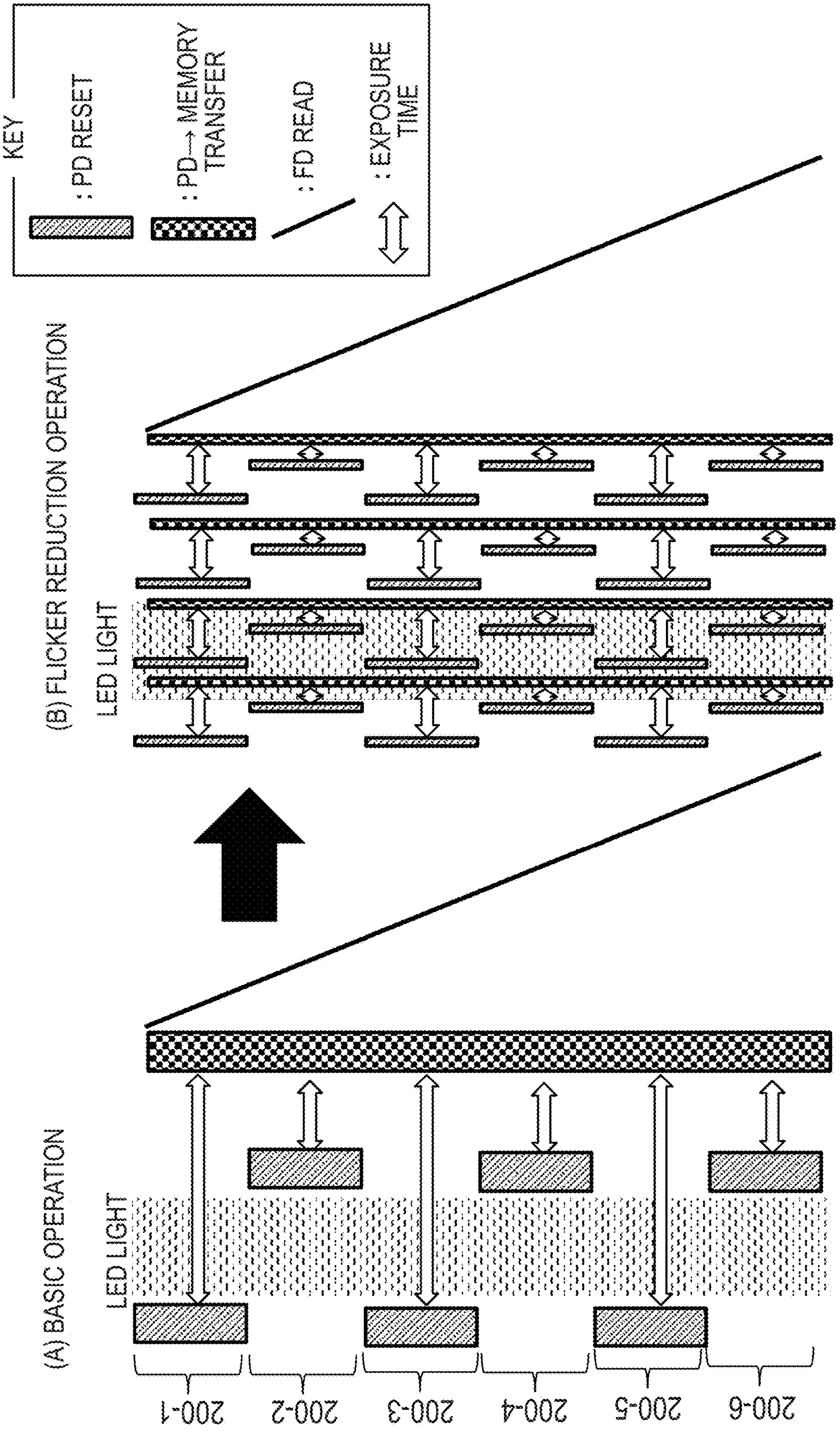
FIG. 40 is a descriptive view showing an example of flickering reduction control.

Next, flickering reduction control will be described. In vehicle-installed image sensors and cameras that display footage, flickering can occur due to an offset between the shutter timing of the image sensor and the emission timing of light-emitting diodes (LEDs). If flickering occurs in an imaging environment in which the imaging element 100 is used, a differing exposure time can be set for each pixel block 200, and thus, there are cases in which a portion or all of the subject light cannot be received, depending on the pixel block 200. FIG. 40 is a descriptive view showing an example of flickering reduction control. In FIG. 40, an example of flickering reduction control for the control method 3-1 will be described, but the flickering reduction control is performed similarly for the control method 1-1. (A) shows a basic operation in which flickering reduction control is not used, and (B) shows an operation in which flickering reduction control is used.

In (A), the pixel blocks 200-2, 200-4, and 200-6 are unable to receive LED light. By contrast, in (B), the exposure time is set to be shorter than the flickering period. Thus, the exposure times of all of the pixel blocks 200-1 to 200-6 overlap the light reception timing for the LED light. In (B), the exposure times for all of the pixel blocks 200-1 to 200-6 are fragmented, but in each of the pixel blocks 200-1 to 200-6, the total exposure time is the same as the exposure time of (A). Thus, flickering is reduced, and the light reception efficiency of the pixel blocks 200 is improved. The switch in operation between (A) and (B) is performed by user operation. Alternatively, the imaging element 100 may be configured to perform only the flickering reduction operation of (B).

[Pixel Group-Level Exposure Control]

Next, details regarding pixel group-level exposure control in the control methods 1-1 to 4-2 will be described. If pixels 2600 of a plurality of colors are present in one pixel block 200, then if the exposure time for the pixel block 200 is calibrated to a given color, then the exposure time may not be well-calibrated for other colors. For example, if the pixel signal is saturated for a given color, then inaccurate coloration would appear in the pixel 2600 of the color.

Thus, the control block 400 sets a group of pixels 2600 of the same color within the pixel block 200 to be controlled as a pixel group, and enables the exposure time to be set at the pixel group level.

Figure 41:
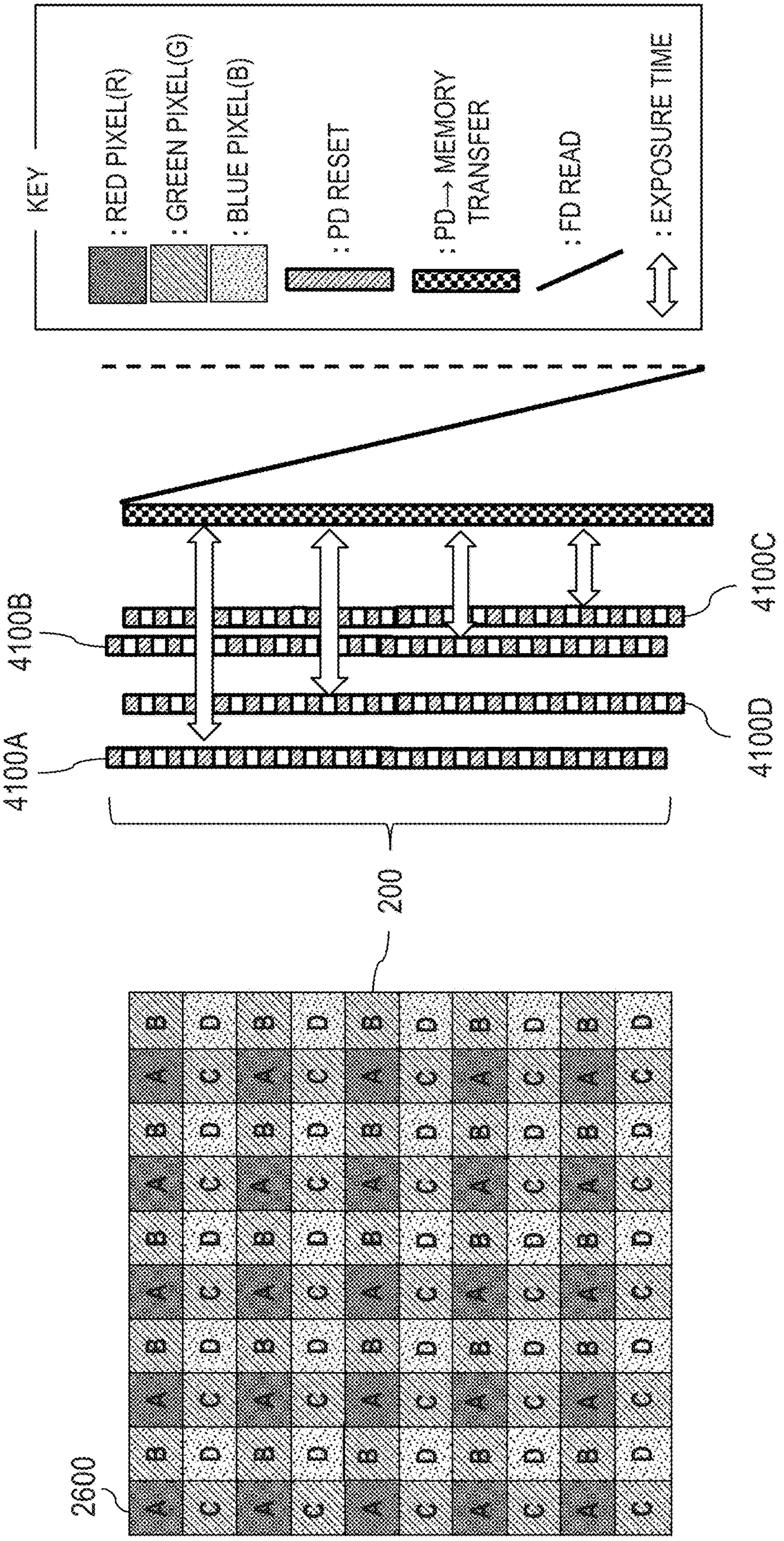
FIG. 41 is a descriptive view showing a pixel group-level exposure control example 1.

FIG. 41 is a descriptive view showing a pixel group-level exposure control example 1. FIG. 41 is a control example for when the exposure time adjustment mode is PD reset but can be used for a case in which the exposure time adjustment mode is PD→FD transfer.

The pixel blocks 200 each have a plurality of pixels 2600 in a Bayer arrangement. Here, as an example, the group to which the red pixels 2600 belong is a pixel group A, the group to which the green pixels 2600 sandwiched between the red pixels 2600 in the row direction belong is a pixel group B, the group to which the green pixels 2600 sandwiched between the red pixels 2600 in the column direction belong is a pixel group C, and the group to which the blue pixels 2600 belong is the pixel group D. The pixel groups B and C are both the green pixels 2600, and thus, may be one pixel group.

The control block 400 executes a PD reset 4100A of the pixel group A, a PD reset 4100B of the pixel group B, a PD reset 4100C of the pixel group C, and a PD reset 4100D of the pixel group D when the respective exposures start for the pixel groups A to D.

If the exposure time adjustment mode is PD→FD transfer, then the control block 400 executes a PD>FD transfer of the pixel group A, a PD→FD transfer of the pixel group B, a PD→FD transfer of the pixel group C, and a PD→FD transfer of the pixel group D when the respective exposures end for the pixel groups A to D.

Figure 42:
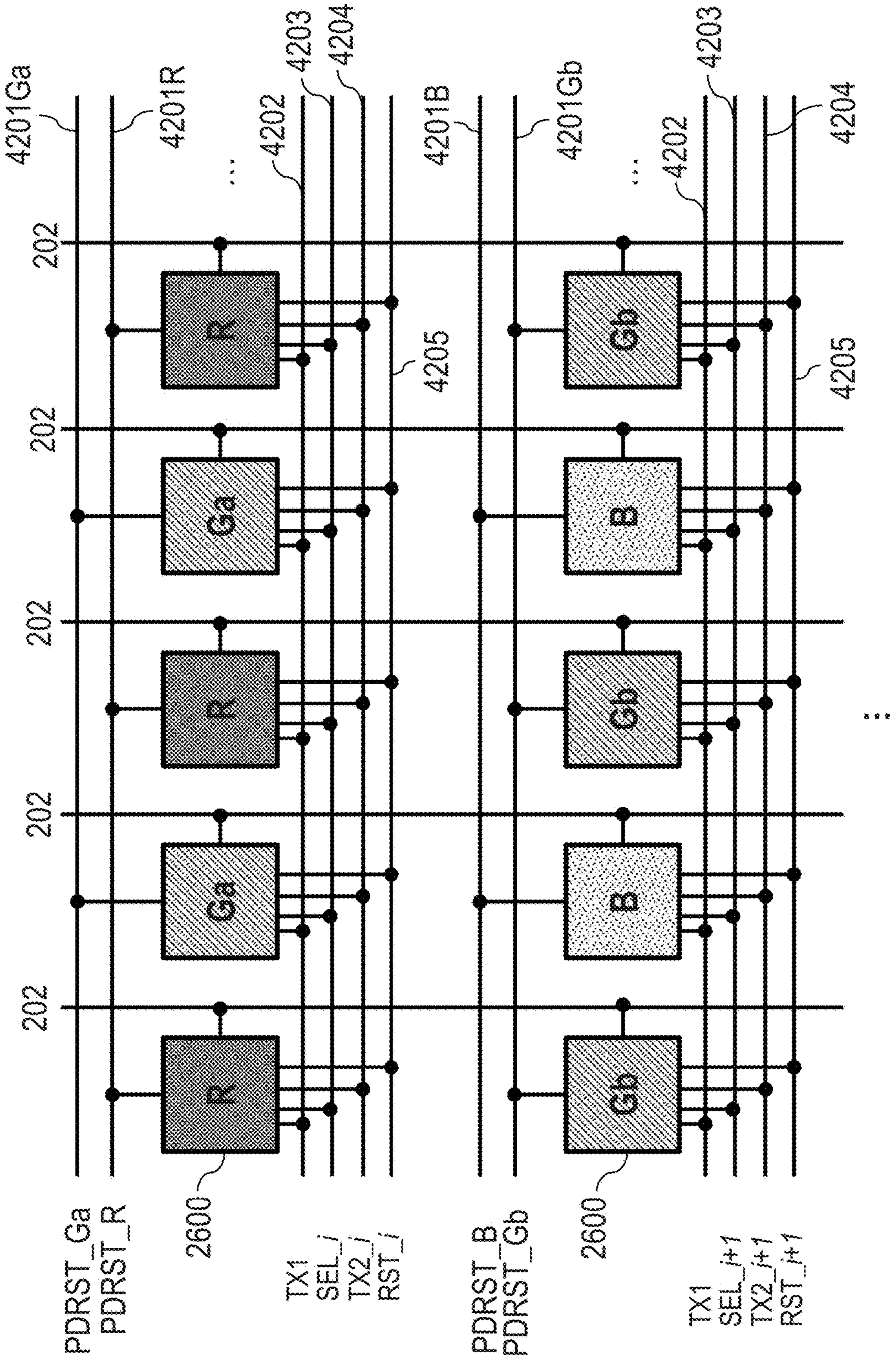
FIG. 42 is a descriptive view showing a wiring example for pixel group-level exposure control.

FIG. 42 is a descriptive view showing a wiring example for pixel group-level exposure control. FIG. 42 is a wiring example for when the exposure time adjustment mode is PD reset but the connections are made according to a suitable connective relationship even when the exposure time adjustment mode is PD→FD transfer. Among the pixels 2600, "R" refers to the red pixels 2600 belonging to the pixel group A, "Ga" refers to the green pixels 2600 belonging to the pixel group B, "Gb" refers to the green pixels 2600 belonging to the pixel group C, and "B" refers to the blue pixels 2600 belonging to the pixel group D.

In FIG. 42, the symbols "R," "Ga," "Gb," and "B" suffixed onto TX2 indicate the discharge control signals φPDRST inputted to the R, Ga, Gb, and B pixels 2600. For example, TX2_Ga is the discharge control signal φPDRST inputted to the green pixels 2600 (Ga) belonging to the pixel group B. Also, the symbol "i" suffixed onto SEL, TX1, and RST refers to the row number of pixel rows to which the selection signal SEL, the second transfer control signal φTX2, and the reset control signal RST are inputted.

The control line 4201R is connected to the green pixels 2600(R) belonging to the pixel group A, and supplies the discharge control signal φPDRST_R to the red pixels 2600 (R). The control line 4201Ga is connected to the green pixels 2600(Ga) belonging to the pixel group B, and supplies the discharge control signal φPDRST_Ga to the green pixels 2600(Ga). The control line 4201Gb is connected to the green pixels 2600(Gb) belonging to the pixel group C, and supplies the discharge control signal φPDRST_Gb to the green pixels 2600(Gb). The control line 4201B is connected to the blue pixels 2600(B) belonging to the pixel group D, and supplies the discharge control signal φPDRST_B to the blue pixels 2600(B).

The control line 4202 is connected to the pixels 2600 belonging to the same pixel row, and supplies the first transfer control signal φTX1 to the gate terminals of the first transfer units 2613 of the pixels 2600. The first transfer control signal φTX1 is a signal globally controlled simultaneously for the entire pixel unit 101.

The control line 4203 is connected to the pixels 2600 belonging to the same pixel row, and supplies the selection signal SEL to the gate terminal of the selection units 352 of the pixels 2600. The selection signal SEL is a signal globally controlled for each pixel row.

The control line 4204 is connected to the pixels 2600 belonging to the same pixel row, and supplies the second transfer control signal φTX2 to the gate terminals of the second transfer units 301 of the pixels 2600. The second transfer control signal φTX2 is a signal globally controlled for each pixel row.

The control line 4205 is connected to the pixels 2600 belonging to the same pixel row, and supplies the reset control signal RST to the gate terminals of the reset units 304 of the pixels 2600. The reset control signal RST is a signal globally controlled for each pixel row.

Thus, by executing pixel group-level exposure control, it is possible to set a suitable exposure time for each color, and to mitigate inaccurate coloration resulting from an unsuitable exposure time.

Figure 43:
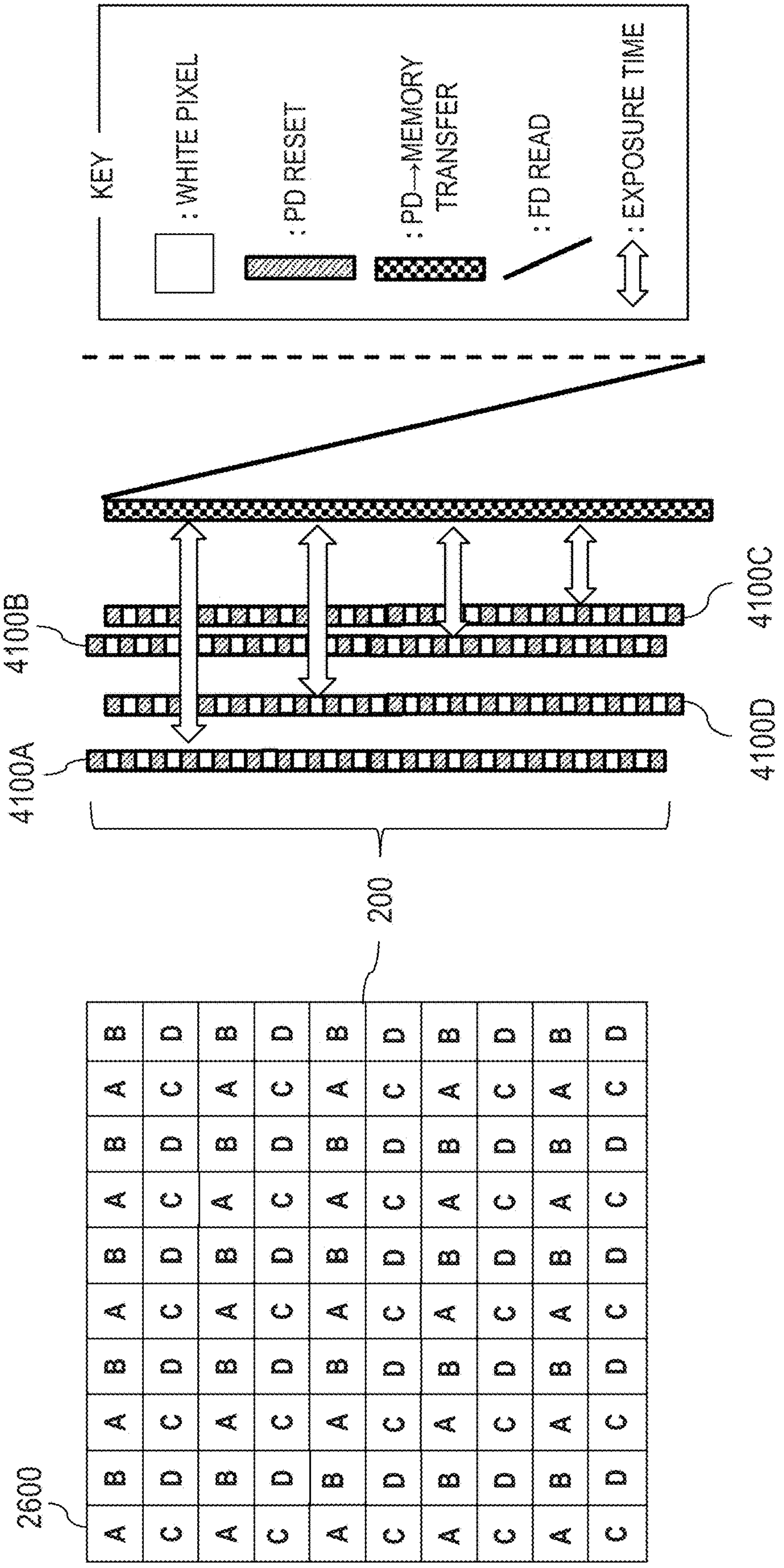
FIG. 43 is a descriptive view showing a pixel group-level exposure control example 2.

FIG. 43 is a descriptive view showing a pixel group-level exposure control example 2. In the pixel group-level exposure control example 1 of FIG. 41, an RGB color image sensor was given as an example, whereas FIG. 43 is a pixel group-level exposure control example in the imaging element 100 with a monochrome image sensor with only white pixels. White pixels are pixels 2600 provided with transparent filters instead of the color filters 703.

In FIG. 43, among the pixels 2600 in the pixel block 200 with only white pixels, the group to which the "A" pixels 2600 belong is the pixel group A, the group to which the "B" pixels 2600 belong is the pixel group B, the group to which the "C" pixels 2600 belong is the pixel group C, and the group to which the "D" pixels 2600 belong is the pixel group D.

The control block 400 executes a PD reset 4100A of the pixel group A, a PD reset 41008 of the pixel group B, a PD reset 4100C of the pixel group C, and a PD reset 4100D of the pixel group D when the respective exposures start for the pixel groups A to D. As a result, the control block 400 can set different exposure times for each of the pixel groups A to D.

By applying pixel group-level exposure control to monochrome image sensors as well, it is possible to mitigate a lack of dynamic range when a high luminance subject and a low luminance subject both appear in one pixel group 200.

Figure 44:
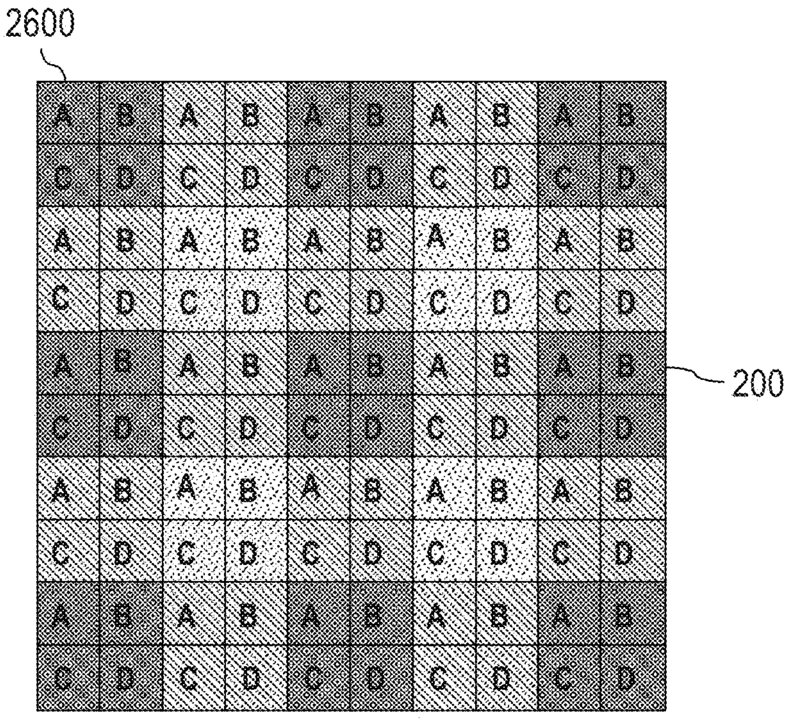
FIG. 44 is a descriptive view showing a pixel group-level exposure control example 3(1).
Figure 45:
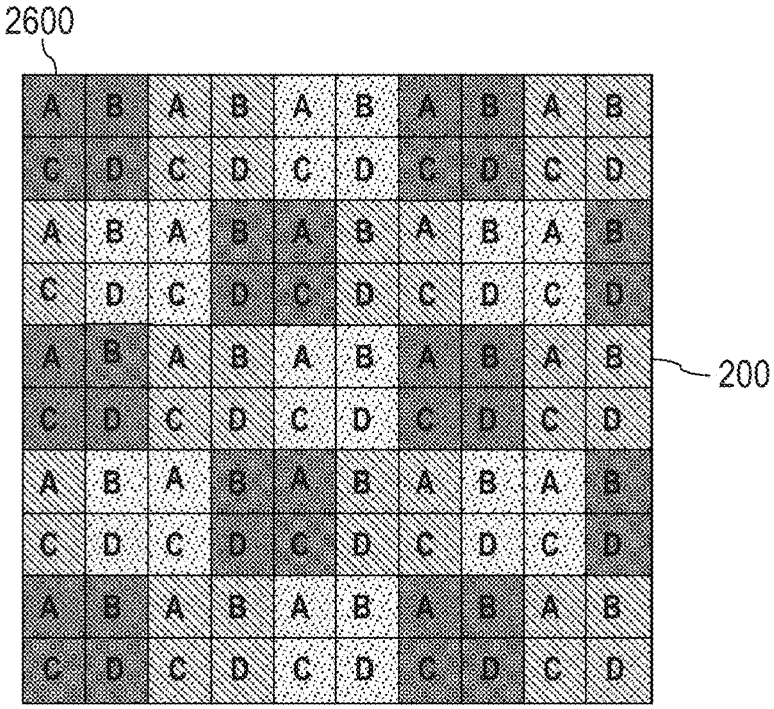
FIG. 45 is a descriptive view showing a pixel group-level exposure control example 3(2).

FIGS. 44 and 45 are descriptive views showing a pixel group-level exposure control example 3. In the pixel group-level exposure control example 1 of FIG. 41, an RGB color image sensor was given as an example, whereas FIGS. 44 and 45 show examples in which the pixel blocks 200 are in a so-called quad-Bayer arrangement. That is, FIGS. 44 and 45 show examples in which 2×2 pixels 2600 of the same color belong to different pixel groups.

In the pixel block 200 of FIG. 44 or 45, the control block 400 can sequentially set the exposure time to be short or long in the pixel groups A, B, C, and D. Also, it is possible to set only a specific pixel group A to have a shorter or longer exposure time than the other pixel groups B to D.

<Autonomous Exposure Control 2 by Addition of Memory>

Next, details regarding autonomous exposure control 2 by the addition of a memory to the above-mentioned basic configuration will be described. In the autonomous exposure control 2 by the addition of memories, memories that store a voltage corresponding to the electric charge are provided to the signal line 202, thereby realizing a global shutter for each pixel block 200 and mitigating distortion in the image occurring due to reading the analog pixel signals, and this example is described with reference to FIGS. 46 to 50.

Figure 46:
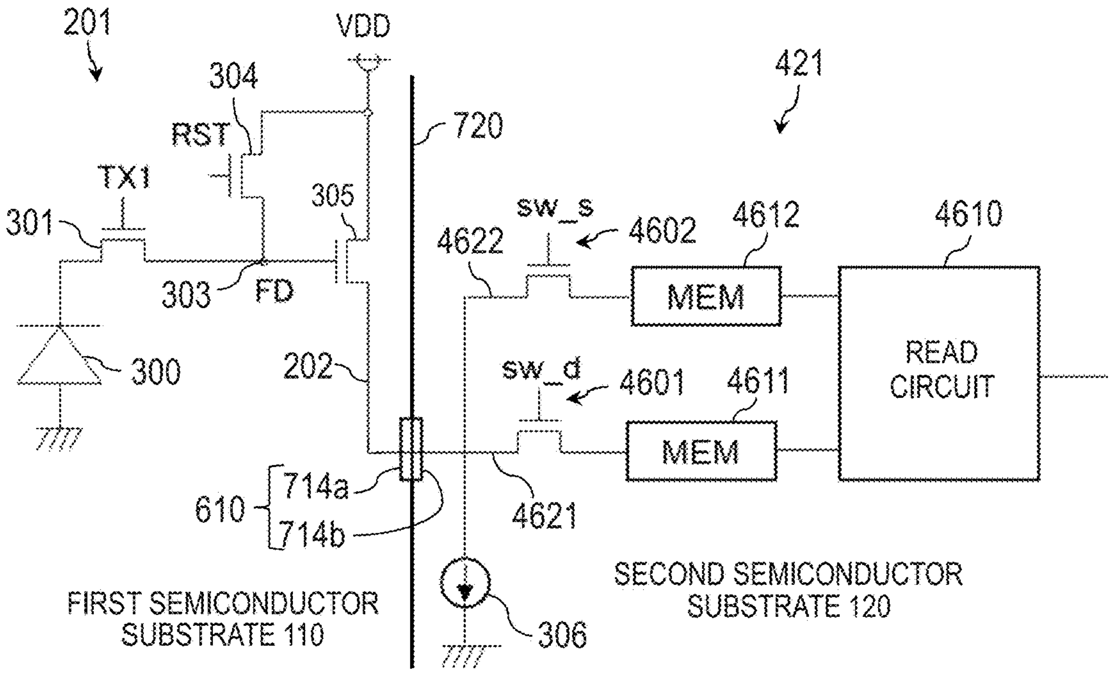
FIG. 46 is a circuit diagram showing a circuit configuration example 1 of the autonomous exposure control 2 by the addition of memories.

FIG. 46 is a circuit diagram showing a circuit configuration example 1 of the autonomous exposure control 2 by the addition of memories. In FIG. 46, the pixel 201 has a circuit configuration in which the discharge unit 302 is not provided. The signal line 202 is wired from the first semiconductor substrate 110 to the second semiconductor substrate 120 via a junction unit 610 where the junction pad 714*a* of the first semiconductor substrate 110 is joined to the junction pad 714*b* of the second semiconductor substrate 120. The signal line 202 is branched to a first signal line 4621 and a second signal line 4622 at the second semiconductor substrate 120, both branches being connected to a read circuit 4610.

Between the junction unit 610 and the read circuit 4610, a first switch 4601 and a first memory 4611 are connected in series on the first signal line 4621. Similarly, between the junction unit 610 and the read circuit 4610, a second switch 4602 and a second memory 4612 are connected in series on the second signal line 4622.

The first switch 4601 controls the output of a dark signal to the first memory 4611. The dark signal is a voltage signal pertaining to an electric charge remaining in the FD 303 prior to the FD read. When a first switch control signal sw_d is inputted to the gate terminal of the first switch 4601, the first switch 4601 outputs the dark signal to the first memory 4611, and when the first switch control signal sw_d is not inputted to the gate terminal of the first switch 4601, the first switch 4601 does not output the dark signal to the first memory 4611. The first memory 4611 is a memory that is connected to the read circuit 4610 and stores the dark signal.

The second switch 4602 controls the output of a voltage signal pertaining to the electric charge accumulated in the FD 303 after the output of the dark signal (hereinafter referred to as the FD voltage signal) to the second memory 4612. When a second switch control signal sw_s is inputted to the gate terminal of the second switch 4602, the second switch 4602 outputs the dark signal to the second memory 4612, and when the second switch control signal sw_s is not inputted to the gate terminal of the second switch 4602, the second switch 4602 does not output the FD voltage signal to the second memory 4612. The second memory 4612 is a memory that is connected to the read circuit 4610 and stores the FD voltage signal.

The read circuit 4610 is a correlated double sampling (CDS) circuit, for example, and reads the difference between the FD voltage signal from the second memory 4612 and the dark signal from the first memory 4611, and outputs the difference as the analog pixel signal to the signal conversion unit 422.

Figure 47:
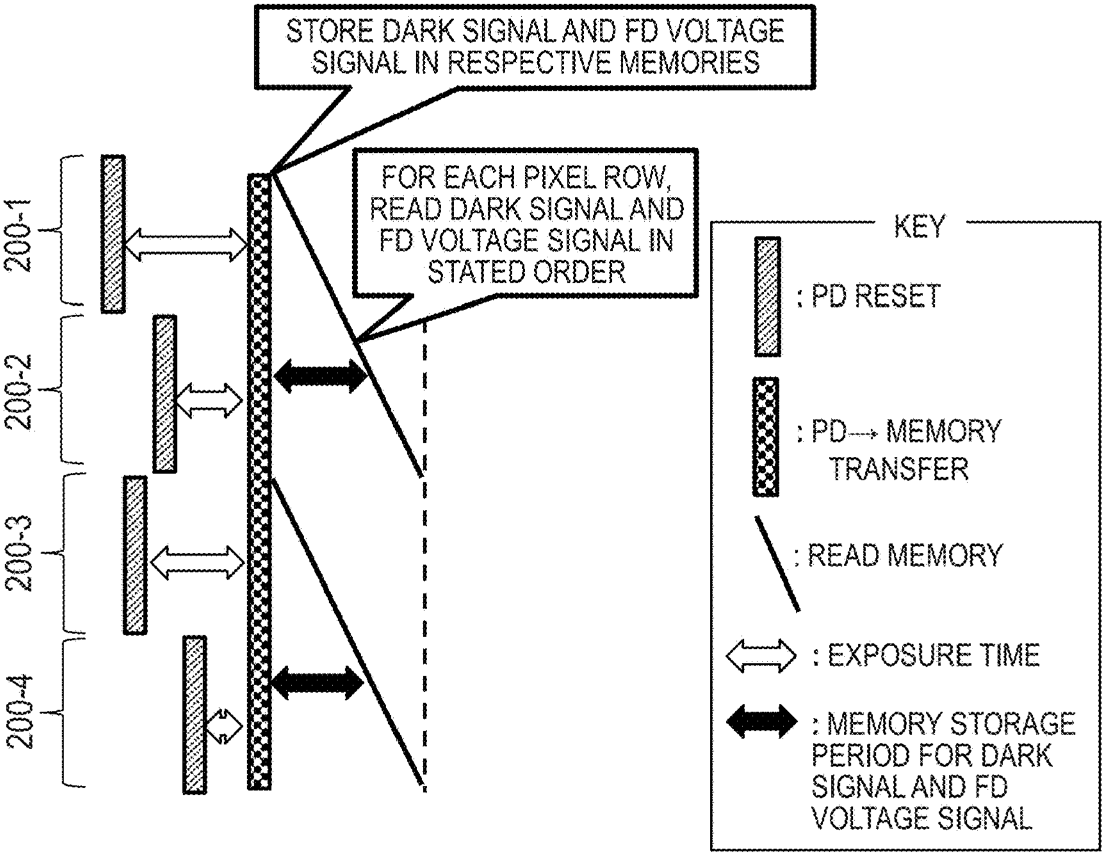
FIG. 47 is a descriptive view showing an operation example for autonomous exposure control at the level of the pixel block 200 in the circuit configuration example 1 shown in FIG. 46.
Figure 48:
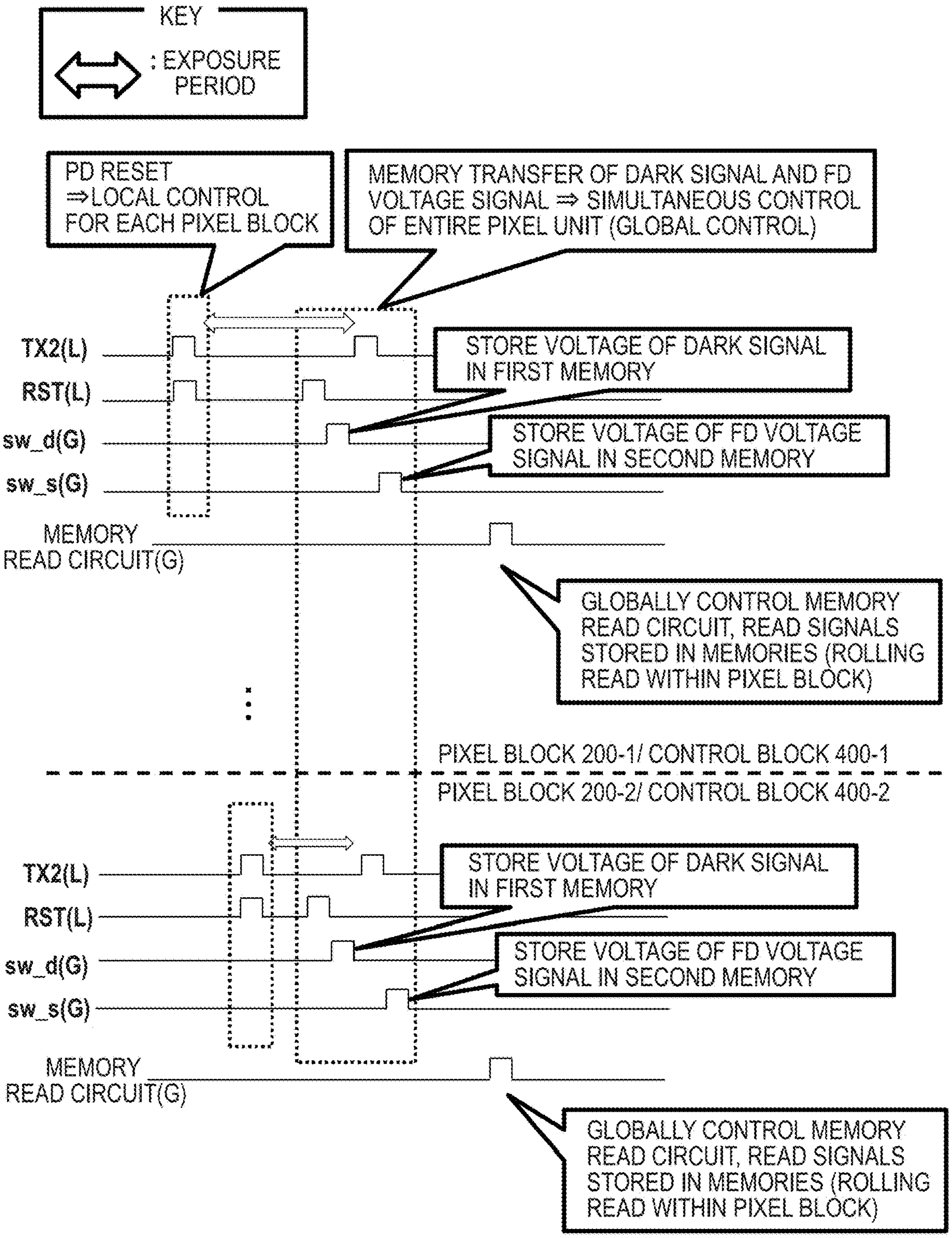
FIG. 48 is a pulse chart showing the operation example for autonomous exposure control at the level of the pixel block 200 in the circuit configuration example 1 shown in FIG. 46.

FIG. 47 is a descriptive view showing an operation example for autonomous exposure control at the level of the pixel block 200 in the circuit configuration example 1 shown in FIG. 46, and FIG. 48 is a pulse chart showing the operation example for autonomous exposure control at the level of the pixel block 200 in the circuit configuration example 1 shown in FIG. 46. In FIGS. 47 and 48, PD reset at each of the pixel blocks 200-1 to 200-4 is locally controlled by the second transfer control signal φTX2 and the reset control signal RST, and memory transfer of the dark signal and the FD voltage signal is executed globally by the second transfer control signal φTX2 and the reset control signal RST.

In this memory transfer, the first switch 4601 outputs the dark signal to the first memory 4611 by input of the first switch control signal sw_d and the second switch 4602 outputs the FD voltage signal to the second memory 4612 by input of the second switch control signal sw_s through simultaneous control of the entire pixel unit 101. As a result, the dark signal is stored in the first memory 4611 and the FD voltage signal is stored by the second memory 4612.

Also, during the memory read period, signal read is executed by global control in the pixel blocks 200-1 to 200-4, respectively. Specifically, in each of the pixel blocks 200-1 to 200-4, for example, the dark signal is read for each pixel row by a rolling readout from the first memory 4611, and then, the FD voltage signal is read by a rolling readout from the second memory 4612.

In this manner, the dark signal is stored in the first memory 4611 and the FD voltage signal is stored in the second memory 4612, thereby enabling PD reset through local control at the same timing for all pixels 201 in the pixel block 200. Thus, global transfer of the dark signals and the FD voltage signals is enabled, resolving the issue of distortion resulting from a rolling readout performed for each pixel block 200.

Figure 49:
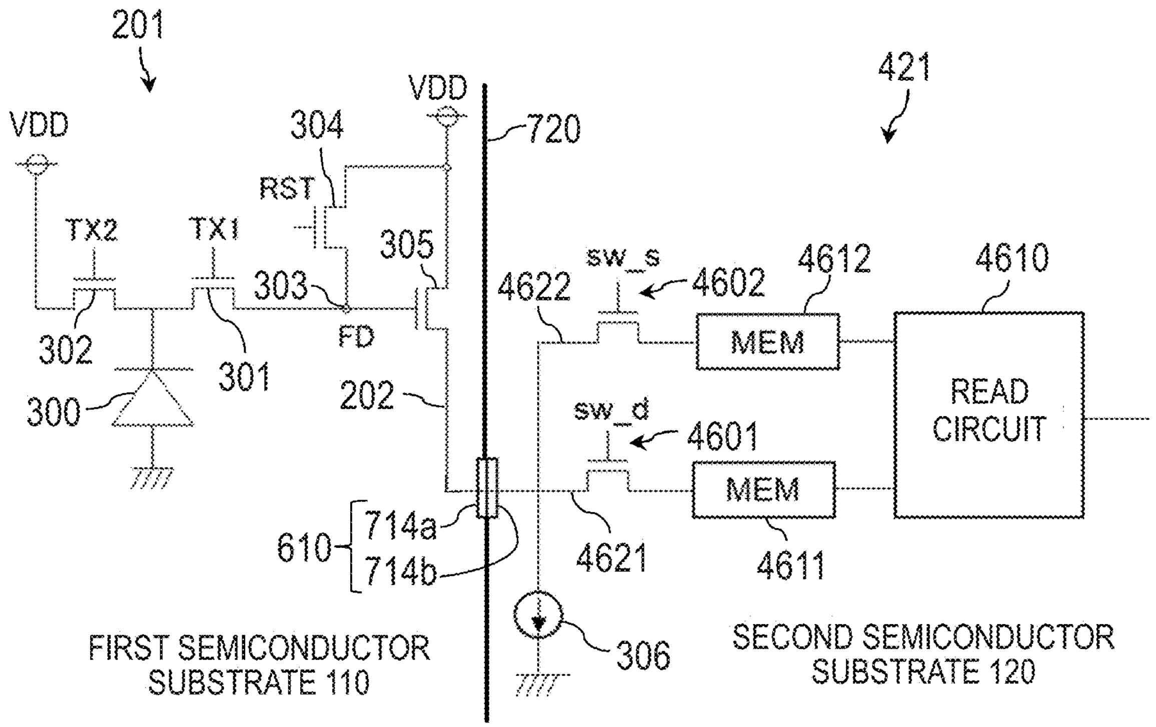
FIG. 49 is a circuit diagram showing a circuit configuration example 2 of the autonomous exposure control 2 by the addition of memories.

FIG. 49 is a circuit diagram showing a circuit configuration example 2 of the autonomous exposure control 2 by the addition of memories. In FIG. 49, the pixel 201 has a circuit configuration in which the discharge unit 302 is provided.

Figure 50:
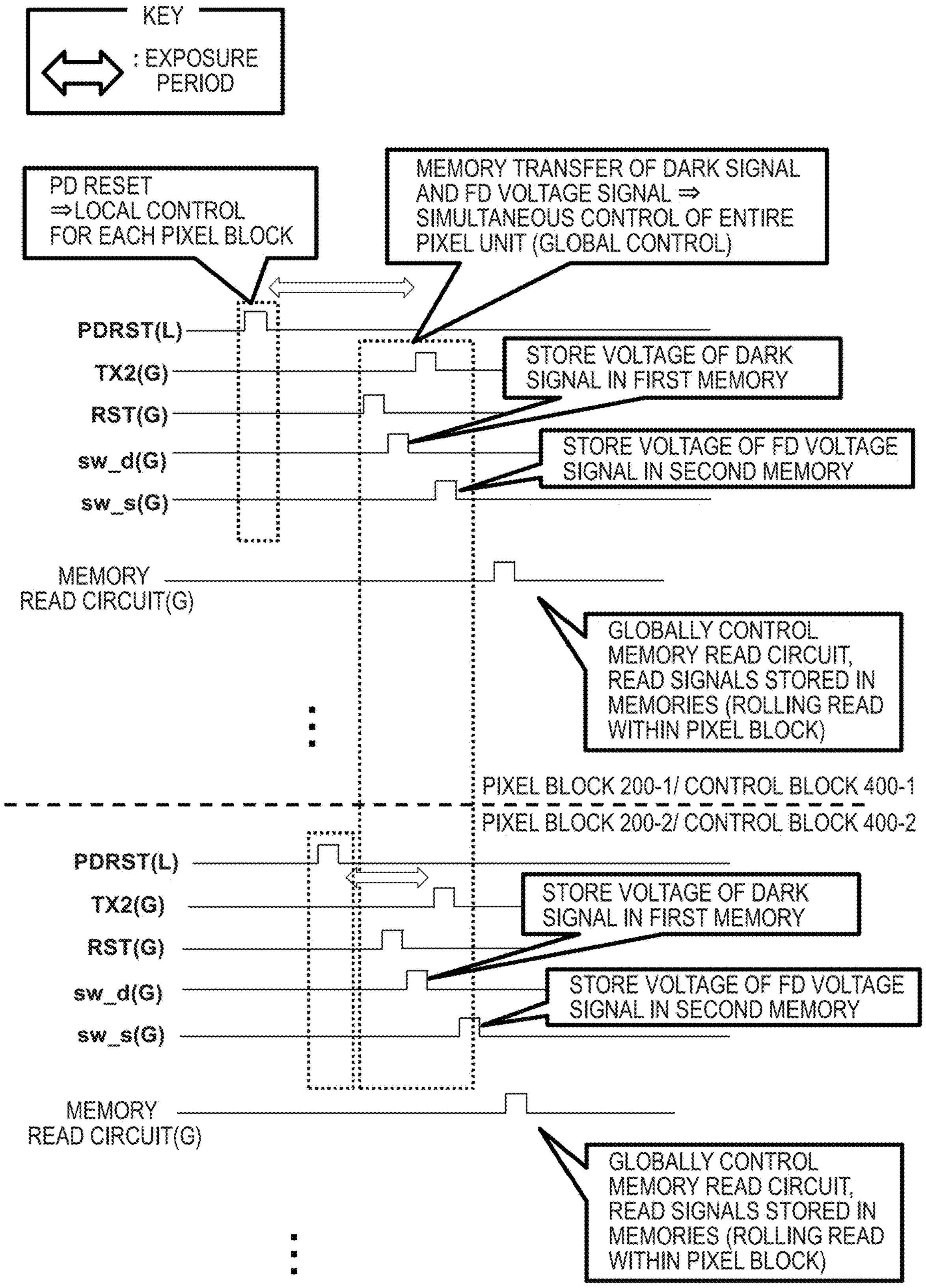
FIG. 50 is a pulse chart showing an operation example for autonomous exposure control at the level of the pixel block in the circuit configuration example 2 shown in FIG. 49.

FIG. 50 is a pulse chart showing an operation example for autonomous exposure control at the level of the pixel block 200 in the circuit configuration example 2 shown in FIG. 49. The operation example for autonomous exposure control at the level of the pixel block 200 in the circuit configuration example 2 is the same as that of FIG. 47, and thus, description thereof is omitted.

In FIGS. 47 and 50, PD reset at each of the pixel blocks 200-1 to 200-4 is locally controlled by the discharge control signal φPDRST, and memory transfer of the dark signal and the FD voltage signal is executed globally by the second transfer control signal φTX2 and the reset control signal RST. In this memory transfer, the first switch 4601 outputs the dark signal to the first memory 4611 by input of the first switch control signal sw_d and the second switch 4602 outputs the FD voltage signal to the second memory 4612 by input of the second switch control signal sw_s through simultaneous control of the entire pixel unit 101. As a result, the dark signal is stored in the first memory 4611 and the FD voltage signal is stored by the second memory 4612.

Also, during the memory read period, signal read is executed by global control in the pixel blocks 200-1 to 200-4, respectively. Specifically, in each of the pixel blocks 200-1 to 200-4, for example, the dark signal is read for each pixel row by a rolling readout from the first memory 4611, and then, the FD voltage signal is read by a rolling readout from the second memory 4612.

In this manner, the dark signal is stored in the first memory 4611 and the FD voltage signal is stored in the second memory 4612, thereby enabling PD reset through local control at the same timing for all pixels 201 in the pixel block 200. Thus, global transfer of the dark signals and the FD voltage signals is enabled, resolving the issue of distortion resulting from a rolling readout performed for each pixel block 200. In the circuit configuration example 2, local control is enabled with the discharge control signal φPDRST alone, enabling a simplification of local control.

In the autonomous exposure control 2 by the addition of memories shown in FIGS. 46 to 50, the signal conversion unit 422 and the signal output unit 423 may be disposed in the third semiconductor substrate 130 instead of the second semiconductor substrate 120.

Figure 51:
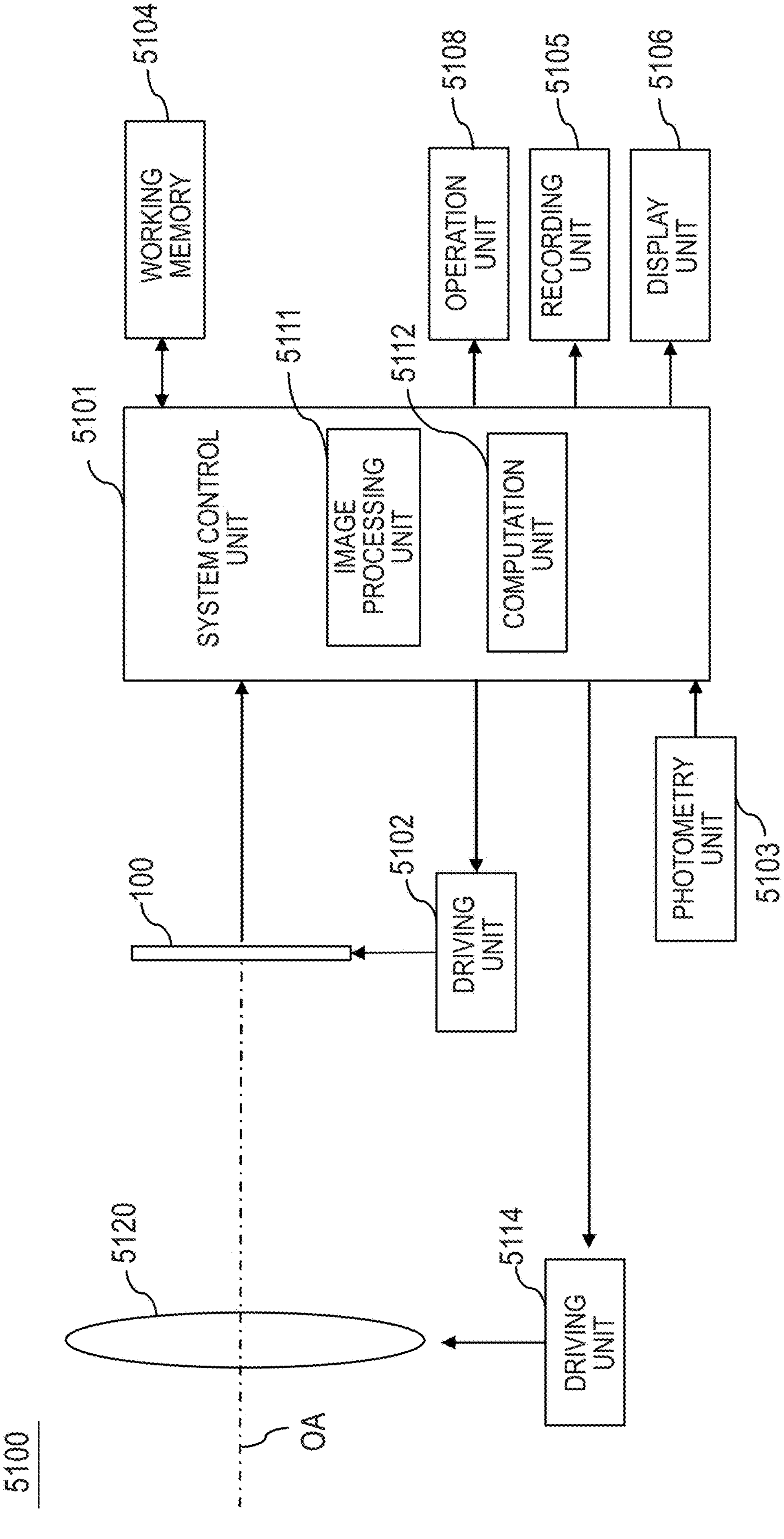
FIG. 51 is a block diagram showing a configuration example of an imaging device according to an embodiment.

FIG. 51 is a block diagram showing a configuration example of an imaging device 5100 according to an embodiment. The imaging device 5100 includes an imaging element 100, a system control unit 5101, a driving unit 5102, a photometry unit 5103, a working memory 5104, a recording unit 5105, a display unit 5106, an operation unit 5108, a driving unit 5114, and an imaging lens 5120.

The imaging lens 5120 guides a subject light beam entering along an optical axis OA towards the imaging element 100. The imaging lens 5120 is constituted of a plurality of optical lens groups, and causes the subject light beam from the scene to form an image near the focal plane. The imaging lens 5120 may be an interchangeable lens that can be installed to or removed from the imaging device 5100. In FIG. 51, one imaginary lens disposed near a pupil is shown as a representation of the imaging lens 5120.

The driving unit 5114 drives the imaging lens 5120. The driving unit 5114 changes the focal position by moving the optical lens groups of the imaging lens 5120, for example. The driving unit 5114 may drive an iris diaphragm in the imaging lens 5120 to control the quantity of the subject light beam entering the imaging element 100.

The driving unit 5102 has a control circuit that controls the timing of the imaging element 100 and controls the accumulation of electric charge through regional control or the like according to instructions from the system control unit 5101. Also, the operation unit 5108 receives instructions from the photographer/videographer through a shutter release button or the like.

The imaging element 100 delivers the pixel signal to the image processing unit 5111 of the system control unit 5101. The image processing unit 5111 generates image data subjected to various types of image processing, with the working memory 5104 as the workspace. If generating an image data in JPEG file format, for example, after generating a color image signal from a signal acquired as a Bayer array, the color image signal is compressed. The generated image data is recorded in the recording unit 5105, is converted to a display signal, and then is displayed in the display unit 5106 for a preset time.

The photometry unit 5103 detects the luminance distribution of a scene prior to an imaging sequence for generating image data. The photometry unit 5103 includes an AE sensor with approximately 1 million pixels, for example. A computation unit 5112 of the system control unit 5101 calculates the luminance for each region of a scene by receiving the output from the photometry unit 5103.

The computation unit 5112 determines the shutter speed, the aperture, and the ISO speed according to the calculated luminance distribution. The photometry unit 5103 may also be used by the imaging element 100. The computation unit 5112 also executes various computations for operating the imaging device 5100. The driving unit 5102 may be installed partially or entirely in the imaging element 100. A portion of the system control unit 5101 may be installed in the imaging element 100.

The present invention is not limited to the content above, and the content above may be freely combined. Also, other aspects considered to be within the scope of the technical concept of the present invention are included in the scope of the present invention.

DESCRIPTION OF REFERENCE CHARACTERS

100, 100A, 100B imaging element
101 pixel unit

102 control circuit unit
103 data processing unit
110 first semiconductor substrate
120 second semiconductor substrate
121 peripheral circuit unit
130 third semiconductor substrate
200 pixel block
201 pixel
202 signal line
210 pixel group
300 photoelectric conversion unit
301 transfer unit
302 discharge unit
304 reset unit
305 pixel output unit
306 load current source
310 read unit
351 amplification unit
352 selection unit
400, 400A, 400B control block
401 pixel control unit
402 signal transfer unit
411 autonomous exposure processing unit
412 exposure control unit
413 pixel driving unit
421 signal input unit
422 signal processing unit
423 signal output unit

What is claimed is:

1. An imaging element, comprising:

a first semiconductor substrate having a pixel unit including:

a first photoelectric conversion unit configured to convert light to an electric charge;

a second photoelectric conversion unit configured to convert light to an electric charge, the second photoelectric conversion unit being disposed side by side with the first photoelectric conversion unit in a row direction;

a first transfer unit configured to transfer the electric charge converted by the first photoelectric conversion unit;

a second transfer unit configured to transfer the electric charge converted by the second photoelectric conversion unit;

a first retention unit configured to retain the electric charge transferred from the first photoelectric conversion unit by the first transfer unit;

a second retention unit configured to retain the electric charge transferred from the second photoelectric conversion unit by the second transfer unit;

a first accumulation unit to which the electric charge retained in the first retention unit is transferred;

a second accumulation unit to which the electric charge retained in the second retention unit is transferred;

a first output unit having a first selection unit configured to be electrically connected to a first signal line, the first output unit being configured to output to the first signal line a first signal based on the electric charge transferred from the first retention unit to the first accumulation unit; and a second output unit having a second selection unit configured to be electrically connected to a second signal line, the second output unit being configured to output to the second signal line a second signal based on the electric charge transferred from the second retention unit to the second accumulation unit; and a second semiconductor substrate stacked with the first semiconductor substrate, the second semiconductor substrate having:

a first circuit unit including a first control block configured to output a first transfer control signal for controlling the first transfer unit, and a second control block configured to output a second transfer control signal for controlling the second transfer unit; and a second circuit unit configured to output a selection control signal for controlling the first selection unit and the second selection unit, wherein the first transfer unit is electrically connected to a first transfer control line through which the first transfer control signal is output, wherein the second transfer unit is electrically connected to a second transfer control line through which the second transfer control signal is output, and wherein the first selection unit and the second selection unit are electrically connected to a selection control line through which the selection control signal is output.

2. The imaging element according to claim 1, wherein the second circuit unit is disposed outside of the first circuit unit on the second semiconductor substrate.

3. The imaging element according to claim 2, wherein the first circuit unit is disposed at a position opposing the pixel unit in a stacking direction in which the first semiconductor substrate and the second semiconductor substrate are stacked.

4. The imaging element according to claim 3, further comprising:

a first connection unit for electrically connecting the first semiconductor substrate and the second semiconductor substrate, the first connection unit having first conductive members disposed to face each other in the stacking direction; and a second connection unit for electrically connecting the first semiconductor substrate and the second semiconductor substrate, the second connection unit having second conductive members disposed to face each other in the stacking direction, wherein the first conductive members and the second conductive members are disposed between the pixel unit and the second semiconductor substrate in the stacking direction.

5. The imaging element according to claim 4, wherein the first conductive members and the second conductive members are disposed between the pixel unit and the first circuit unit in the stacking direction.

6. The imaging element according to claim 1, wherein the pixel unit has a third transfer unit configured to transfer the electric charge retained in the first retention unit to the first accumulation unit, and the pixel unit has a fourth transfer unit configured to transfer the electric charge retained in the second retention unit to the second accumulation unit, wherein the first control block outputs a third transfer control signal for controlling the third transfer unit, wherein the second control block outputs a fourth transfer control signal for controlling the fourth transfer unit, wherein the third transfer unit is electrically connected to a third transfer control line through which the third transfer control signal is output, and wherein the fourth transfer unit is electrically connected to a fourth transfer control line through which the fourth transfer control signal is output.

7. The imaging element according to claim 6, wherein the pixel unit has a first discharge unit configured to discharge the electric charge converted by the first photoelectric conversion unit, and the pixel unit has a second discharge unit configured to discharge the electric charge converted by the second photoelectric conversion unit, wherein the first control block outputs a first discharge control signal for controlling the first discharge unit, wherein the second control block outputs a second discharge control signal for controlling the second discharge unit, wherein the first discharge unit is electrically connected to a first discharge control line through which the first discharge control signal is output, and wherein the second discharge unit is electrically connected to a second discharge control line through which the second discharge control signal is output.

8. The imaging element according to claim 7, wherein the pixel unit includes a first reset unit configured to discharge the electric charge of the first accumulation unit, and the pixel unit includes a second reset unit configured to discharge the electric charge of the second accumulation unit, wherein the second circuit unit outputs a reset control signal for controlling the first reset unit and the second reset unit, and wherein the first reset unit and the second reset unit are electrically connected to a reset control line through which the reset control signal is output.

9. The imaging element according to claim 6, wherein the pixel unit includes a first reset unit configured to discharge the electric charge of the first accumulation unit, and the pixel unit includes a second reset unit configured to discharge the electric charge of the second accumulation unit, wherein the second circuit unit outputs a reset control signal for controlling the first reset unit and the second reset unit, and wherein the first reset unit and the second reset unit are electrically connected to a reset control line through which the reset control signal is output.

10. The imaging element according to claim 1, wherein the pixel unit has a third transfer unit configured to transfer the electric charge retained in the first retention unit to the first accumulation unit, and the pixel unit has a fourth transfer unit configured to transfer the electric charge retained in the second retention unit to the second accumulation unit, wherein the second circuit unit outputs a third transfer control signal for controlling the third transfer unit and a fourth transfer control signal for controlling the fourth transfer unit, and wherein the third transfer unit and the fourth transfer unit are electrically connected to a third transfer control line through which the third transfer control signal and the fourth transfer control signal are output.

11. The imaging element according to claim 10, wherein the pixel unit has a first discharge unit configured to discharge the electric charge converted by the first photoelectric conversion unit, and the pixel unit has a second discharge unit configured to discharge the electric charge converted by the second photoelectric conversion unit, wherein the first control block outputs a first discharge control signal for controlling the first discharge unit, wherein the second control block outputs a second discharge control signal for controlling the second discharge unit, wherein the first discharge unit is electrically connected to a first discharge control line through which the first discharge control signal is output, and wherein the second discharge unit is electrically connected to a second discharge control line through which the second discharge control signal is output.

12. The imaging element according to claim 11, wherein the pixel unit includes a first reset unit configured to discharge the electric charge of the first accumulation unit, and the pixel unit includes a second reset unit configured to discharge the electric charge of the second accumulation unit, wherein the second circuit unit outputs a reset control signal for controlling the first reset unit and the second reset unit, and wherein the first reset unit and the second reset unit are electrically connected to a reset control line through which the reset control signal is output.

13. The imaging element according to claim 10, wherein the pixel unit includes a first reset unit configured to discharge the electric charge of the first accumulation unit, and the pixel unit includes a second reset unit configured to discharge the electric charge of the second accumulation unit, wherein the second circuit unit outputs a reset control signal for controlling the first reset unit and the second reset unit, and wherein the first reset unit and the second reset unit are electrically connected to a reset control Ime through which the reset control signal is output.

14. The imaging element according to claim 1, wherein the pixel unit has a first discharge unit configured to discharge the electric charge converted by the first photoelectric conversion unit, and the pixel unit has a second discharge unit configured to discharge the electric charge converted by the second photoelectric conversion unit, wherein the first control block outputs a first discharge control signal for controlling the first discharge unit, wherein the second control block outputs a second discharge control signal for controlling the second discharge unit, wherein the first discharge unit is electrically connected to a first discharge control line through which the first discharge control signal is output, and wherein the second discharge unit is electrically connected to a second discharge control line through which the second discharge control signal is output.

15. The imaging element according to claim 14, wherein the pixel unit includes a first reset unit configured to discharge the electric charge of the first accumulation unit, and the pixel unit includes a second reset unit configured to discharge the electric charge of the second accumulation unit, wherein the second circuit unit outputs a reset control signal for controlling the first reset unit and the second reset unit, and wherein the first reset unit and the second reset unit are electrically connected to a reset control line through which the reset control signal is output.

16. The imaging element according to claim 1, wherein the pixel unit includes a first reset unit configured to discharge the electric charge of the first accumulation unit, and the pixel unit includes a second reset unit configured to discharge the electric charge of the second accumulation unit, wherein the second circuit unit outputs a reset control signal for controlling the first reset unit and the second reset unit, and wherein the first reset unit and the second reset unit are electrically connected to a reset control line through which the reset control signal is output.

17. The imaging element according to claim 1, wherein the first control block performs signal processing on the first signal output to the first signal line, and wherein the second control block performs signal processing on the second signal output to the second signal line.

18. The imaging element according to claim 17, wherein the first control block converts the first signal output to the first signal line into a first digital signal, and wherein the second control block converts the second signal output to the second signal line into a second digital signal.

19. The imaging element according to claim 18, further comprising:

a third semiconductor substrate stacked with the first semiconductor substrate, the third semiconductor substrate having a data processing unit configured to perform data processing using at least one of the first digital signal and the second digital signal.

20. The imaging element according to claim 19, wherein the data processing unit performs addition processing using at least one of the first digital signal and the second digital signal.

21. The imaging element according to claim 19, wherein the data processing unit performs image processing using at least one of the first digital signal and the second digital signal.

22. The imaging element according to claim 1, wherein the second semiconductor substrate has a first signal processing unit configured to perform signal processing on the first signal output to the first signal line, and the second semiconductor substrate has a second signal processing unit configured to perform signal processing on the second signal output to the second signal line.

23. The imaging element according to claim 22, wherein the first signal processing unit and the second signal processing unit are disposed outside of the first circuit unit on the second semiconductor substrate.

24. The imaging element according to claim 23, wherein the first signal processing unit converts the first signal output to the first signal line into a first digital signal, and wherein the second signal processing unit converts the second signal output to the second signal line into a second digital signal.

25. The imaging element according to claim 24, further comprising:

a third semiconductor substrate stacked with the first semiconductor substrate, the third semiconductor substrate having a data processing unit configured to perform data processing using at least one of the first digital signal and the second digital signal.

26. The imaging element according to claim 25, wherein the data processing unit performs addition processing using at least one of the first digital signal and the second digital signal.

27. The imaging element according to claim 25, wherein the data processing unit performs image processing using at least one of the first digital signal and the second digital signal.

28. An imaging device, comprising:

the imaging element according to claim 1.

29. The imaging device according to claim 28, further comprising:

an image processing unit electrically connected to the imaging element and configured to generate image data.

30. The imaging device according to claim 28, further comprising:

an optical system configured to emit light to the imaging element.

* * * * *